(12) United States Patent
Sakai et al.

(10) Patent No.: US 10,654,518 B2
(45) Date of Patent: May 19, 2020

(54) MOTOR CONTROL APPARATUS, MOTOR DRIVE SYSTEM, AND MOTOR CONTROL METHOD

(71) Applicant: DENSO CORPORATION, Kariya, Aichi-pref. (JP)

(72) Inventors: Toshimitsu Sakai, Kariya (JP); Masaya Taki, Kariya (JP); Shuji Kuramitsu, Kariya (JP); Koichi Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/243,519

(22) Filed: Jan. 9, 2019

(65) Prior Publication Data

US 2019/0144030 A1 May 16, 2019

Related U.S. Application Data

(63) Continuation of application No. PCT/JP2017/024916, filed on Jul. 7, 2017.

(30) Foreign Application Priority Data

| Jul. 11, 2016 | (JP) | ................................. 2016-136611 |
| Mar. 16, 2017 | (JP) | ................................. 2017-51260 |
| Jun. 29, 2017 | (JP) | ................................. 2017-126972 |

(51) Int. Cl.
*F04D 15/00* (2006.01)
*H02K 7/14* (2006.01)
(Continued)

(52) U.S. Cl.
CPC ......... *B62D 5/0463* (2013.01); *B62D 5/0403* (2013.01); *B62D 5/0412* (2013.01);
(Continued)

(58) Field of Classification Search
CPC ... B62D 5/0463; B62D 5/0403; B62D 5/0412
(Continued)

(56) References Cited

U.S. PATENT DOCUMENTS

2014/0062375 A1    3/2014   Suzuki

FOREIGN PATENT DOCUMENTS

| JP | 2011-148498 A | 8/2011 |
| JP | 5412095 B2 | 2/2014 |

(Continued)

OTHER PUBLICATIONS

International Search Report; International Application No. PCT/JP2017/024916; dated Sep. 26, 2017; 10 pages.

(Continued)

*Primary Examiner* — Erick D Glass
(74) *Attorney, Agent, or Firm* — Knobbe, Martens, Olson & Bear, LLP

(57) ABSTRACT

A motor control apparatus include: multiple motor drive circuits that drives at least one motor; multiple microcomputers that include a drive signal generator, and a drive timing generator; and multiple clock generation circuits. The microcomputers include a synchronization signal transmitter microcomputer as at least one microcomputer that transmits a synchronization signal synchronized with the drive timing of an own microcomputer and synchronizing the drive timing of the microcomputers. The microcomputers include a synchronization signal receiver microcomputer as at least one microcomputer that receives the synchronization signal transmitted from the synchronization signal transmitter microcomputer.

17 Claims, 44 Drawing Sheets

(51) Int. Cl.
  *B62D 5/04* (2006.01)
  *G06F 1/12* (2006.01)
  *H02P 25/22* (2006.01)
  *B62D 6/08* (2006.01)
  *H02P 27/06* (2006.01)
  *H02P 27/08* (2006.01)
  *G06F 9/4401* (2018.01)
  *G06F 1/06* (2006.01)

(52) U.S. Cl.
  CPC ......... *B62D 5/0457* (2013.01); *B62D 5/0481* (2013.01); *B62D 6/08* (2013.01); *G06F 1/12* (2013.01); *H02P 25/22* (2013.01); *H02P 27/06* (2013.01); *H02P 27/08* (2013.01); *G06F 1/06* (2013.01); *G06F 9/4401* (2013.01)

(58) Field of Classification Search
  USPC ............................................................ 318/3
  See application file for complete search history.

(56) References Cited

FOREIGN PATENT DOCUMENTS

| | | |
|---|---|---|
| JP | 5672278 B2 | 2/2015 |
| WO | 2018/012419 A1 | 1/2018 |

OTHER PUBLICATIONS

U.S. Appl. No. 16/243,460 and its entire file history, filed Jan. 9, 2019, Taki, et al.
U.S. Appl. No. 16/243,503 and its entire file history, filed Jan. 9, 2019, Taki, et al.

MOTOR CONTROL APPARATUS, MOTOR DRIVE SYSTEM, AND MOTOR CONTROL METHOD

CROSS REFERENCE TO RELATED APPLICATIONS

The present application is a continuation application of International Patent Application No. PCT/JP2017/024916 filed on Jul. 7, 2017, which designated the U.S. and claims the benefit of priority from Japanese Patent Application No. 2016-136611 filed on Jul. 11, 2016, Japanese Patent Application No. 2017-51260 filed on Mar. 16, 2017, and Japanese Patent Application No. 2017-126972 filed on Jun. 29, 2017. The entire disclosures of all of the above applications are incorporated herein by reference.

TECHNICAL FIELD

The present disclosure relates to a motor control apparatus including multiple microcomputers that drive-controls a motor, a motor drive system including the motor control apparatus, and a motor control method.

BACKGROUND

There is a motor control apparatus including multiple microcomputers that is provided redundantly, drive-controls a motor, and operates in accordance with clocks generated by independent clock generation circuits.

SUMMARY

According to one aspect of the present disclosure, a motor control apparatus may include multiple motor drive circuits, multiple microcomputers, and multiple clock generation circuits.

Multiple motor drive circuits may drive one or more motors each including multiple coil sets.

Multiple microcomputers may generate a motor drive signal as a command to each of the motor drive circuits, and generate a drive timing as pulse timing of the motor drive signal.

Clocks as operation reference of multiple microcomputers may be independently generated.

BRIEF DESCRIPTION OF DRAWINGS

The above object, other objects, features, and advantages of the present disclosure will be further clarified in the following detailed description with reference to the accompanying drawings. The drawings include.

DETAILED DESCRIPTION

Figure 1:
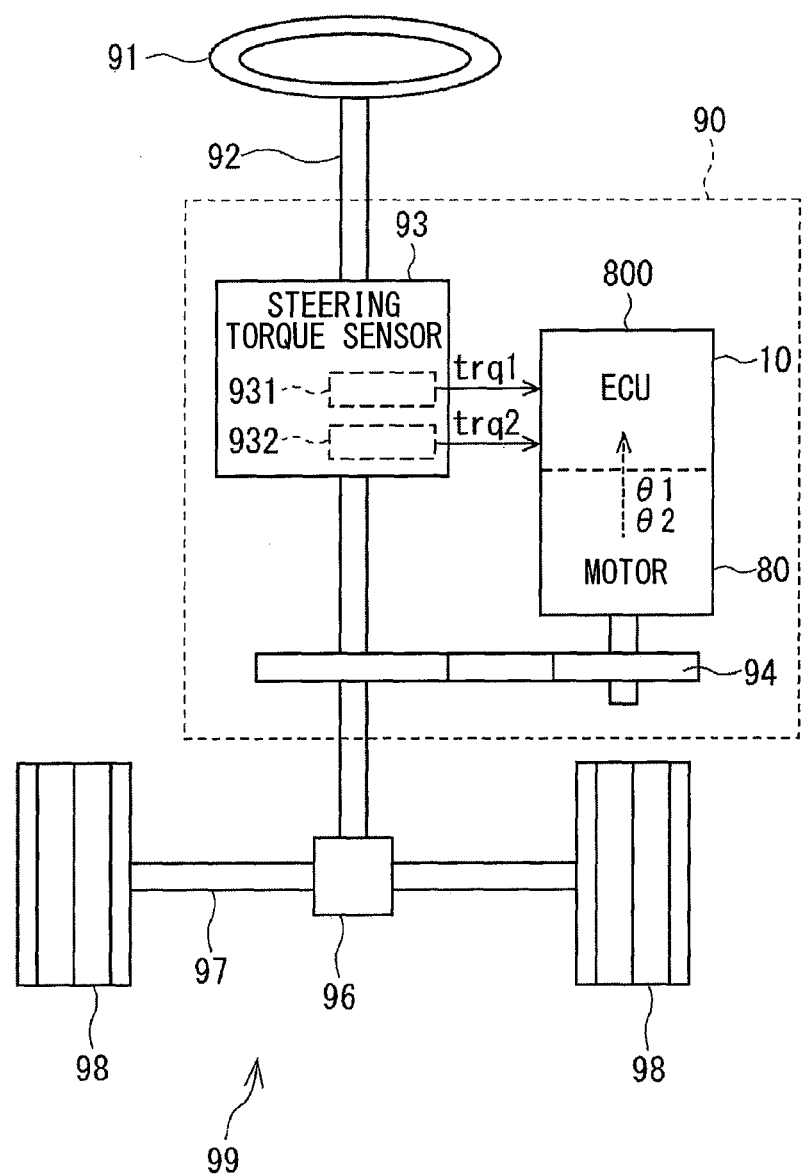
FIG. 1 is a configuration diagram of an electric power steering apparatus including an ECU according to each embodiment functioning as a mechatronically integrated motor drive system.

There may be a motor control apparatus including multiple microcomputers that is provided redundantly, drive-controls a motor, and operates in accordance with clocks generated by independent clock generation circuits. In a case where all the microcomputers are operated with a single clock generation circuit, motor drive may be stopped when the clock generation circuit is in failure. Provision of the clock generation circuits independently for the respective microcomputers may improve the reliability. A microcomputer may be referred to as a microcontroller.

There may be a difficulty causing an arithmetic control timing shift between the microcomputers due to production variation or the like between the clock generation circuits.

In view of this, a related art may disclose an electric motor control apparatus including multiple microcomputers that transmits and receives a synchronization signal therebetween, and the microcomputer having received the synchronization signal corrects the arithmetic control timing in accordance with the synchronization signal. The arithmetic control timing of multiple microcomputers may be synchronized with each other in this manner to suppress motor torque pulsation.

The related art may not assume initial synchronization upon booting multiple microcomputers. For example, difference in supplied source voltage, wiring resistance, voltage detection properties, or the like between the microcomputers may cause a boot timing shift upon turning ON power sources of the microcomputers. During a period from an initially booted one of the microcomputers starts its timer until a later booted one of the microcomputers starts its timer, only the initially booted microcomputer may be to operate asynchronously. Multiple microcomputers thus may fail to be synchronized initially.

The present description defines "asynchronous control" including motor drive control with use of part of multiple microcomputers.

The technique according to the related art may not assume a case where the synchronization signal transmitted and received between multiple microcomputers has abnormality. When the transmitted synchronization signal has abnormality, a synchronization signal receiver microcomputer will execute timing correction in accordance with the abnormal synchronization signal. The synchronization signal receiver microcomputer may have control breakdown depending on a degree of synchronization signal abnormality. This may lead to a worse situation than occurrence of torque pulsation due to a clock shift. For example, a vehicle electric power steering apparatus having an assist function stopped due to motor drive stop will make a driver to feel anxious. There may be required determination of synchronization signal abnormality and execution of an appropriate procedure against the abnormality.

The present disclosure may provide a motor control apparatus configured to achieve initial synchronization after booting multiple microcomputers.

The present disclosure may provide a motor control apparatus including multiple microcomputers that operates in accordance with clocks independent from each another and transmits and receives a synchronization signal for clock shift correction, and the motor control apparatus is configured to determine abnormality of the synchronization signal.

The present disclosure may provide a motor drive system including the motor control apparatus, and a motor control method with use of the motor control apparatus.

A motor control apparatus according to the present disclosure may include multiple motor drive circuits, multiple microcomputers, and multiple clock generation circuits.

Multiple motor drive circuits may drive one or more motors each including multiple coil sets.

Multiple microcomputers may include a drive signal generator and a drive timing generator. The drive signal generator may generate a motor drive signal as a command to each of the motor drive circuits. The drive timing generator may generate drive timing as pulse timing of the motor drive signal.

Multiple clock generation circuits may independently generate clocks as operation reference of multiple microcomputers.

Each clock generation circuit, each microcomputer, and each motor drive circuit may be provided in association with one another, and each unit including these constituent elements will be defined as a "system". The constituent elements in each system control electrification to a corresponding one of the coil sets to allow the motor control apparatus to drive the motor.

Multiple microcomputers may include a synchronization signal transmitter microcomputer as "at least one microcomputer that transmits a synchronization signal synchronized with drive timing of the own microcomputer and synchronizing drive timing of multiple microcomputers", and a synchronization signal receiver microcomputer as "at least one microcomputer that receives the synchronization signal from the synchronization signal transmitter microcomputer". Each of the microcomputers will refer to the microcomputer itself by the "own microcomputer".

A motor control apparatus according to a first aspect may include the basic configurations described above, as well as the following configurations.

The synchronization signal transmitter microcomputer may include a synchronization signal generator that generates a synchronization signal and transmits the synchronization signal to the synchronization signal receiver microcomputer.

The synchronization signal receiver microcomputer may include a timing corrector that is configured to execute timing correction of correcting drive timing of the own microcomputer to be synchronized with the received synchronization signal.

The synchronization signal receiver microcomputer further may include a ready signal transmitter. The ready signal transmitter may transmit, to the synchronization signal transmitter microcomputer, a ready signal indicating synchronization preparation completion of the own microcomputer. The synchronization signal transmitter microcomputer may also include a ready signal receiver that receives a ready signal.

The synchronization signal transmitter microcomputer and the synchronization signal receiver microcomputer each may include a handshaking determiner that determines success in handshaking if the handshaking at least including transmission and reception of the ready signal is executed normally.

When the handshaking is determined as being successful, the synchronization signal transmitter microcomputer and the synchronization signal receiver microcomputer may synchronously drive the motor initially after booting.

The motor control apparatus according to the present disclosure can thus achieve initial synchronization after booting multiple microcomputers.

The timing corrector in the synchronization signal receiver microcomputer may include a received signal determiner that executes received signal determination of determining normality or abnormality of the received synchronization signal.

When the synchronization signal is determined as being normal in the received signal determination, the synchronization signal receiver microcomputer may permit the timing correction. When the synchronization signal is determined as being abnormal in the received signal determination, the synchronization signal receiver microcomputer may prohibit the timing correction and may drive the motor asynchronously with the synchronization signal transmitter microcomputer.

The received signal determiner of the synchronization signal receiver microcomputer in this configuration is configured to determine abnormality of the synchronization signal. When the synchronization signal is determined as being abnormal in the received signal determination, the synchronization signal receiver microcomputer may prohibit the timing correction and may drive the motor asynchronously with the synchronization signal transmitter microcomputer. This configuration thus prevents control breakdown of the synchronization signal receiver microcomputer due to abnormality of the synchronization signal.

In this case, the motor can be at least driven continuously even if torque pulsation occurs. This configuration may be effective specifically in a motor drive system like an electric power steering apparatus, which is highly required for continuation of an assist function through motor drive.

A motor control apparatus according to a second aspect may include the basic configurations described above, and may achieve the following three drive modes:

(1) A synchronous drive mode of driving the motor by the synchronization signal transmitter microcomputer and the synchronization signal receiver microcomputer having received the synchronization signal and being synchronized with the synchronization signal transmitter microcomputer;

(2) An asynchronous drive mode of driving the motor by the synchronization signal transmitter microcomputer and the synchronization signal receiver microcomputer asynchronously with each other, not in accordance with the synchronization signal; and (3) A part-of-systems drive mode of driving the motor by only one of the synchronization signal transmitter microcomputer and the synchronization signal receiver microcomputer.

This motor control apparatus may occasionally transition from the part-of-systems drive mode, to the asynchronous drive mode, and then to the synchronous drive mode in the mentioned order, upon booting the synchronization signal transmitter microcomputer and the synchronization signal receiver microcomputer.

The present disclosure may provide a motor control method with use of the motor control apparatus including the above basic configurations.

This motor control method may include a ready signal transmission step of causing the synchronization signal receiver microcomputer to transmit, to the synchronization signal transmitter microcomputer, a ready signal indicating synchronization preparation completion of the own microcomputer.

In a ready signal transmission step, the synchronization signal transmitter microcomputer may receive the ready signal.

In a handshaking success determination step, the handshaking determiner in each of the synchronization signal transmitter microcomputer and the synchronization signal receiver microcomputer may determine success in handshaking when the handshaking at least including transmission and reception of the ready signal is executed normally.

In a synchronous drive step, when the handshaking is determined as being successful, the synchronization signal transmitter microcomputer and the synchronization signal receiver microcomputer may synchronously drive the motor initially after booting.

A motor control apparatus according to each of multiple embodiments will now be described with reference to the drawings. An ECU as the "motor control apparatus" according to each of the embodiments is included in an electric power steering apparatus of a vehicle, and controls electrification to a motor that outputs steering assist torque. The ECU and the motor configure a "motor drive system".

Substantially identical configurations among multiple embodiments will be denoted by an identical reference sign and will not be described repeatedly. Each of the following first to fifth embodiments will inclusively be referred to as "the present embodiment".

A configuration of the electric power steering apparatus, a configuration of the motor drive system, and the like to be adopted will be described as common matters according to each of the embodiments with reference to FIGS. 1 to 6.

Figure 2:
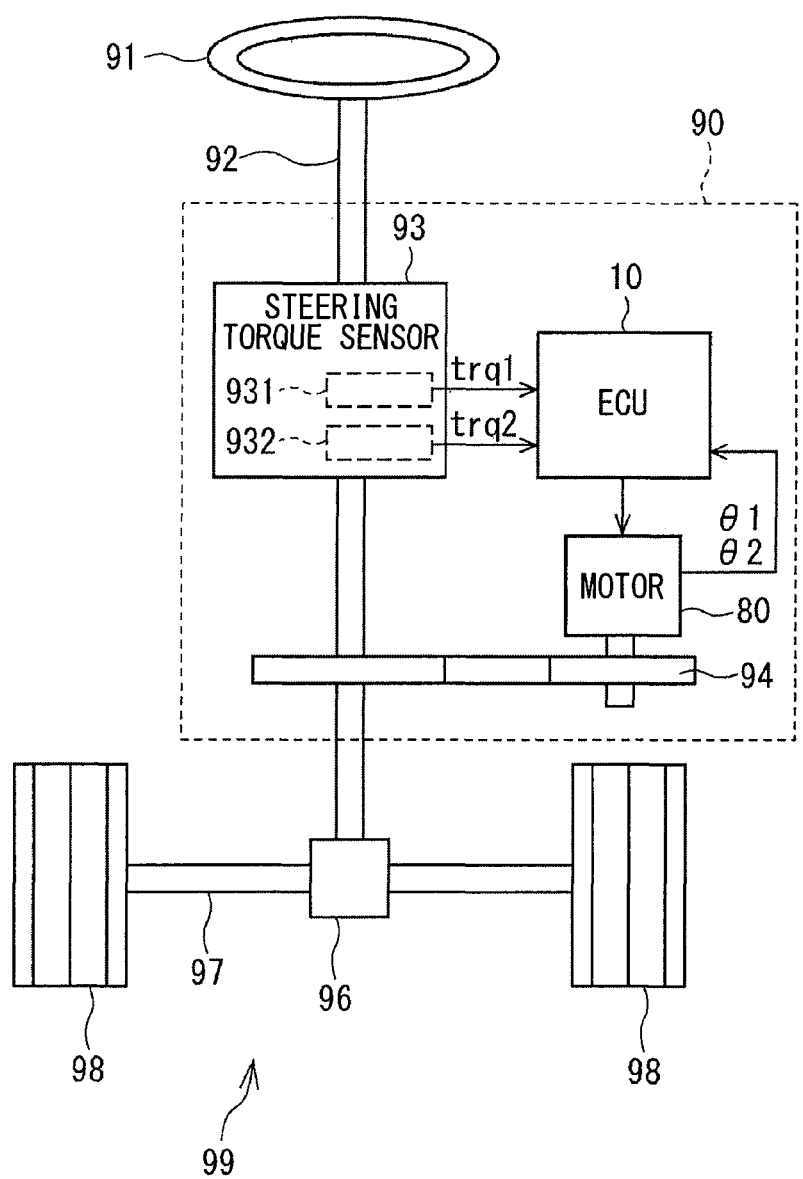
FIG. 2 is a configuration diagram of an electric power steering apparatus including the ECU according to each embodiment functioning as a mechatronically separate motor drive system.

FIGS. 1 and 2 each depict an entire configuration of a steering system 99 including an electric power steering apparatus 90. FIG. 1 depicts a "mechatronically integrated" configuration including an ECU 10 integrally provided at an axial end of a motor 80. FIG. 2 depicts a "mechatronically separate" configuration including the ECU 10 and the motor 80 connected via a harness. The electric power steering apparatus 90 depicted in FIGS. 1 and 2 is of a column assist type. These configurations are similarly applicable to an electric power steering apparatus of a rack assist type.

The steering system 99 includes a steering wheel 91, a steering shaft 92, a pinion gear 96, a rack shaft 97, wheels 98, the electric power steering apparatus 90, and the like.

The steering shaft 92 is connected to the steering wheel 91. The pinion gear 96 is provided at a distal end of the steering shaft 92 and meshes with the rack shaft 97. The rack shaft 97 has two ends provided with a pair of wheels 98 via tie rods, respectively. When a driver turns the steering wheel 91, the steering shaft 92 connected to the steering wheel 91 is rotated. The pinion gear 96 converts rotary motion of the steering shaft 92 to linear motion of the rack shaft 97, and the pair of wheels 98 is steered at an angle according to an amount of displacement of the rack shaft 97.

The electric power steering apparatus 90 includes a steering torque sensor 93, the ECU 10, the motor 80, a reduction gear 94, and the like.

The steering torque sensor 93 is provided at an intermediate portion on the steering shaft 92 and detects steering torque of the driver. The steering torque sensor 93 according to the modes depicted in FIGS. 1 and 2 is duplicated to include a first torque sensor 931 and a second torque sensor 932 and dually detect first steering torque trq1 and second steering torque trq2.

If the steering torque sensor is not provided redundantly, a single detection value of steering torque trq may commonly be applied to two systems. In a case where adoption of the steering torque trq1 and the steering torque trq2 detected redundantly is not specifically meaningful hereinafter, the steering torque trq1 and the steering torque trq2 will collectively be referred to as the single steering torque trq.

The ECU 10 drive-controls the motor 80 in accordance with the steering torque trq1 and the steering torque trq2 to cause the motor 80 to generate desired assist torque. The assist torque outputted from the motor 80 is transmitted to the steering shaft 92 via the reduction gear 94.

The ECU 10 acquires electrical angles θ1 and θ2 of the motor 80 detected by rotation angle sensors, and the steering torque trq1 and the steering torque trq2 detected by the steering torque sensor 93. The ECU 10 drive-controls the motor 80 in accordance with the above information and information such as motor current internally detected in the ECU 10.

Figure 3:
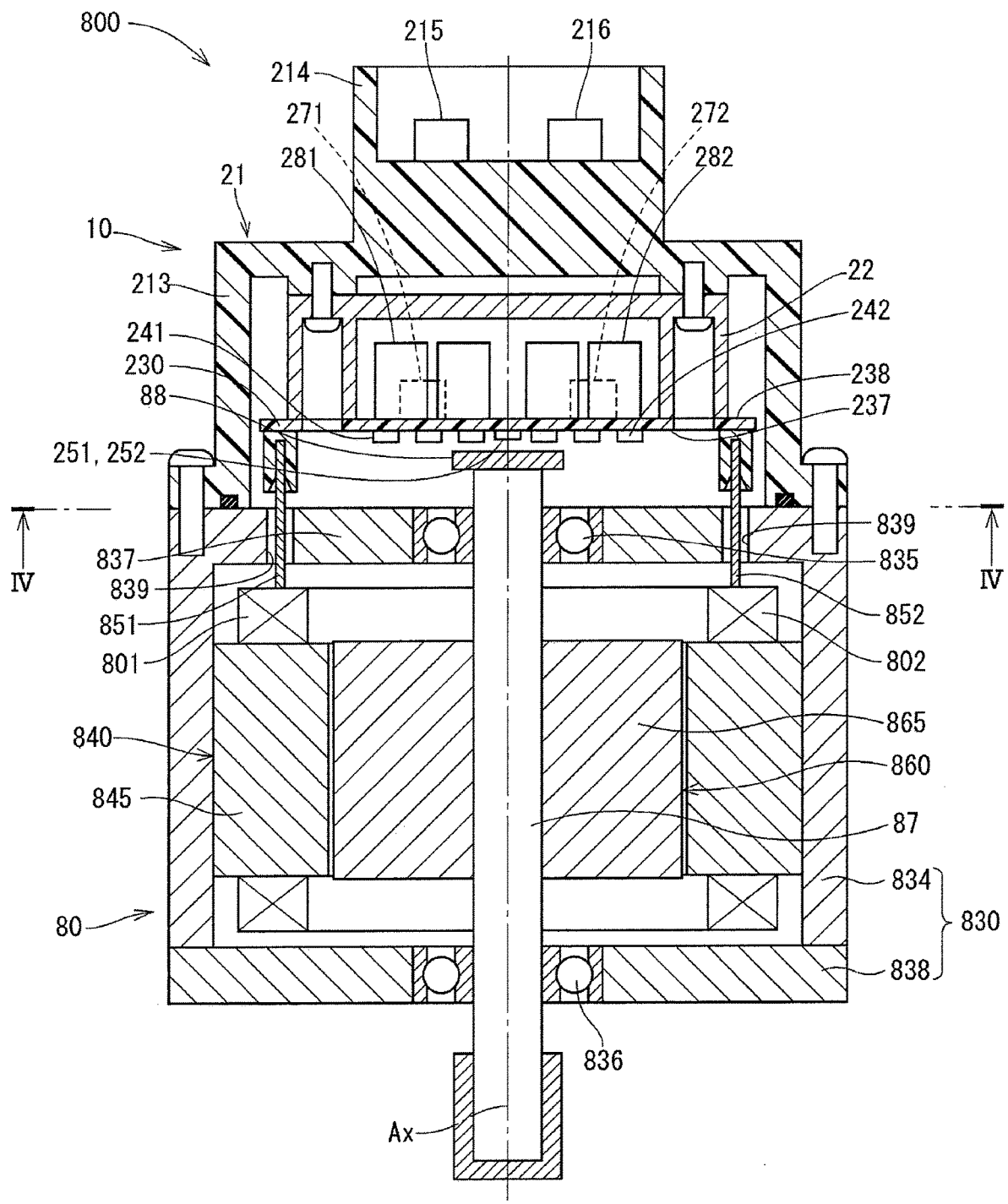
FIG. 3 is an axially sectional view of a dual-system mechatronically integrated motor.
Figure 4:
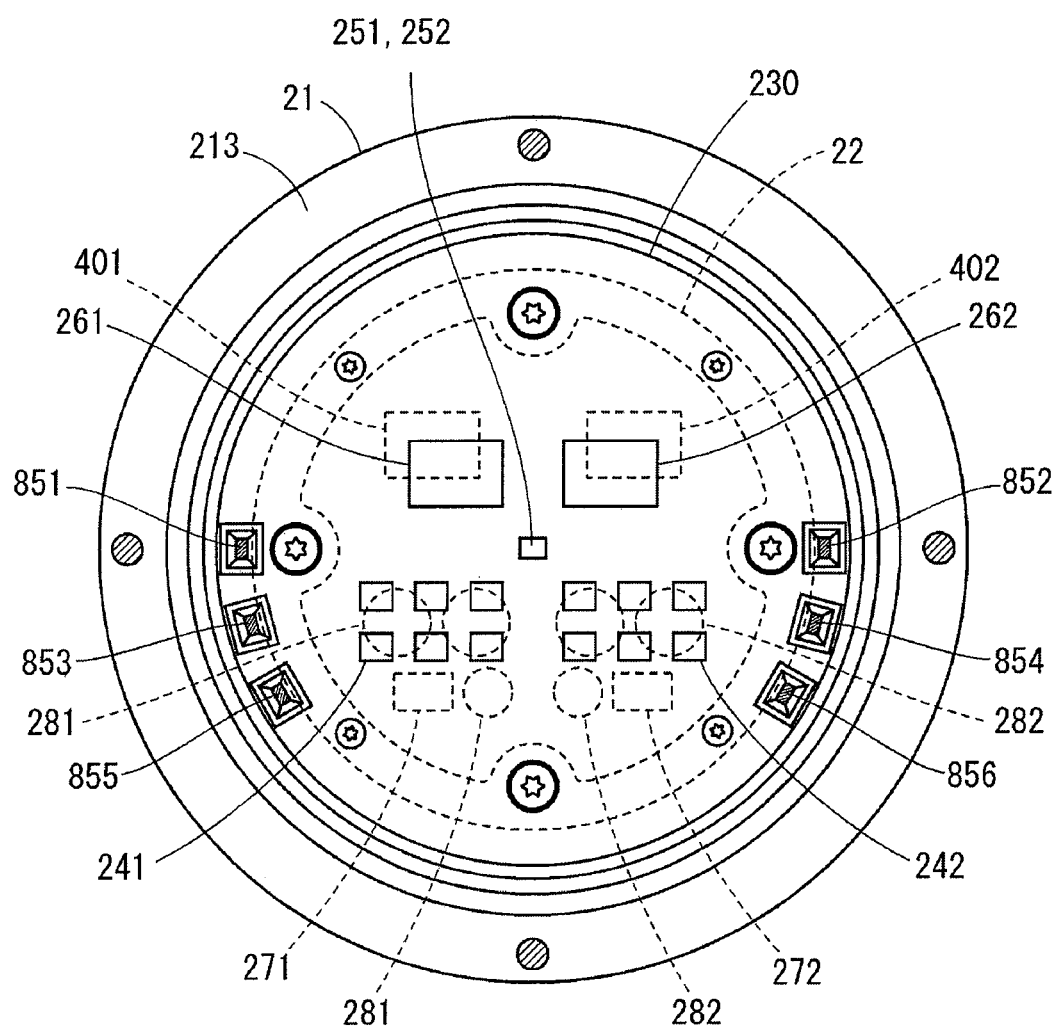
FIG. 4 is a sectional view taken along line IV-IV indicated in FIG. 3.

A configuration of a mechatronically integrated motor 800 including the motor 80 and the ECU 10 integrally provided at an axial end of the motor 80 will be described with reference to FIGS. 3 and 4. The ECU 10 according to the mode depicted in FIG. 3 is disposed opposite to an output end of the motor 80 to be coaxial with an axis Ax of a shaft 87. The ECU 10 according to another embodiment may be disposed at the output end of the motor 80 to be integral to the motor 80.

The motor 80 is a three-phase brushless motor, and includes a stator 840, a rotor 860, and a housing 830 accommodating the stator 840 and the rotor 860.

The stator 840 includes a stator core 845 fixed to the housing 830, and two three-phase coil sets 801 and 802 assembled to the stator core 845.

The first coil set 801 includes respective-phase coils having lead wires 851, 853, and 855 extending therefrom. The second coil set 802 includes respective-phase coils having lead wires 852, 854, and 856 extending therefrom.

The rotor 860 includes the shaft 87 supported by a rear bearing 835 and a front bearing 836, and a rotor core 865 into which the shaft 87 is fitted. The rotor 860 is provided inside the stator 840 and is rotatable relatively to the stator 840. The shaft 87 has an end provided with a permanent magnet 88.

The housing 830 includes a case 834 having a bottomed tubular shape and including a rear frame end 837, and a front frame end 838 provided at an end of the case 834. The case 834 and the front frame end 838 are fastened to each other by a bolt or the like. The lead wires 851, 852, and the like of the coil sets 801 and 802 extend toward the ECU 10 through a lead wire insertion hole 839 provided in the rear frame end 837 to be connected to a substrate 230.

The ECU 10 includes a cover 21, a heat sink 22 fixed to the cover 21, the substrate 230 fixed to the heat sink 22, and various electronic components mounted to the substrate 230. The cover 21 protects the electronic components from external impact, and prevents entry of dust, water, and the like into the ECU 10.

The cover 21 includes an external connector portion 214 with an external power feeder cable and an external signal cable, and a cover portion 213. The external connector portion 214 has power feed terminals 215 and 216 each connected to the substrate 230 via a path (not depicted).

The substrate 230 is exemplified by a printed circuit board, which is positioned to face the rear frame end 837 and is fixed to the heat sink 22. The substrate 230 is provided with the electronic components for the two systems independently from each other, to form fully redundant configurations. The present embodiment provides the single substrate 230, but another embodiment may provide two or more substrates.

The substrate 230 has two principal surfaces including a motor surface 237 facing the rear frame end 837 and a cover surface 238 being opposite to the motor surface 237 and facing the heat sink 22.

The motor surface 237 is mounted with multiple switching elements 241 and 242, rotation angle sensors 251 and 252, custom ICs 261 and 262, and the like.

Multiple switching elements 241 and 242 according to the present embodiment includes six switching elements for each of the systems, and configures three-phase upper and lower arms of motor drive circuits. The rotation angle sensors 251 and 252 are disposed to face the permanent magnet 88 provided at a distal end of the shaft 87. The custom ICs 261, 262 and the microcomputers 401, 402 have a control circuit of the ECU 10. The custom ICs 261 and 262 are provided with clock monitoring portions 661 and 662, and the like depicted in FIG. 7 and the like.

The cover surface 238 is mounted with the microcomputers 401 and 402, capacitors 281 and 282, inductors 271 and 272, and the like. The first microcomputer 401 and the second microcomputer 402 are particularly disposed, with a predetermined space provided therebetween, on the cover surface 238 as an identical surface of the identical substrate 230.

The capacitors 281 and 282 smooth electric power supplied from a power source and prevent noise outflow due to switching operation or the like of the switching elements 241 and 242. The inductors 271 and 272 and the capacitors 281 and 282 configure a filter circuit.

Figure 5:
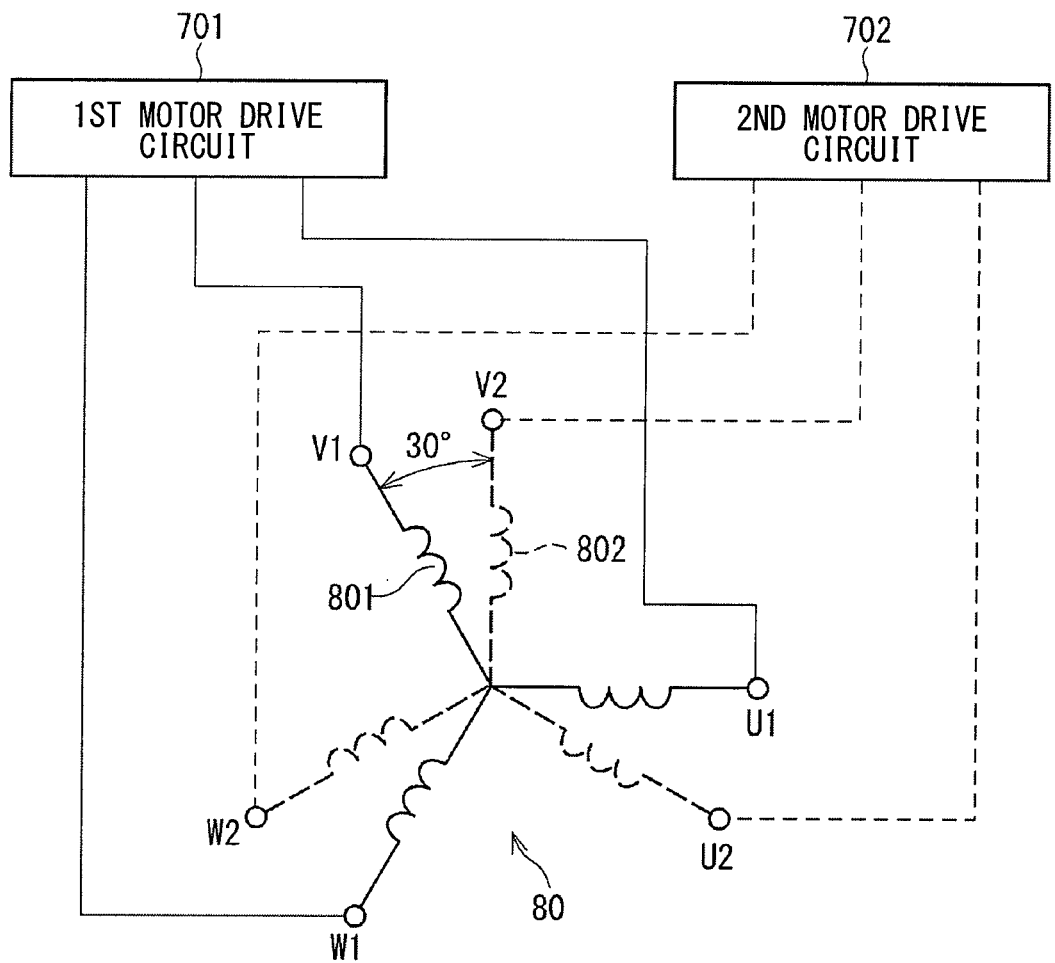
FIG. 5 is a schematic diagram depicting a configuration of a multiphase coaxial motor.
Figure 6:
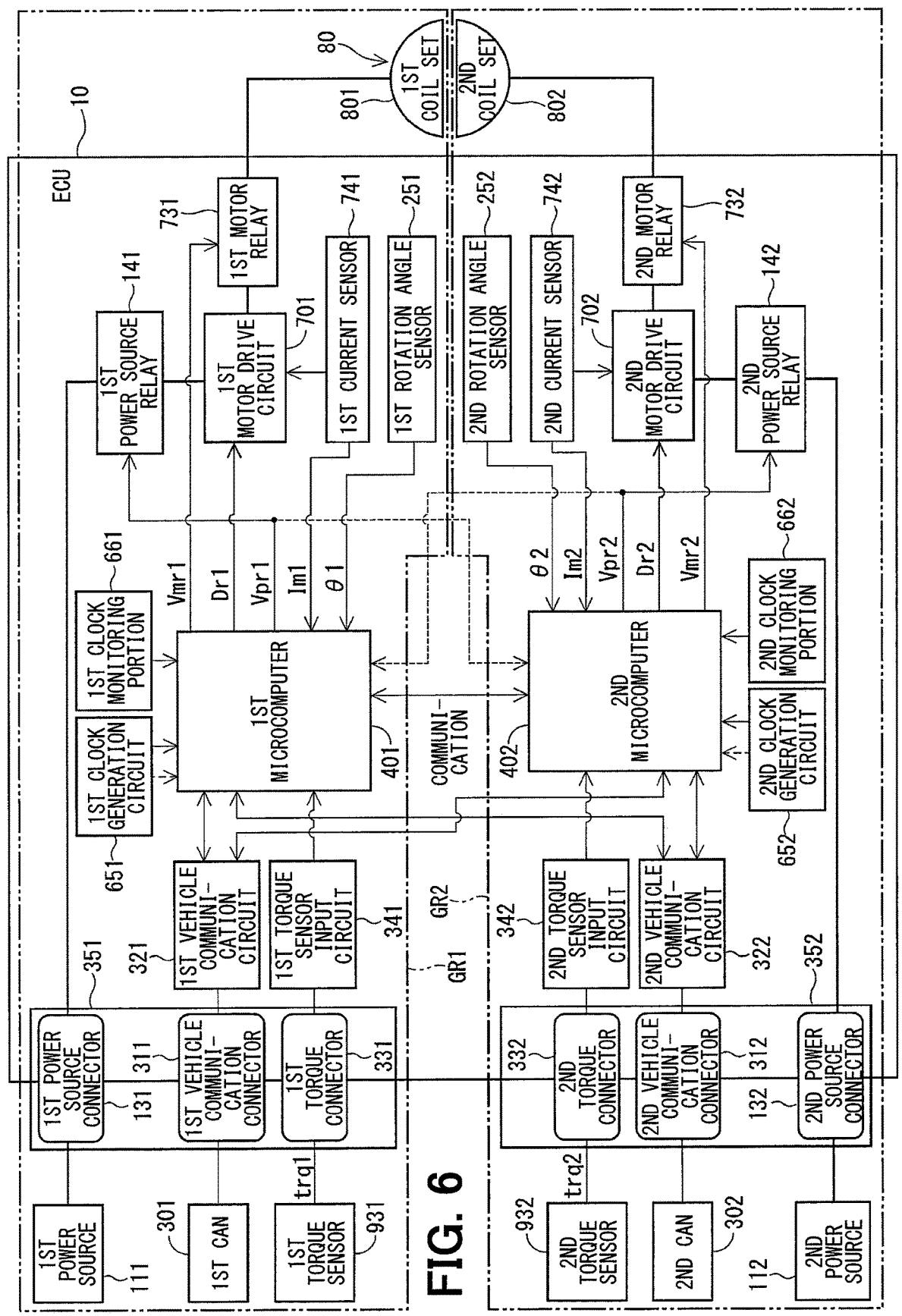
FIG. 6 is an entire configuration diagram of the ECU (motor control apparatus) according to each embodiment.

As depicted in FIGS. 5 and 6, the motor 80 to be controlled by the ECU 10 is the three-phase brushless motor including the two three-phase coil sets 801 and 802 provided coaxially.

The coil sets 801 and 802 are equal in electrical characteristic, and are disposed at the common stator to be shifted by an electrical angle of 30 degrees, as depicted in FIG. 3 of JP 5672278 B2 and the like. The coil sets 801 and 802 are controlled to be provided with phase current having equal amplitude and phases shifted from each other by 30 degrees, for example.

FIG. 6 depicts the first coil set 801, as well as the first microcomputer 401, a motor drive circuit 701, and the like relevant to electrification control of the first coil set 801, which configure a first system GR1. FIG. 6 also depicts the second coil set 802, as well as the second microcomputer 402, a second motor drive circuit 702, and the like relevant to electrification control of the second coil set 802, which configure a second system GR2. The first system GR1 and the second system GR2 include two element groups completely independent from each other and form redundant configurations of so-called "full dual systems".

For distinction as necessary in the description, constituent elements or signals for the first system GR1 will have names beginning with "first", whereas constituent elements or signals for the second system GR2 will have names beginning with "second". Common matters between these systems will be described collectively without adding "first" or "second". The constituent elements or the signals for the first system will each have "1" at the end of the reference sign, whereas the constituent elements or the signals for the second system will each have "2" at the end of the reference sign.

Hereinafter, one of the systems including a constituent element will be called the "own system", and the remaining one of the systems will be called the "other system". Similarly, in the microcomputers 401 and 402 for the two systems, the microcomputer in the own system will be called the "own microcomputer" whereas the microcomputer in the other system will be called the "other microcomputer".

The ECU 10 has a first connector portion 351 including a first power source connector 131, a first vehicle communication connector 311, and a first torque connector 331. The ECU 10 further has a second connector portion 352 including a second power source connector 132, a second vehicle communication connector 312, and a second torque connector 332. Each of the connector portions 351 and 352 may be provided as a single connector, or may include multiple divided connectors.

The first power source connector 131 is connected to a first power source 111. The first power source 111 supplies electric power to the first coil set 801 via the power source connector 131, a power source relay 141, the first motor drive circuit 701, and a motor relay 731. The first power source 111 also supplies electric power to the first microcomputer 401 and sensors in the first system GR1.

The second power source connector 132 is connected to a second power source 112. The second power source 112 supplies electric power to the second coil set 802 via the power source connector 132, a power source relay 142, the second motor drive circuit 702, and a motor relay 732. The second power source 112 also supplies electric power to the second microcomputer 402 and sensors in the second system GR2.

In a case where the power sources are not provided redundantly, the power source connectors 131 and 132 of the two systems may be connected to a common power source.

In a case where CANs are provided redundantly as vehicle communication networks, the first vehicle communication connector 311 is connected between a first CAN 301 and a first vehicle communication circuit 321, and the second vehicle communication connector 312 is connected between a second CAN 302 and a second vehicle communication circuit 322.

In another case where the CANs are not provided redundantly, the vehicle communication connectors 311 and 312 of the two systems may be connected to the common CAN 30. There may be provided, other than the CAN, a vehicle communication network of any standard, such as a CAN with flexible data rate (CAN-FD) or a FlexRay.

Each of the vehicle communication circuits 321 and 322 bidirectionally communicates with the microcomputers 401 and 402 in the own and other systems.

The first torque connector 331 is connected between the first torque sensor 931 and a first torque sensor input circuit 341. The first torque sensor input circuit 341 notifies the first microcomputer 401 of the steering torque trq1 detected by the first torque connector 331.

The second torque connector 332 is connected between the second torque sensor 932 and a second torque sensor input circuit 342. The second torque sensor input circuit 342 notifies the second microcomputer 402 of the steering torque trq2 detected by the second torque connector 332.

The microcomputers 401 and 402 each execute various processing including software processing of causing a CPU to execute a program preliminarily stored in a substantive memory device such as a ROM, and hardware processing executed by a dedicated electronic circuit.

The microcomputers 401 and 402 operate in accordance with reference clocks generated by clock generation circuits 651 and 652, respectively. The clock monitoring portions 661 and 662 monitor the reference clocks generated by the clock generation circuits 651 and 652, respectively. Generation and monitoring of the reference clocks will be described in detail later.

The first microcomputer 401 generates a motor drive signal Dr1 for operation of the switching elements 241 of the first motor drive circuit 701, and commands the first motor drive circuit 701 by means of the motor drive signal Dr1. The first microcomputer 401 generates a first power source relay drive signal Vpr1 and a first motor relay drive signal Vmr1.

The second microcomputer 402 generates a motor drive signal Dr2 for operation of the switching elements 242 of the second motor drive circuit 702, and commands the second motor drive circuit 702 by means of the motor drive signal Dr2. The second microcomputer 402 generates a second power source relay drive signal Vpr2 and a second motor relay drive signal Vmr2. The power source relay drive signal Vpr1 or Vpr2 generated by the microcomputer 401 or 402 is transmitted as a command to the power source relay 141 or 142 of the own system, and is also transmitted for notification to the other microcomputer.

The microcomputers 401 and 402 are configured to execute communication between the microcomputers to mutually transmit and receive information. The microcomputers 401 and 402 execute the communication between the microcomputers to mutually transmit and receive a current detection value, a current command value, and the like, to cause the first system GR1 and the second system GR2 to drive the motor 80 in cooperation with each other. The communication between the microcomputers has communication frames including the current detection value and the like. The communication frames may further include the current command value, a current limiting value, an update counter, a status signal, a CRC signal functioning as an error detection value signal, a check sum signal, or the like. The present embodiment is applicable regardless of contents of the communication between the microcomputers. Different information may be transmitted and received as necessary, or the data exemplified above may be excluded partially or entirely.

In a case where each of the microcomputers receives the power source relay drive signal Vpr1 or Vpr2 from the other microcomputer but does not receive any signal from the other microcomputer by means of the communication between the microcomputers, the other microcomputer is determined as being normal and the communication between the microcomputers is determined as being abnormal.

In another case where each of the microcomputers does not receive the power source relay drive signal Vpr1 or Vpr2 from the other microcomputer and does not receive any signal from the other microcomputer by means of the communication between the microcomputers, the other microcomputer is determined as being abnormal.

The first motor drive circuit 701 is a three-phase inverter including multiple switching elements 241, and converts electric power to be supplied to the first coil set 801. The switching elements 241 of the first motor drive circuit 701 are controlled to be turned ON and OFF in accordance with the motor drive signal Dr1 outputted from the first microcomputer 401.

The second motor drive circuit 702 is a three-phase inverter including multiple switching elements 242, and converts electric power to be supplied to the second coil set 802. The switching elements 242 of the second motor drive circuit 702 are controlled to be turned ON and OFF in accordance with the motor drive signal Dr2 outputted from the second microcomputer 402.

The first power source relay 141 is provided between the first power source connector 131 and the first motor drive circuit 701, and is controlled in accordance with the first power source relay drive signal Vpr1 from the first microcomputer 401. In a case where the first power source relay 141 is ON, electrification is permitted between the first power source 111 and the first motor drive circuit 701. In another case where the first power source relay 141 is OFF, electrification is blocked between the first power source 111 and the first motor drive circuit 701.

The second power source relay 142 is provided between the second power source connector 132 and the second motor drive circuit 702, and is controlled in accordance with the second power source relay drive signal Vpr2 from the second microcomputer 402. In a case where the second power source relay 142 is ON, electrification is permitted between the second power source 112 and the second motor drive circuit 702. In another case where the second power source relay 142 is OFF, electrification is blocked between the second power source 112 and the second motor drive circuit 702.

Each of the power source relays 141 and 142 according to the present embodiment is a semiconductor relay such as a MOSFET. If each of the power source relays 141 and 142 has a parasitic diode as in the MOSFET, it is desired to provide a reverse connection protective relay (not depicted) that is connected in series to the power source relays 141 and 142 to allow the parasitic diodes to be directed reversely to each other. The power source relays 141 and 142 may be mechanical relays.

The first motor relay 731 is provided on an each-phase power path between the first motor drive circuit 701 and the first coil set 801, and is controlled in accordance with the first motor relay drive signal Vmr1 from the first microcomputer 401. In a case where the first motor relay 731 is ON, electrification is permitted between the first motor drive circuit 701 and the first coil set 801. In another case where the first motor relay 731 is OFF, electrification is blocked between the first motor drive circuit 701 and the first coil set 801.

The second motor relay 732 is provided on an each-phase power path between the second motor drive circuit 702 and the second coil set 802, and is controlled in accordance with the second motor relay drive signal Vmr2 from the second microcomputer 402. In a case where the second motor relay 732 is ON, electrification is permitted between the second motor drive circuit 702 and the second coil set 802. In another case where the second motor relay 732 is OFF, electrification is blocked between the second motor drive circuit 702 and the second coil set 802.

There is provided a first current sensor 741 that detects current Im1 flowing to each phase of the first coil set 801 and transmits the detected current Im1 to the first microcomputer 401. There is provided a second current sensor 742 that detects current Im2 flowing to each phase of the second coil set 802 and transmits the detected current Im2 to the second microcomputer 402.

In a case where the rotation angle sensors 251 and 252 are provided redundantly, the first rotation angle sensor 251 detects the electrical angle $\theta 1$ of the motor 80 and transmits the detected electrical angle $\theta 1$ to the first microcomputer 401. The second rotation angle sensor 252 detects the electrical angle $\theta 2$ of the motor 80 and transmits the detected electrical angle $\theta 2$ to the second microcomputer 402.

In another case where the rotation angle sensors are not provided redundantly, the electrical angle $\theta 2$ of the second system may be calculated in accordance with an equation "$\theta 2 = \theta 1 + 30$ degrees" from the electrical angle $\theta 1$ of the first system detected by the first rotation angle sensor 251.

Configuration of ECU

The ECU according to each embodiment will be described below in terms of the configuration and the functional effect thereof. FIG. 6 depicts the two redundant systems including configurations not to be described where appropriate. The ECU according to each embodiment will be denoted by a reference sign of a three-digit number including "10" followed by the ordinal number of the embodiment.

Basic Mode of First Embodiment

Prior to description of the first embodiment, the basic mode having a main idea of the first embodiment will initially be described in terms of a configuration and a functional effect thereof with reference to FIGS. 7 to 18.

Figure 7:
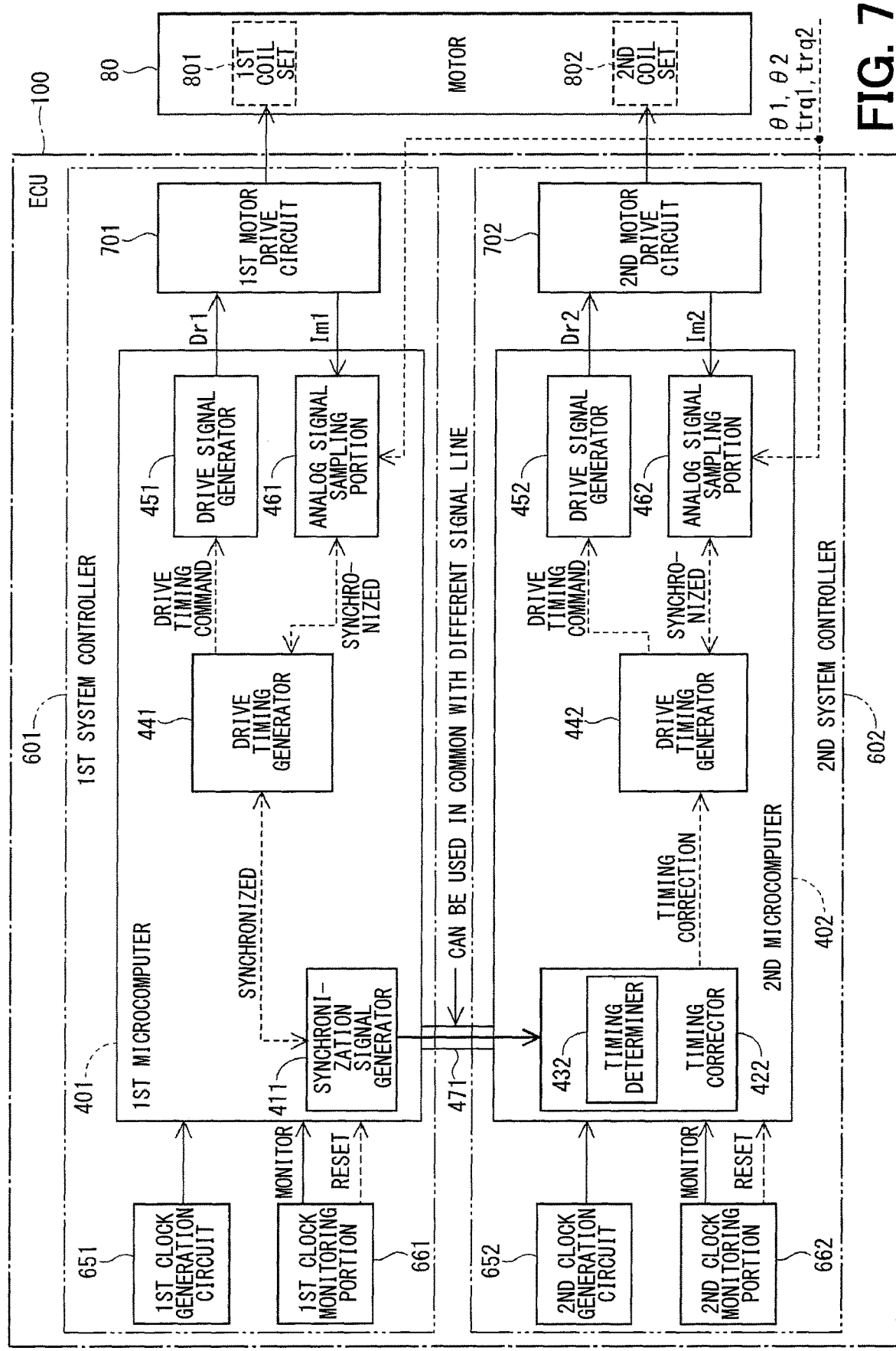
FIG. 7 is a detailed configuration diagram of an ECU (motor control apparatus) according to a basic mode of a first embodiment.
Figure 19:
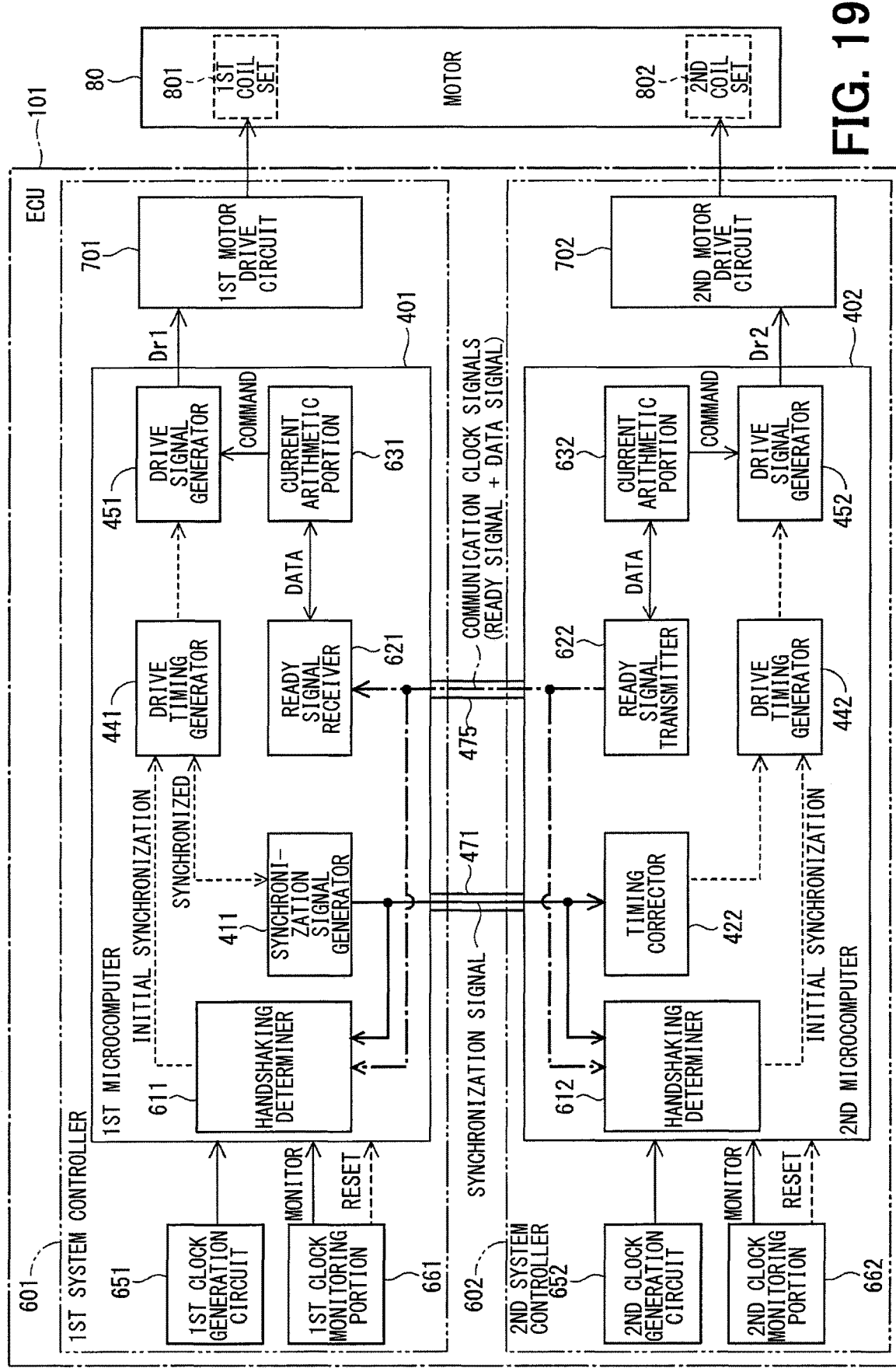
FIG. 19 is a configuration diagram of an ECU (motor control apparatus) according to the first embodiment.

FIG. 7 depicts a configuration particularly relevant to synchronization during operation, in a configuration of an ECU 101 depicted in FIG. 19 according to the first embodiment. FIG. 1 depicts the ECU according to the basic mode, depicted by reference sign "100".

FIG. 7 depicts the ECU 100 including a first system controller 601 that controls electrification to the first coil set 801, and a second system controller 602 that controls electrification to the second coil set 802. The controllers 601 and 602 of the respective systems include the clock generation circuits 651 and 652, the clock monitoring portions 661 and 662, the microcomputers 401 and 402, and the motor drive circuits 701 and 702, respectively. In other words, a "system" corresponds to a unit of constituent elements including the clock generation circuit, the microcomputer, and the motor drive circuit provided in association with one another.

The first clock generation circuit 651 and the second clock generation circuit 652 independently generate reference clocks as operation reference of the first microcomputer 401 and the second microcomputer 402, respectively.

The first clock monitoring portion 661 monitors the reference clock generated by the first clock generation circuit 651 and transmitted to the first microcomputer 401. The second clock monitoring portion 662 monitors the reference clock generated by the second clock generation circuit 652 and transmitted to the second microcomputer 402. The clock monitoring portion 661 or 662 transmits a reset signal (denoted by "RESET" in the figure) to the microcomputer 401 or 402 upon detection of abnormality of the reference clock.

The microcomputers 401 and 402 receive vehicle information transmitted via the CANs 301 and 302, information such as the steering torque trq1 and the steering torque trq2, the phase current Im1 and the phase current Im2, and the electrical angles θ1 and θ2, which are transmitted from the corresponding sensors, respectively. The microcomputers 401 and 402 generate the motor drive signals Dr1 and Dr2 through control arithmetic according to the various received information, and transmit the motor drive signals Dr1 and Dr2 to the motor drive circuits 701 and 702, respectively. The control arithmetic is executed at timing determined by the clock generated by each of the clock generation circuits 651 and 652.

The motor drive circuits 701 and 702 electrify the coil sets 801 and 802 in accordance with the motor drive signals Dr1 and Dr2 transmitted as commands from the microcomputers 401 and 402, respectively. Each of the motor drive circuits 701 and 702 is typically exemplified by a power converter circuit including multiple switching elements such as MOSFETs having bridge connection. The motor drive signals Dr1 and Dr2 are switching signals for turning ON or OFF the switching elements. In the present embodiment exemplifying driving the three-phase brushless motor, the motor drive circuits 701 and 702 are three-phase inverters.

Each of the microcomputers 401 and 402 independently includes a ROM that stores a control program and fixed values such as parameters, a RAM that temporarily stores an arithmetic processing result, and the like, and is not configured to refer to the ROM or the RAM in the other microcomputer.

On this assumption, the two microcomputers 401 and 402 are connected to each other via a synchronization signal line 471. FIG. 7 exemplifies provision of the single synchronization signal line 471. The third embodiment to be described later or another embodiment providing three or more microcomputers may exemplify provision of multiple synchronization signal lines. In other words, the ECU according to the basic mode of the first embodiment ordinarily includes at least one synchronization signal line.

The synchronization signal line is not limited to a dedicated line for transmission of a synchronization signal to be described later, but may also be used in common with a signal line for communication of information other than the synchronization signal, such as a clock line for the communication between the microcomputers, or a serial communication line for communication of information such as current.

As disclosed in JP2011-148498 A and the like, the synchronization signal can be provided for notification not by means of communication via the synchronization signal line but by means of level change of a port signal from the first microcomputer 401 to the second microcomputer 402.

The first microcomputer 401 and the second microcomputer 402 are commonly configured by including drive timing generators 441 and 442, drive signal generators 451 and 452, and analog signal sampling portions 461 and 462, respectively.

The drive timing generators 441 and 442 generate drive timing as pulse timing of the motor drive signals Dr1 and Dr2 with use of a PWM carrier wave commonly applicable to the respective phases or the like, and command the drive timing to the drive signal generators 451 and 452, respectively. The drive signal generators 451 and 452 compare the PWM carrier wave with a DUTY ratio of a voltage command signal or the like to generate the motor drive signals Dr1 and Dr2 as PWM signals, and transmit the motor drive signals Dr1 and Dr2 as commands to the motor drive circuits 701 and 702, respectively.

Each of the analog signal sampling portions 461 and 462 samples an analog signal.

Mainly assumed examples of the analog signal include detection values of the motor current Im1 and the motor current Im2 of the respective systems. The three-phase motor has the motor current Im1 and the motor current Im2 corresponding to U-phase current, V-phase current, and W-phase current of the coil sets 801 and 802, respectively. FIG. 7 includes arrows assuming a case where the acquired motor current Im1 and the motor current Im2 are detected by shunt resistors included in the motor drive circuits 701 and 702. FIG. 7 may further include arrows directed from outside the ECU 100 to the analog signal sampling portions 461 and 462, assuming a case where the motor current Im1 and the motor current Im2 are acquired by current sensors provided at the motor 80. As indicated by broken lines, the analog signal sampling portions 461 and 462 may acquire analog signals of the electrical angles θ1 and θ2, the steering torque trq1, and the steering torque trq2.

The analog signal sampling portions 461 and 462 are synchronized with the drive timing generators 441 and 442, and sample the analog signals at timing different from switch timing of the motor drive signals Dr1 and Dr2, respectively.

Figure 8:
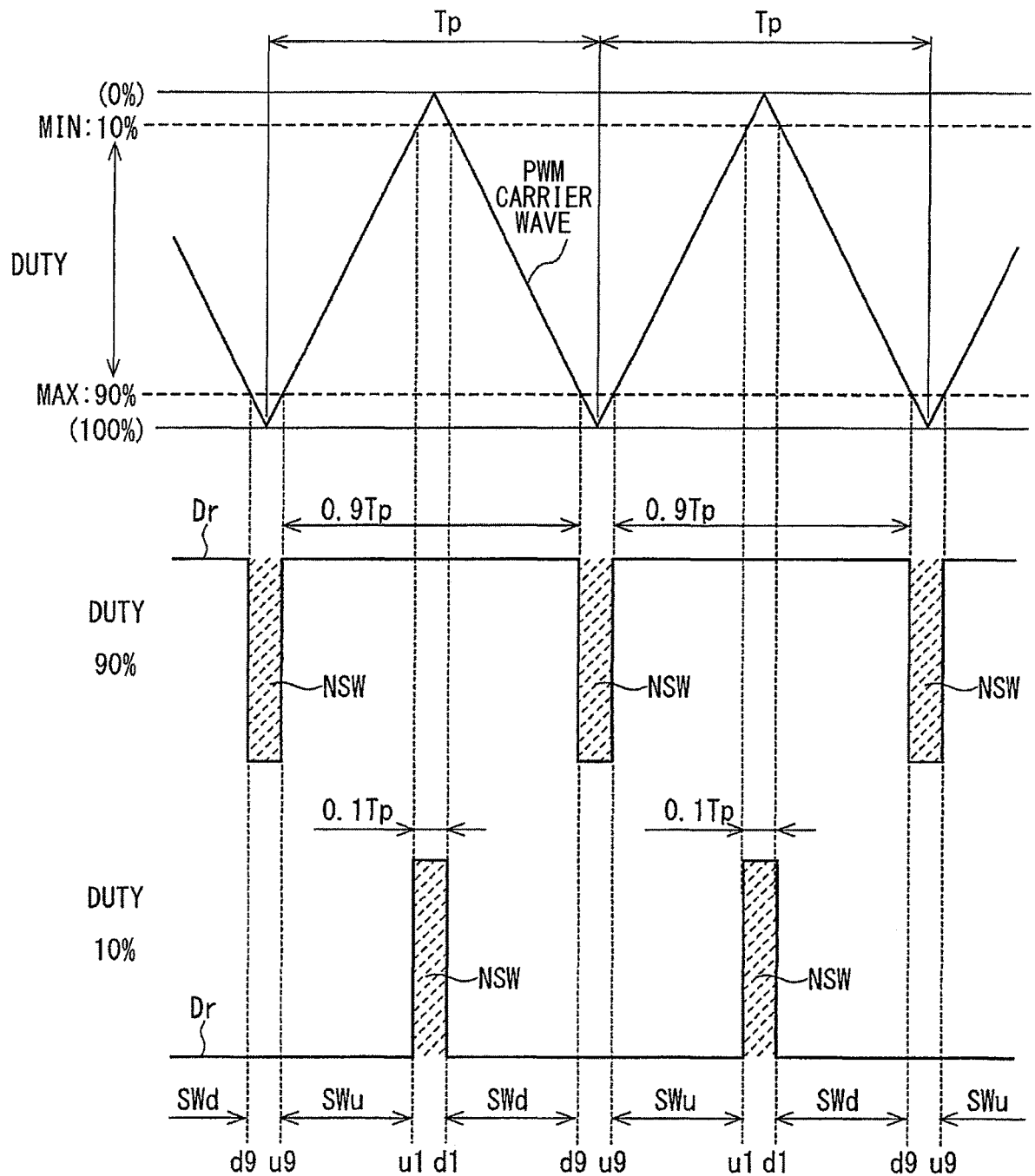
FIG. 8 is a chart indicating a relation between motor drive signals and analog signal sample timing.

FIG. 8 indicates generation of the motor drive signals Dr with use of a PWM carrier wave having a cycle Tp commonly applied to the respective phases. Examples of the assumed DUTY ratio include a value within a range from 10% to 90%, 0%, and 100%. The present description assumes that the DUTY ratio of 0% corresponds to peaks of the PWM carrier wave and the DUTY ratio of 100% corresponds to bottoms of the PWM carrier wave. The cycle Tp of the PWM carrier wave corresponds to a pulse cycle of the motor drive signal Dr.

At the DUTY ratio of 90%, the motor drive signal Dr has a pulse rising at time u9 and falling at time d9 with an ON period expressed as 0.9 Tp.

At the DUTY ratio of 10%, the motor drive signal Dr has a pulse rising at time u1 and falling at time d1 with the ON period expressed as 0.1 Tp.

At the DUTY ratio in the range from 10% to 90%, the motor drive signal Dr has a pulse rising during a period SWu from the time u9 to the time u1 and falling during a period SWd from the time d1 to the time d9. While the DUTY ratio is 0% or 100%, the pulse has neither rising nor falling. During "non-switching periods NSW" hatched by broken lines, the switching elements of all the phases have no switching of the motor drive signal Dr. The non-switching periods NSW in PWM control each correspond to a minute period including timing of the bottom or the peak of the carrier wave.

The pulse has rising or falling upon switching from the DUTY ratio other than 0% to 0% or switching from the DUTY ratio other than 100% to 100%. Switching can be avoided at carrier wave peak timing during the non-switching periods NSW by setting DUTY ratio switch timing at carrier wave bottom timing. In contrast, switching can be avoided at carrier wave bottom timing during the non-switching periods NSW by fixing the DUTY ratio switch timing at carrier wave peak timing. Furthermore, in a case where the DUTY ratio is set to be switched once in N times of bottom or peak timing of the PWM carrier wave, switching will not occur during (N−1) times of bottom or peak timing with no DUTY ratio switching.

In view of this, the analog signal sampling portions 461 and 462 are synchronized with the drive timing generators 441 and 442 and sample at timing with no DUTY ratio switching to 0% or 100% during the non-switching periods NSW. This suppresses influence of switching noise to a sampled signal to improve sampling accuracy.

More specifically, sampling is preferably executed after elapse of decay time of surge voltage generated by switching.

According to the basic mode of the first embodiment, the first microcomputer 401 includes a synchronization signal generator 411 whereas the second microcomputer 402 includes a timing corrector 422. The first microcomputer 401 functions as a "synchronization signal transmitter microcomputer" that transmits a synchronization signal whereas the second microcomputer 402 functions as a "synchronization signal receiver microcomputer" that receives the synchronization signal. Each of the microcomputers 401 and 402 will call the microcomputer itself by the "own microcomputer".

The synchronization signal generator 411 in the first microcomputer 401 generates a synchronization signal that is synchronized with the drive timing generated by the drive timing generator 441 in the own microcomputer and synchronizes drive timing of the two microcomputers 401 and 402. The synchronization signal generator 411 transmits the synchronization signal to the second microcomputer 402 via the synchronization signal line 471.

The timing corrector 422 in the second microcomputer 402 receives the synchronization signal from the first microcomputer 401, and corrects the drive timing generated by the drive timing generator 442 in the own microcomputer to be synchronized with the received synchronization signal. This correction will be called "timing correction". As indicated by broken lines in the second microcomputer 402 in FIG. 7, timing correction includes transmission of a timing correction command from the timing corrector 422 to the drive timing generator 442, and correction of the drive timing according to the timing correction command by the drive timing generator 442.

JP 5412095 B2 (corresponding to an example of a related art) discloses a configuration in which "the second microcomputer 402 corrects the drive timing in accordance with the synchronization signal transmitted from the first microcomputer 401". In comparison to this related art, the basic mode of the first embodiment provides a timing determiner 432 that is further included in the timing corrector 422 and functions as a "received signal determiner".

Before the timing determiner 432 is described next, points solved by the related art and difficulties unsolved by the related art will be described with reference to FIGS. 9 to 11.

Figure 9:
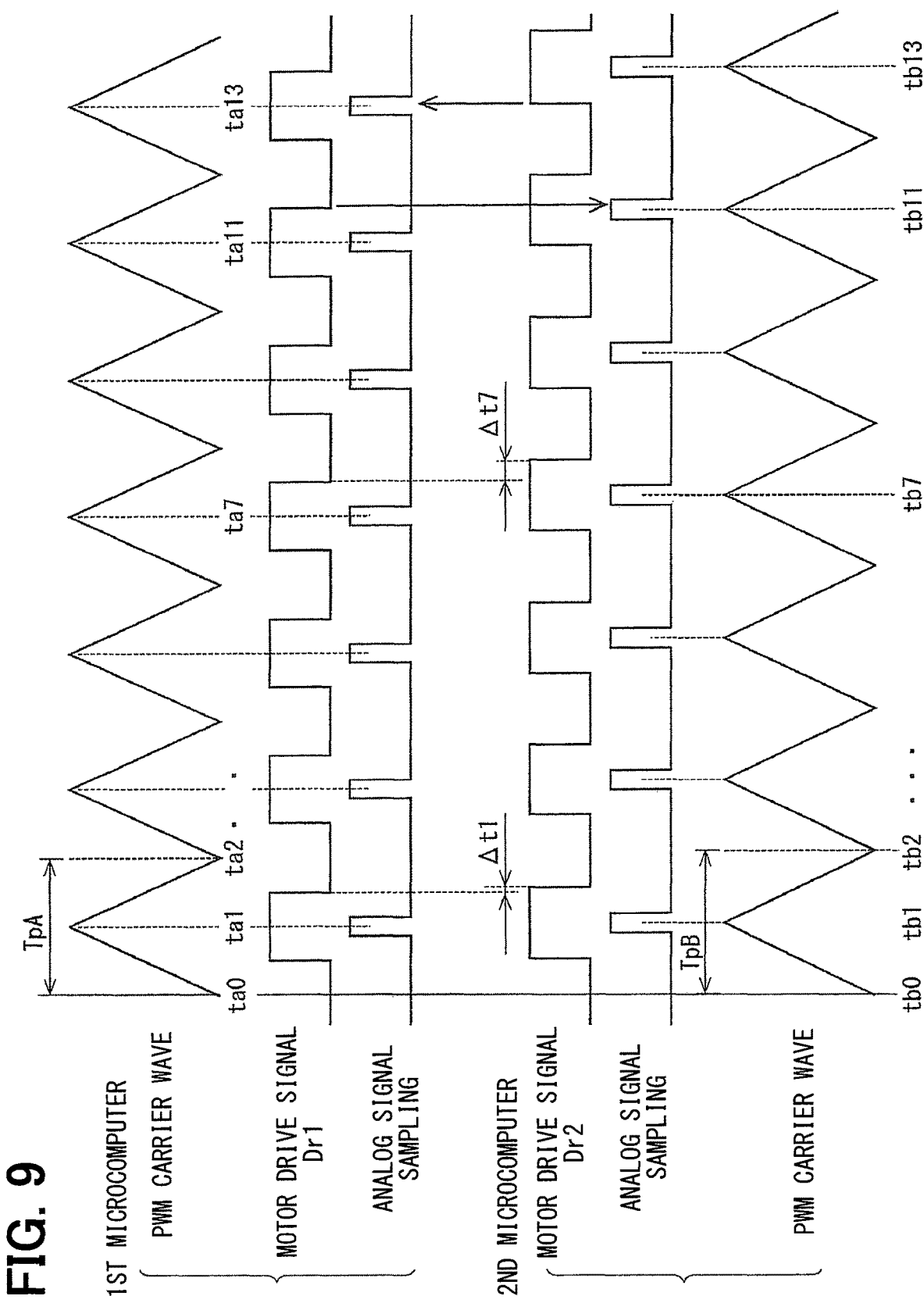
FIG. 9 is a timing chart indicating a clock shift between microcomputers of two systems.

FIG. 9 indicates a gradual shift of timing of the motor drive signals Dr1 and Dr2 of the two microcomputers 401 and 402 due to production variation or the like between the clock generation circuits 651 and 652.

Timing charts in FIG. 9 and subsequent figures indicate a pulse cycle of the first motor drive signal Dr1 denoted by TpA and a pulse cycle of the second motor drive signal Dr2 denoted by TpB. The first microcomputer 401 has a PWM carrier wave having bottom timing and peak timing alternately appearing from reference time ta0 and denoted in sequence by ta1, ta2, . . . . Similarly, the second microcomputer 402 has a PWM carrier wave having bottom timing and peak timing alternately appearing from reference time tb0 and denoted in sequence by tb1, tb2, . . . . The reference time ta0 and the reference time tb0 agree with each other.

The pulse cycles have a relation expressed as TpA<TpB after the reference time ta0 and tb0, so that the second motor drive signal Dr2 is gradually delayed from the first motor drive signal Dr1. A first cycle causes a relatively small timing shift $\Delta t1$. Such a timing shift gradually cumulates to be as large as $\Delta t7$ in a fourth cycle. Increase in timing shift causes torque pulsation as disclosed in the related art.

After timing ta11 in FIG. 9, the first motor drive signal Dr1 has fall timing matching analog signal sample timing of the second microcomputer 402. After the timing tb11, the second motor drive signal Dr2 has rise timing matching analog signal sample timing of the first microcomputer 401. Sample timing matching a pulse edge of the motor drive signal Dr1 or Dr2 has deterioration in sampling accuracy due to switching noise.

The related art discloses connecting the two microcomputers 401 and 402 via the synchronization signal line 471 and correcting an arithmetic timing shift in accordance with a synchronization signal. This method is indicated in FIG. 10.

Figure 10:
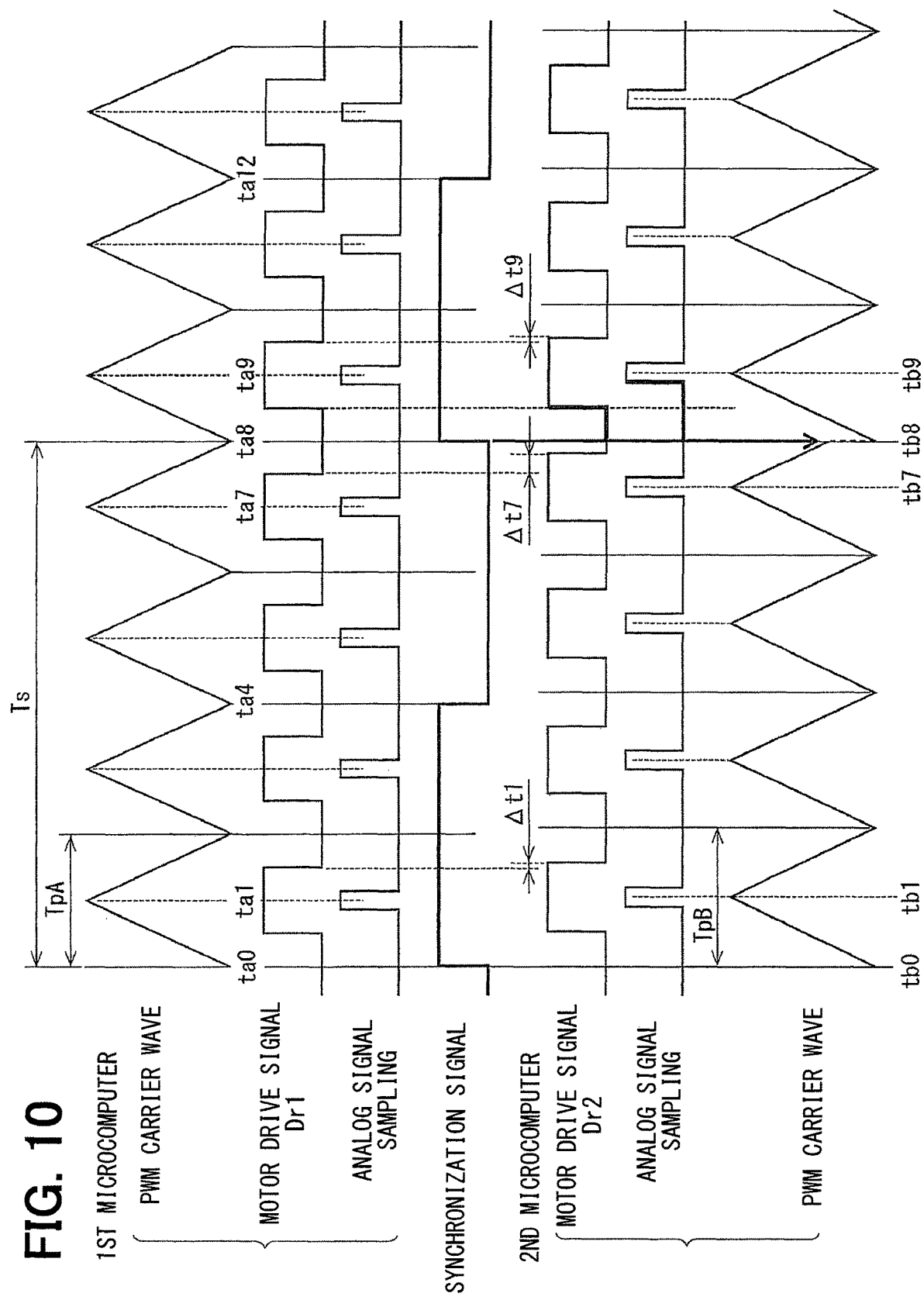
FIG. 10 is an explanatory timing chart indicating timing correction according to a synchronization signal (a related art)

As in FIG. 10, the synchronization signal is generated as a pulse signal having a cycle Ts corresponding to four times of the pulse cycle TpA of the first motor drive signal Dr1. The pulse repetitively rises or falls at every fourth one of bottom timing and peak timing of the PWM carrier wave. The pulse rises at the timing ta0 and timing ta8 and falls at timing ta4 and ta12. FIG. 10 exemplifies timing correction of the second microcomputer 402 to be synchronized with the pulse rise timing ta0 and ta8.

Specifically, timing correction is executed after the timing shift $\Delta t7$ cumulates as in FIG. 9, to match timing tb8 of the second microcomputer 402 with the pulse rise timing ta8 of the synchronization signal.

The timing shift is reset to zero at the timing tb8, so that a subsequent single cycle causes a timing shift $\Delta t9$ suppressed to be substantially equal to the initial timing shift $\Delta t1$. Drive timing is corrected to be synchronized before a timing shift grows to cause torque pulsation or affect sampling accuracy, for continuation of excellent motor drive. A specific synchronization method is not limited to that exemplified in FIG. 10 and may be set appropriately.

In this manner, in the ECU including multiple microcomputers that operates in accordance with the clocks generated by the clock generation circuits independent from each other, timing correction is executed between multiple microcomputers with use of the synchronization signal to achieve motor drive with control timing synchronized between multiple microcomputers. This configuration suppresses torque pulsation. This configuration further prevents analog signal sample timing from matching the switch timing of the motor drive signals Dr1 and Dr2.

The transmitted synchronization signal is, however, not always normal. Specifically, the first clock generation circuit 651 configured to operate the first microcomputer 401, the synchronization signal generator 411 in the first microcomputer 401, or the synchronization signal line 471 may be in failure or the like to cause abnormality of the transmitted synchronization signal itself. A difficulty arising upon reception of an abnormal synchronization signal by the second microcomputer 402 will be described next.

Figure 11:
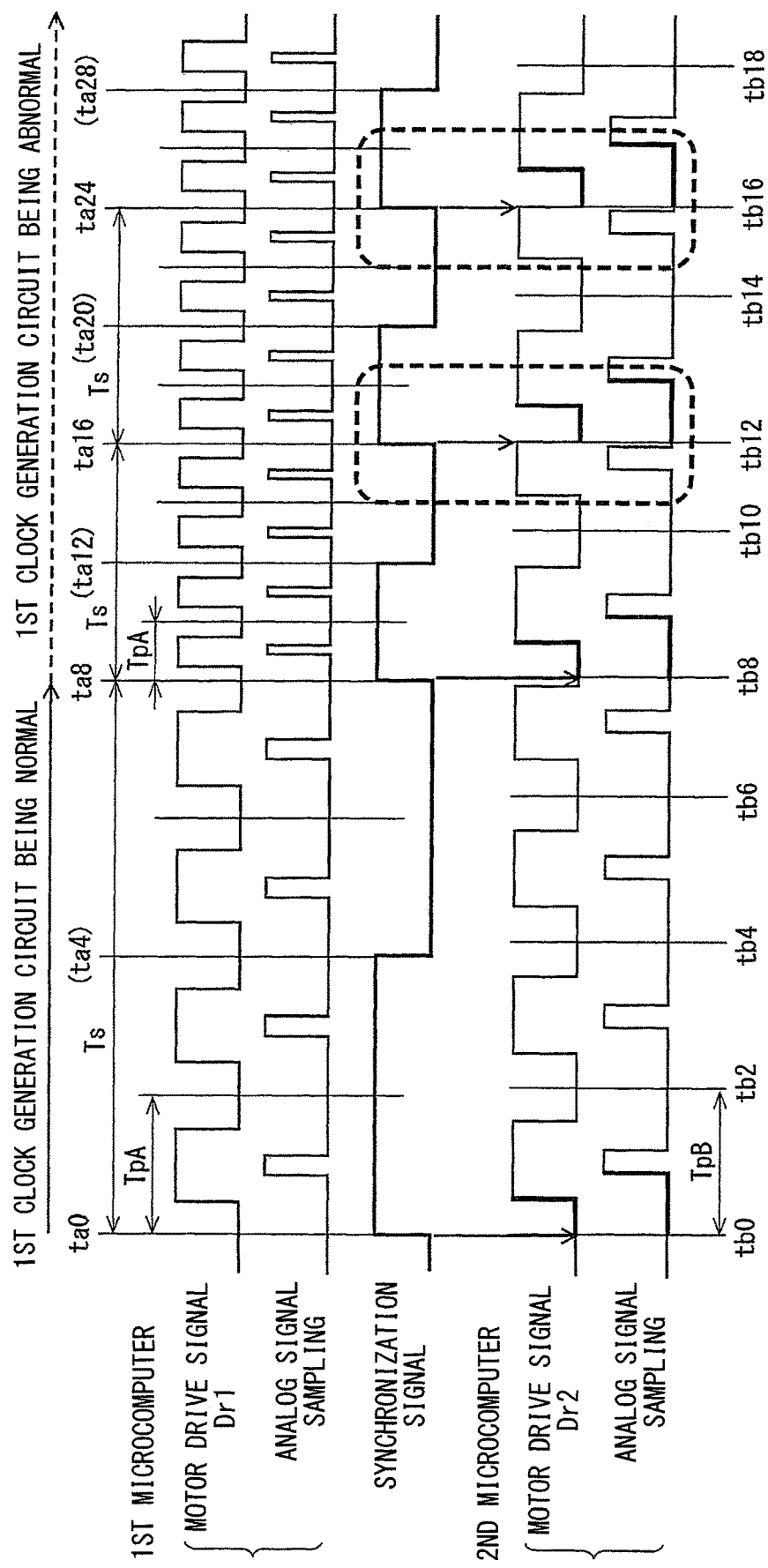
FIG. 11 is an explanatory timing chart indicating a difficulty of the related art upon synchronization signal abnormality.

FIG. 11 indicates an assumed defect upon abnormality of the first clock generation circuit 651 configured to operate the first microcomputer 401.

As indicated in FIG. 11, the clock generation circuit 651 operates normally from the reference time ta0 to the timing ta8, but has increase in clock frequency from the timing ta8 to abnormally shorten the pulse cycle TpA of the first motor drive signal Dr1. Along therewith, a synchronization signal generated in accordance with the clock generated by the clock generation circuit 651 is increased in frequency to shorten the cycle Ts.

If control arithmetic fails to follow such an increased clock frequency in this case, the first microcomputer 401 has control breakdown to cause unavoidable motor drive stop.

Meanwhile, the second microcomputer 402 operates normally and the pulse cycle TpB of the second motor drive signal Dr2 is kept constant. Assume a case of correcting drive timing of the second microcomputer 402 at synchronization signal pulse rise timing ta0, ta8, ta16, and ta24. At the timing ta16 and ta24 surrounded with broken lines, timing correction is executed while the second motor drive signal Dr2 is ON to be forcibly switched OFF.

This may cause generation of an unintended pulse and unstable switching control of the second motor drive circuit 702. This may also cause uneven analog signal sampling intervals to adversely affect sampling accuracy.

Such a situation where failure caused at the first system controller 601 affects operation of the microcomputer 402 in the other system will be referred to as "failure propagation". FIG. 11 exemplifies a serious situation where the second microcomputer 402 executes timing correction according to the abnormal synchronization signal transmitted from the first microcomputer 401 to disable motor drive that should be executed normally only by the second system.

The motor control apparatus is redundantly configured to include the two systems originally in order to achieve continuous motor drive according to operation of a normal one of the systems even in a case where the other one of the systems has abnormality. However, such an object is never achieved upon failure propagation.

The electric power steering apparatus 90 particularly requires continuous motor drive for prevention of assist function stop, even upon torque pulsation and deterioration in analog signal sampling accuracy. The related art may cause failure propagation.

In order to solve such a difficulty, in the ECU 100 according to the basic mode of the first embodiment, the timing corrector 422 in the second microcomputer 402 includes the timing determiner 432 that functions as the "received signal determiner" and executes "received signal determination" of whether a received synchronization signal is normal or abnormal.

The second microcomputer 402 permits timing correction in a case where the timing determiner 432 determines normality of the received synchronization signal. In another case where the synchronization signal is determined as being abnormal, the second microcomputer 402 prohibits timing correction and drives the motor asynchronously with the first microcomputer 401.

In summary, the synchronization signal receiver microcomputer initially determines whether the synchronization signal transmitted from the synchronization signal transmitter microcomputer and possibly causing failure propagation is normal. In a case where the synchronization signal is determined as being normal, drive timing of the synchronization signal receiver microcomputer is corrected to be synchronized with drive timing of the synchronization signal transmitter microcomputer to achieve excellent motor drive.

In another case where the synchronization signal is determined as being abnormal, timing correction is not executed to preferentially prevent failure propagation. The synchronization signal receiver microcomputer should be disconnected from the synchronization signal transmitter microcomputer and continue asynchronous motor drive, for continuation of the minimum assist function.

A format of "timing determination" executed as "received signal determination" by the timing determiner 432 will be described next with reference to FIGS. 12 to 14.

The basic mode of the first embodiment provides a method of determining whether the received synchronization signal has a pulse edge, i.e. rise or fall timing, included in a "synchronization permissive interval". The "synchronization permissive interval" may alternatively be called "correction permissive interval". Hereinafter, "reception timing of the pulse edge of the synchronization signal" will simply be called "synchronization signal reception timing".

Figure 12:
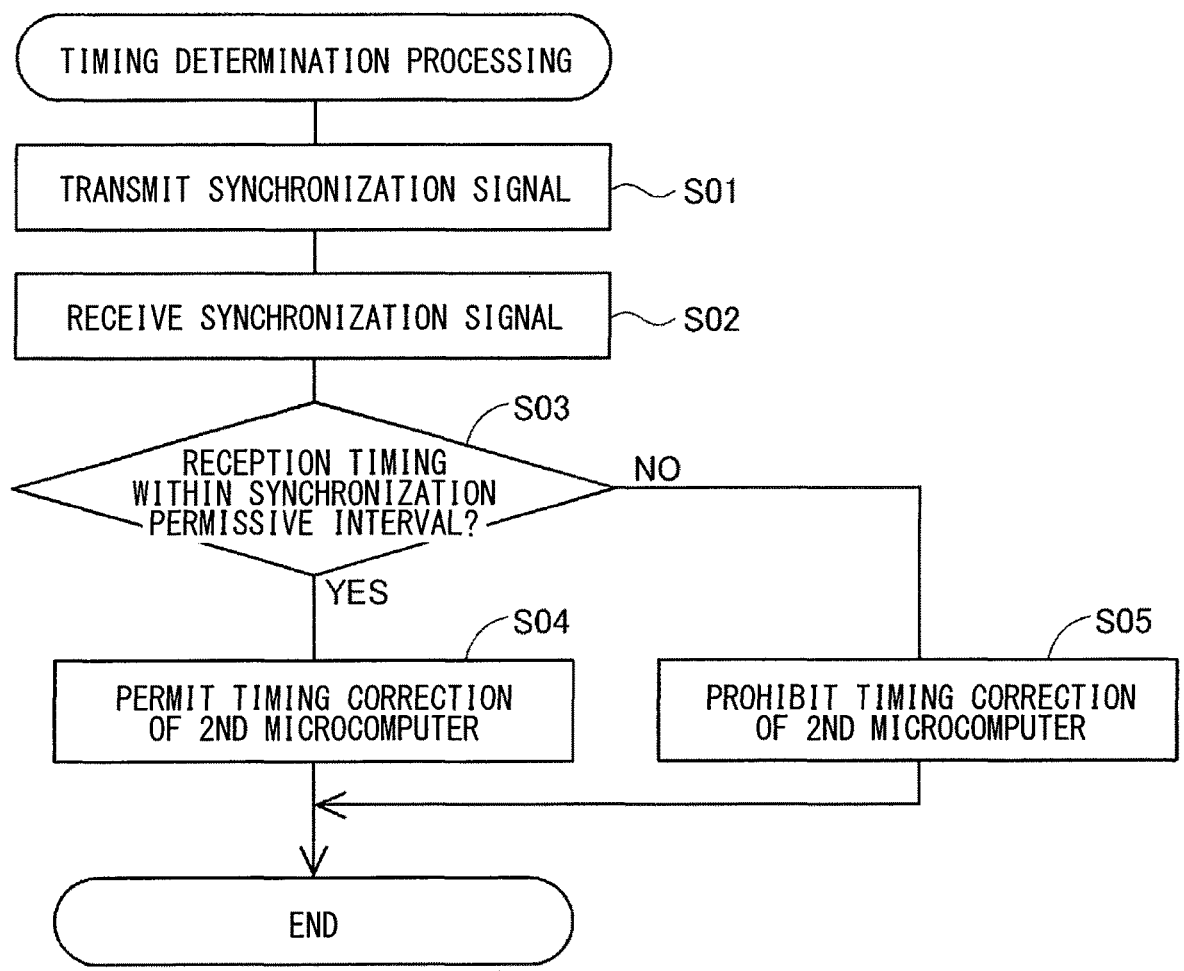
FIG. 12 is a flowchart of timing determination processing according to the basic mode of the first embodiment.

FIG. 12 is a flowchart of the timing determination processing in a motor control method. The flowcharts to be referred to hereinafter include sign "S" indicating a step. Assume that steps in the flowcharts of FIGS. 12 and 15 to 18 excluding S01 in FIG. 12 are executed by the timing corrector and the timing determiner in the synchronization signal receiver microcomputer, or the entire synchronization signal receiver microcomputer.

In a synchronization signal transmission S01 in FIG. 12, the synchronization signal generator 411 in the first microcomputer 401 transmits a synchronization signal to the second microcomputer 402.

In a synchronization signal reception S02, the timing corrector 422 receives the synchronization signal.

In a received signal determination S03, the timing determiner 432 determines whether synchronization signal reception timing is included in the synchronization permissive interval, for determination of whether the synchronization signal is normal or abnormal.

If YES in S03, the second microcomputer 402 permits timing correction of the second microcomputer 402 in a timing correction permission S04. The first microcomputer 401 and the second microcomputer 402 then synchronously drive the motor 80. This is called a "synchronous drive mode".

If NO in S03, the received synchronization signal is determined as being abnormal. The second microcomputer 402 prohibits timing correction of the second microcomputer 402 in a timing correction prohibition S05, and drives the motor 80 asynchronously with the first microcomputer 401.

Exemplary setting of the synchronization permissive interval will be described next. Assume a case in FIG. 10 or the like of generating a pulse of the synchronization signal at bottom or peak timing of the PWM carrier wave. As indicated in FIG. 8, timing of the synchronization signal does not match switch timing of the motor drive signals Dr in this case.

In a case where the motor drive signals Dr1 and Dr2 have a timing shift ideally equal to zero, the timing corrector 422 receives the synchronization signal at timing matching bottom or peak timing of the PWM carrier wave of the second microcomputer 402. The maximum range of a clock shift while the clock generation circuits 651 and 652 operate normally is estimated in such an ideal state.

Assume an exemplary case where the clock generation circuits 651 and 652 generate clocks varied at most by ±x % and timing is corrected in accordance with the synchronization signal at the cycle Ts [s].

In this case, the microcomputer 401 and 402 have internally counted time varied from the original clocks generated by the clock generation circuits 651 and 652 within a range from at least "(100−x)/100" times to at most "(100+x)/100" times.

The microcomputers 401 and 402 thus have a maximum shift amount ΔTmax [s] generated in a single synchronization cycle and expressed by Equation 1.

$$\Delta T_{max} = T_s \times \{(100+x) - (100-x)\}/100 = T_s \times 2x/100 \quad \text{(Equation 1)}$$

The synchronization permissive interval needs to be set to be equal to or more than the shift amount ΔTmax for prevention of erroneous correction prohibition during normal drive. The synchronization permissive interval is set to be also within system permissive time to enable appropriate timing determination processing.

Assume an exemplary case where the synchronization cycle Ts is 1 ms and the clock generation circuits 651 and 652 generate clocks varied maximally within ±1%. The maximum shift amount ΔTmax [s] generated from certain synchronization to subsequent synchronization is 0.02 [ms] as obtained in accordance with Equation 1.

$$\Delta T_{max} = 1[ms] \times (2 \times 1/100) = 0.02[ms]$$

Figure 13:
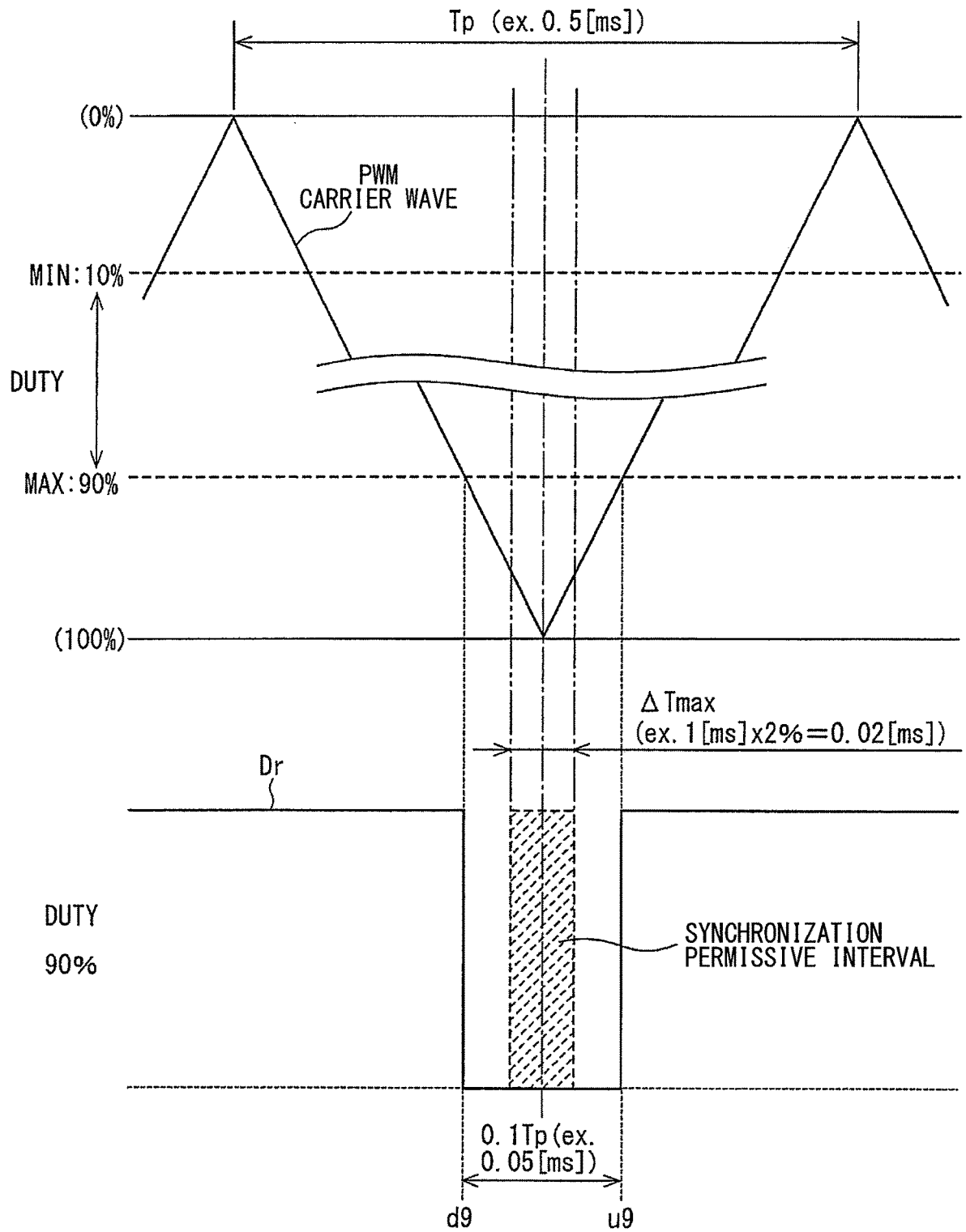
FIG. 13 is an explanatory chart indicating a synchronization permissive interval exemplarily set in accordance with the basic mode of the first embodiment.

As indicated in FIG. 13, assume that the PWM carrier wave cycle Tp is 0.5 [ms] and the DUTY ratio is in the range from 10% to 90%. In a case of driving at the DUTY ratio of 90%, the non-switching period from the falling time d9 to the subsequent rising time u9 of the motor drive signal Dr is 0.1 Tp or 0.05 [ms].

In another case where the synchronization permissive interval is set to have 0.02 [ms] as the maximum shift amount ΔTmax, having 0.01 [ms] each before and after bottom timing of the PWM carrier wave, the synchronization permissive interval is reliably included in the non-switching period of 0.05 [ms].

In view of this, if the clock generation circuits 651 and 652 generate clocks varied maximally within ±1%, the synchronization permissive interval is set to at least 2% of the synchronization signal cycle Ts to prevent erroneous correction prohibition during normal drive. The microcomputers 401 and 402 can keep driving synchronously with each other while drive timing is synchronized therebetween.

Variation between the clocks exceeding ±1% due to failure of the second clock generation circuit 652 can be detected by the second clock monitoring portion 662. The second microcomputer 402 is thus assumed to have a correctly set synchronization permissive interval.

The synchronization permissive interval, which is set during the non-switching period of the motor drive signal Dr at the maximum DUTY ratio, prevents a pulse being ON from being forcibly switched OFF due to timing correction. Even if an abnormal synchronization signal enters the synchronization permissive interval at timing different from expected synchronization timing, the motor drive signal Dr can secure a pulse width at the maximum DUTY ratio for achievement of operation without any difficulties.

Overmodulation control of output at a DUTY ratio in the range from 10% to 90% as well as at 0% and at 100% may match synchronization signal reception timing with DUTY ratio switch timing. Such a case has simple synchronization with DUTY ratio switch timing. The DUTY ratio kept at 100% or the like has no switch OFF timing, and synchronization at any timing thus has no actual influence.

In a case where DUTY ratio is switched from a value other than 100% to 100%, a normal pulse width ends completely at the DUTY ratio before the switching, and output at the DUTY ratio of 100% then starts simply at earlier or later timing. In another case where DUTY ratio is switched from 100% to a value other than 100%, output at the DUTY ratio of 100% ends at earlier or later timing with no influence on a period of output at the subsequent DUTY ratio. None of these cases has output at an abnormal DUTY ratio with slight influence on motor drive. The same applies to output at the DUTY ratio of 0% with output simply switched between ON and OFF at the DUTY ratio of 100%.

Figure 14:
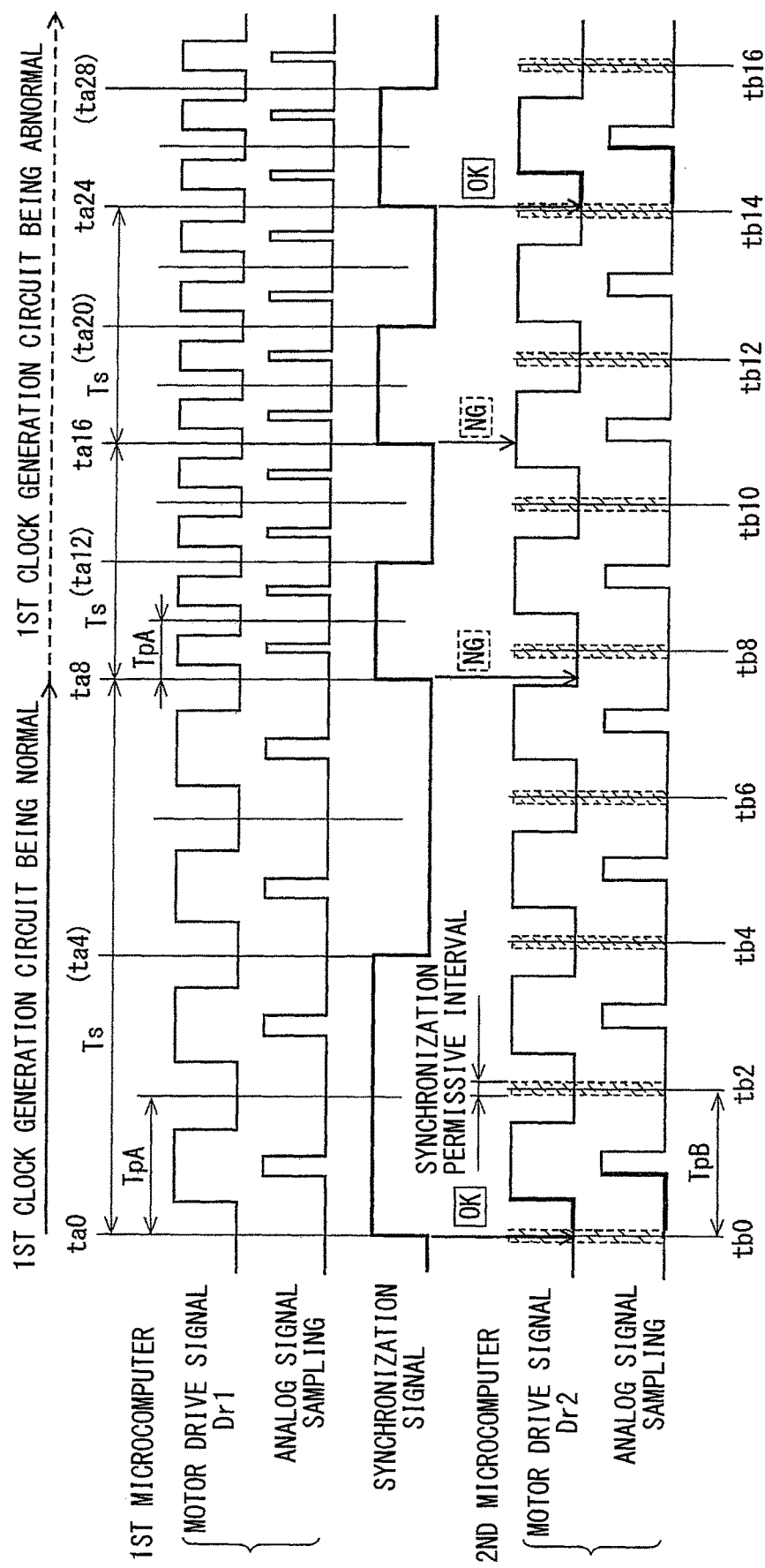
FIG. 14 is a timing chart upon synchronization signal abnormality according to the basic mode of the first embodiment.

FIG. 14 is a timing chart indicating timing determination upon synchronization signal abnormality according to the synchronization permissive interval exemplified above. FIG. 14 indicates results of timing determination at the pulse rise timing ta8, ta16, and ta24 of the synchronization signal when the first clock generation circuit 651 has abnormality as in FIG. 11. Timing of the synchronization signal within one of the synchronization permissive intervals is indicated by "OK" whereas timing outside the synchronization permissive intervals is indicated by "NG".

Synchronization signal reception timing is out of the synchronization permissive interval at the timing ta8 and ta16, so that the timing corrector 422 does not execute timing correction. The second microcomputer 402 drives the motor 80 asynchronously with the first microcomputer 401 in this case.

The second microcomputer 402 can thus prevent failure propagation from the first microcomputer 401. Particularly at the timing ta16, the motor drive signal Dr2 being ON is prevented from being forcibly switched OFF due to timing correction according to the abnormal synchronization signal.

Synchronization signal reception timing is included in the synchronization permissive interval at the timing ta24, so that the timing corrector 422 executes timing correction. Even if the cycle Ts of the synchronization signal is abnormal, rise itself at the timing ta24 is substantially at normal timing. Even if the timing corrector 422 executes timing correction in accordance with the received synchronization signal, such timing correction will have substantially no influence on the motor drive signal Dr2.

As described above, according to the basic technical idea of the basic mode of the first embodiment, the timing determiner 432 in the second microcomputer 402 determines normality or abnormality of the synchronization signal transmitted from the first microcomputer 401.

When the received synchronization signal is determined as being normal, the second microcomputer 402 permits timing correction and drives the motor 80 synchronously with the first microcomputer 401. This suppresses torque pulsation of the motor 80. This also prevents sample timing of the analog signal sampling portions 461 and 462 from matching switch timing of the motor drive signals Dr1 and Dr2. In a case where the synchronization signal has a square wave at the DUTY ratio of 50%, its rise timing and fall timing are included in the non-switching periods NSW, with side effect of reduction in influence of synchronization signal switching to the analog signals.

In another case where the received synchronization signal is determined as being abnormal, the second microcomputer 402 prohibits timing correction and drives the motor asynchronously with the first microcomputer 401. This prevents control breakdown of the second microcomputer 402 due to failure propagation from the first microcomputer 401.

Particularly in the electric power steering apparatus 90, at least the normal second microcomputer 402 continuously drives the motor for continuation of the assist function.

Switching of the motor drive signals Dr1 and Dr2 may affect analog signal sampling as well as the synchronization signal. Assume a case where the synchronization signal is affected by switching of the motor drive signal Dr1 or Dr2 and has an erroneous pulse edge. In an ordinary format having no synchronization permissive interval, the synchronization signal receiver microcomputer recognizes pulse rise at unexpected timing to cause erroneous timing correction.

The format according to the basic mode of the first embodiment with the synchronization permissive interval being set during the non-switching period NSW is expected to be effective also to this difficulty. Specifically, the motor drive signals Dr1 and Dr2 are always switched outside the synchronization permissive interval in the configuration according to the basic mode of the first embodiment. Even when the synchronization signal is affected to cause an erroneous pulse edge, the pulse edge has timing expected to be out of the synchronization permissive interval. Even when the synchronization signal receiver microcomputer recognizes such a pulse edge of the synchronization signal caused by switching of the motor drive signal Dr1 or Dr2, the pulse edge is out of the synchronization permissive interval and can thus be determined as abnormal synchronization timing. This prevents the synchronization signal receiver microcomputer from executing timing correction at erroneous timing.

Various application processing according to the basic mode of the first embodiment will be described next with reference to FIGS. 15 to 18.

Processing Upon Booting

Assume a case where the microcomputers boot independently and start driving the motor at different drive timing. Even when the motor is driven normally, synchronization signal reception timing is not included in the synchronization permissive interval and timing correction may thus not be permitted. Processing upon booting depicted in FIGS. 15 and 16 will accordingly be executed upon booting the synchronization signal receiver microcomputer.

Figure 15:
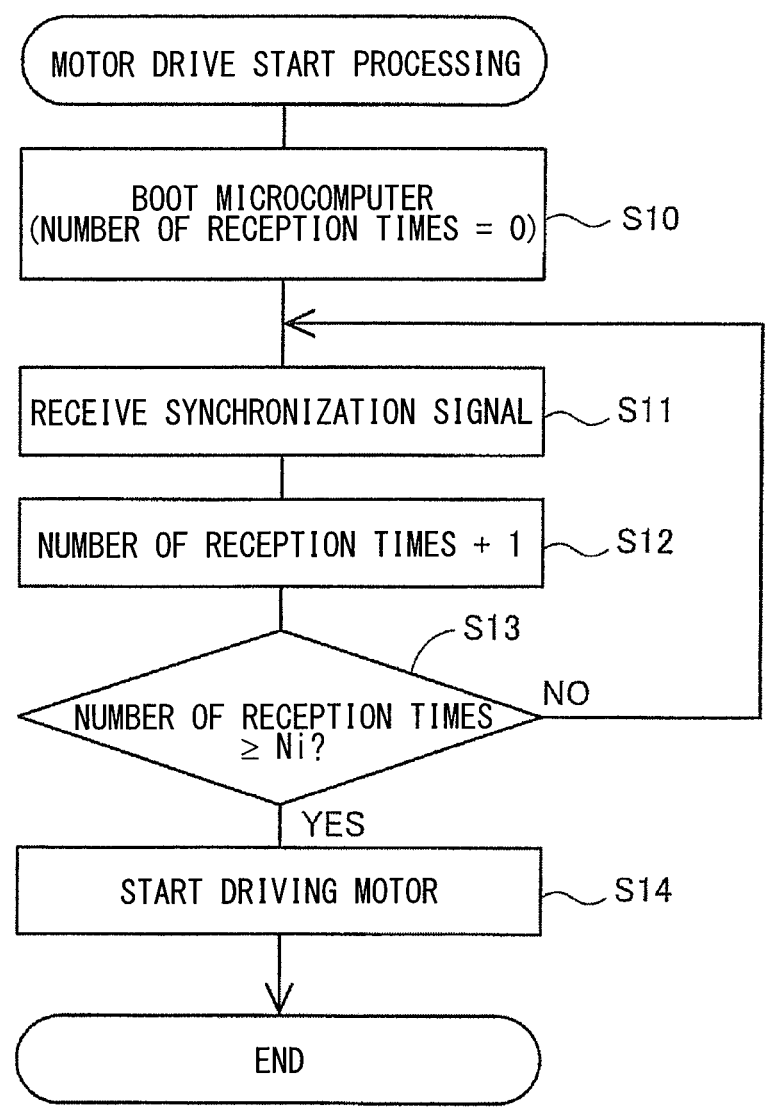
FIG. 15 is a flowchart of motor drive start processing upon microcomputer booting.

FIG. 15 is a flowchart of motor drive start processing upon microcomputer booting.

In S10, the second microcomputer 402 as the receiver microcomputer boots. The number of reception times upon booting has an initial value of zero. The timing corrector 422 receives a synchronization signal in S11 and increments the number of reception times in S12. S13 includes determination of whether the number of reception times has reached an initial number of times Ni (≥2).

If YES in S13, the second microcomputer 402 starts driving the motor in S14. If NO in S13, the process flow returns to before S11.

The synchronization signal receiver microcomputer stands by for motor drive start until receiving the synchronization signal from the synchronization signal transmitter microcomputer Ni times, and starts driving the motor synchronously with the synchronization signal transmitter microcomputer when receiving the synchronization signal Ni times. This enables appropriate synchronous drive start after multiple microcomputers get ready for synchronization.

Figure 16:
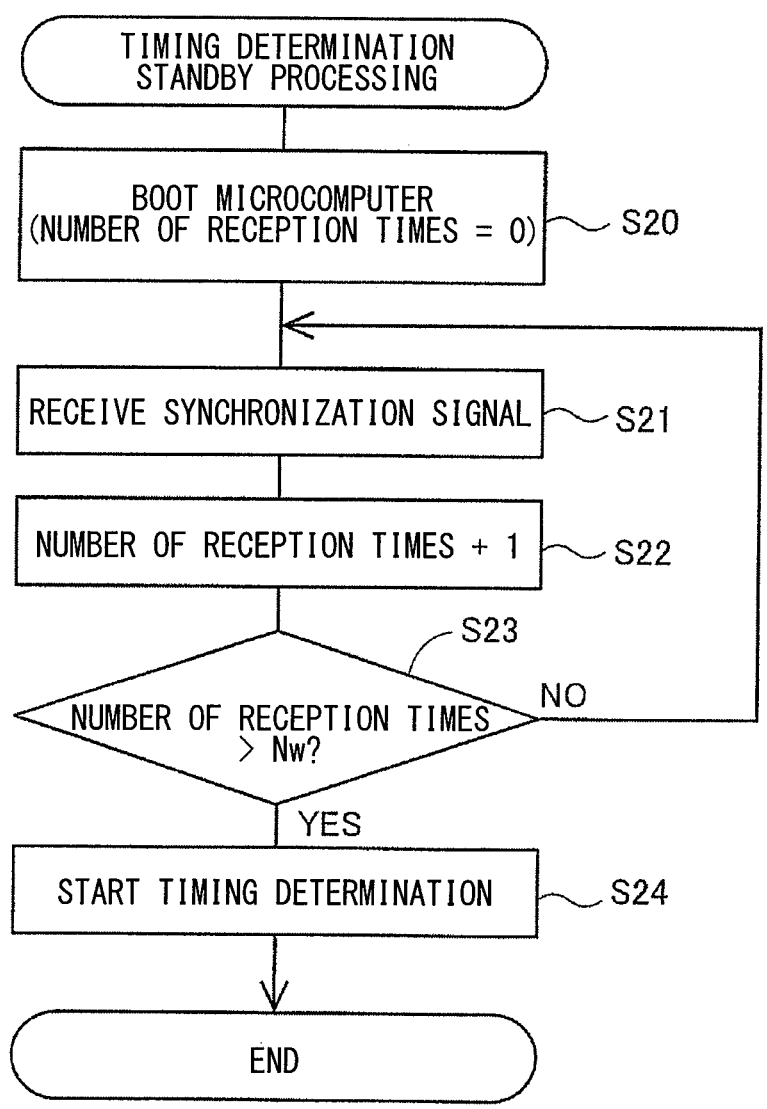
FIG. 16 is a flowchart of timing determination standby processing upon microcomputer booting.

FIG. 16 is a flowchart of timing determination standby processing upon microcomputer booting.

S20 to S22 are similar to S10 to S12 depicted in FIG. 15.

S23 includes determination of whether the number of reception times has exceeded a predetermined number of standby times Nw (≥1).

If YES in S23, the timing determiner 432 starts timing determination in S24. If NO in S23, the process flow returns to before S21.

The synchronization signal receiver microcomputer having booted permits timing correction without any condition until the synchronization signal is received Nw times. Timing determination is started as to the synchronization signals received (Nw+1)-th time and later. This appropriately prevents excessive prohibition of timing correction immediately after booting.

Restoration Processing

Even in a case where the synchronization signal transmitter microcomputer is reset or reinitialized to operate normally after transition to asynchronous drive due to temporary synchronization signal abnormality, synchronous drive will not restart directly. Restoration processing depicted in FIG. 17 will accordingly be executed.

Figure 17:
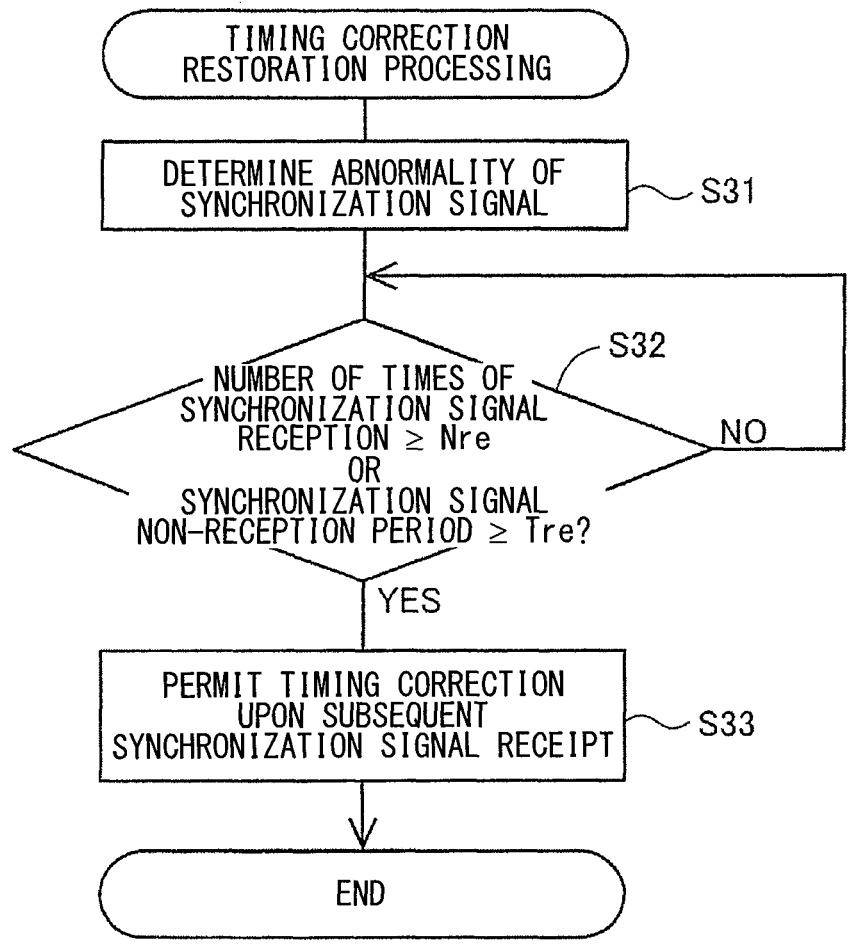
FIG. 17 is a flowchart of timing correction restoration processing after synchronization signal abnormality determination.

FIG. 17 is a flowchart of timing correction restoration processing after synchronization signal abnormality determination.

In S31, the timing corrector 422 determines the synchronization signal as being abnormal because synchronization signal reception timing is out of the synchronization permissive interval.

S32 includes determination of whether the number of times of synchronization signal reception after abnormality determination has reached a predetermined number of restoration times Nre (≥2), or whether no synchronization signal is received for predetermined restoration time Tre.

If YES in S32, the timing corrector 422 cancels timing correction prohibition in S33. Timing correction is permitted if reception timing is included in the synchronization permissive interval and the synchronization signal is determined as being normal after subsequent synchronization signal reception.

Abnormality Confirmation Processing

The synchronization signal may be erroneously determined as being abnormal because synchronization signal reception timing is out of the synchronization permissive interval due to temporary synchronization signal pulse disorder or the like, even though the synchronization signal transmitter microcomputer has no substantial abnormality. Timing correction may be prohibited excessively in this case. Abnormality confirmation processing depicted in FIG. 18 will accordingly be executed.

Figure 18:
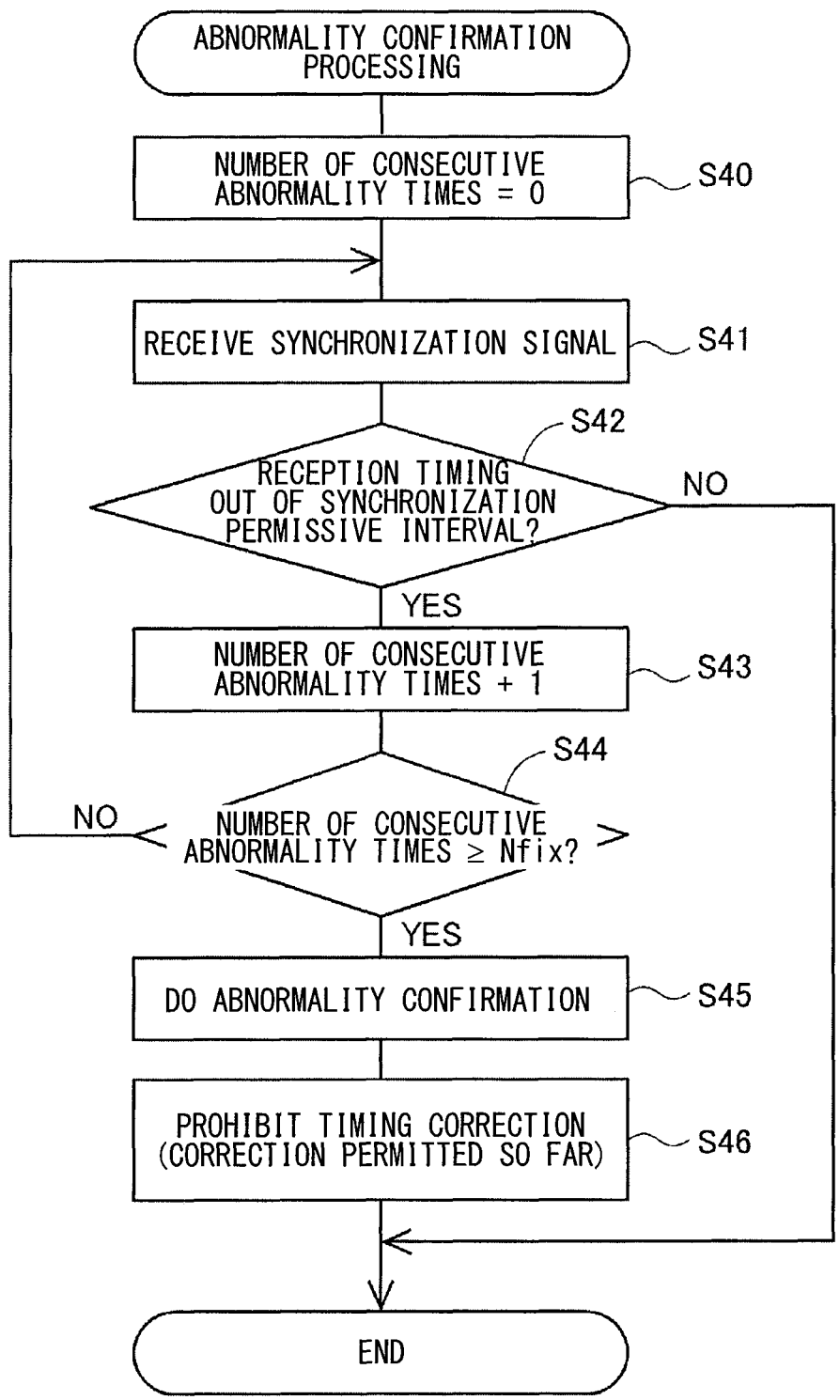
FIG. 18 is a flowchart of synchronization signal abnormality confirmation processing.

FIG. 18 is a flowchart of synchronization signal abnormality confirmation processing.

In S40, the timing determiner 432 sets, to zero, an initial value of the number of consecutive abnormality times as "the number of consecutive times of synchronization signal abnormality determination".

In S41, the timing corrector 422 receives the synchronization signal.

In S42, the timing determiner 432 determines whether synchronization signal reception timing is out of the synchronization permissive interval. If the synchronization signal is normal and if NO in S42, the processing ends. In this case, timing correction is executed in S04 in FIG. 12.

If YES in S42, the number of consecutive abnormality times is incremented in S43.

S44 includes determination of whether the number of consecutive abnormality times has reached a predetermined number of confirmation times Nfix. If YES in S44, the process flow proceeds to S45. If NO in S44, the process flow returns to before S41.

When the timing determiner 432 confirms synchronization signal abnormality in S45, the timing corrector 422 prohibits timing correction in S46. In other words, timing correction may be permitted and the second microcomputer 402 may continuously drive synchronously with the first microcomputer 401 until abnormality is confirmed. This prevents erroneous timing determination.

First Embodiment

The first embodiment will be described with reference to FIGS. 19 to 35, in accordance with the basic mode described above.

FIG. 19 depicts a configuration of the ECU 101 according to the first embodiment. As in FIG. 7 according to the basic mode, FIG. 19 depicts constituent elements of the first system each having "1" at the end of the reference sign, and constituent elements of the second system each having "2" at the end of the reference sign. In the following description, constituent elements or signals will have names beginning with "first" or "second" for distinction between the constituent elements for the respective systems, and common matters will be described collectively.

The present description provides, as control of microcomputers, "synchronous control" of control by multiple microcomputers 401 and 402 operating synchronously, and "asynchronous control" of control by multiple microcomputers 401 and 402 operating asynchronously and independently from each other. The microcomputers 401 and 402 operate to drive the motor 80 in one of the following three drive modes.

(1) a "synchronous drive mode" of driving the motor synchronously by the first microcomputer 401 and the second microcomputer 402

(2) an "asynchronous drive mode" of driving the motor by the first microcomputer 401 and the second microcomputer 402 asynchronously with each other, not in accordance with the synchronization signal (3) a "single system drive mode" of driving the motor by only one of the microcomputers 401 and 402

The synchronous drive mode is adopted when the microcomputers 401 and 402 control synchronously. The asynchronous drive mode or the single system drive mode is adopted when the microcomputers 401 and 402 control asynchronously. At the start of asynchronous control, the microcomputers 401 and 402 start timers independently from each other unless continuing former operation.

In the asynchronous drive mode, the microcomputers 401 and 402 generate the motor drive signals Dr1 and Dr2 at timing independent from each other. In the single system drive mode, the second microcomputer 402 exemplarily as the own microcomputer drives the motor 80 only in accordance with the motor drive signal Dr2 generated by the own microcomputer, without causing the first microcomputer 401 as the other microcomputer to generate the motor drive signal Dr1.

According to the basic mode, the microcomputers 401 and 402 in operation can keep synchronous control. The basic mode does not assume initial synchronization after booting the microcomputers 401 and 402.

For example, difference in supplied source voltage, wiring resistance, voltage detection properties, or the like between the microcomputers may cause a boot timing shift upon turning ON power sources of the microcomputers. During a period from an initially booted one of the microcomputers starts its timer until a later booted one of the microcomputers starts its timer, only the initially booted microcomputer is to operate asynchronously. The two microcomputers 401 and 402 thus fail to be synchronized initially.

Each of the microcomputers occasionally executes control with a unit of multiple cycles of the synchronization signal. In a case where one of the microcomputers starts the timer and another one of the microcomputers is synchronized in accordance with the synchronization signal after several cycles different from the control unit, the microcomputers have an offset in control timing therebetween and thus fail to synchronize control with the unit of multiple cycles.

The ECU 101 according to the first embodiment achieves synchronous control initially after booting the microcomputers 401 and 402 (that is, from the first time after booting). The microcomputers 401 and 402 mutually transmit and receive signals after booting to achieve "initial handshaking". The microcomputers each include an "initial handshaking determiner" that determines whether the initial handshaking is successful.

The handshaking referred to in the present embodiment corresponds only to handshaking executed initially after booting. The word "initial" will thus be excluded hereinafter, simply calling "handshaking" and the "handshaking determiner".

The first microcomputer 401 and the second microcomputer 402 included in the ECU 101 according to the first embodiment will be described mainly in terms of difference in configuration from the microcomputers included in the ECU 100 depicted in FIG. 1 according to the basic mode. As in the basic mode, the first microcomputer 401 functions as the "synchronization signal transmitter microcomputer" whereas the second microcomputer 402 functions as the "synchronization signal receiver microcomputer".

The first microcomputer 401 further includes, in addition to the configurations according to the basic mode, a handshaking determiner 611 and a ready signal receiver 621. The second microcomputer 402 further includes, in addition to the configurations according to the basic mode, a handshaking determiner 612 and a ready signal transmitter 622.

FIG. 19 includes bold solid arrows each indicating a synchronization signal, and bold dashed arrows each indicating a ready signal.

The ready signal transmitter 622 transmits, via a ready signal line 475 to the ready signal receiver 621 in the first microcomputer 401, a ready signal indicating synchronization preparation completion of the second microcomputer 402. The ready signal line 475 may be used in common with the synchronization signal line 471 or may be provided separately from the synchronization signal line 471. Similarly to the synchronization signal, the ready signal may be provided for notification not by means of communication via the ready signal line but by means of level change of a port signal.

The ready signal receiver 621 receives the ready signal. More specifically, the ready signal receiver 621 detects reception of the ready signal. Hereinafter, "receive" inclusive of reception of the synchronization signal by the timing corrector 422 will indicate "detect reception".

The handshaking determiner 611 in the first microcomputer 401 determines whether handshaking is successful or unsuccessful in accordance with the synchronization signal transmitted from the synchronization signal generator 411 and the ready signal received by the ready signal receiver 621.

The handshaking determiner 612 in the second microcomputer 402 determines whether handshaking is successful or unsuccessful in accordance with the synchronization signal received by the timing corrector 422 and the ready signal transmitted from the ready signal transmitter 622.

Signal transmission and reception, and success/failure determination in handshaking will be described in detail later.

The microcomputers 401 and 402 further include current arithmetic portions 631 and 632 that output commands to the drive signal generators 451 and 452, respectively. The basic mode actually includes the current arithmetic portions 631 and 632. The current arithmetic portions 631 and 632 are, however, are less relevant to operation unique to the basic mode and are thus not depicted in FIG. 7.

FIG. 19 exemplifies assuming that the ready signal is generated as one of communication clock signals, and examples of the communication clock signals include a data signal for communication between the microcomputers, other than the ready signal. In this case, the ready signal transmitter 622 transmits the communication clock signals including the data signal received from the current arithmetic portion 632. The ready signal receiver 621 transmits, to the current arithmetic portion 632, the data signal included in the received communication clock signals.

In view also of transmission and reception of the data signal, each of the ready signal transmitter 622 and the ready signal receiver 621 may simply be called a "communicator" and the ready signal line 475 may simply be called a "signal line". However, the present embodiment will adopt names referring to the functions of transmitting and receiving the ready signal particularly in handshaking.

FIG. 19 does not depict the timing determiner 432 in the timing corrector 422 of the second microcomputer 402, and the analog signal sampling portions 461 and 462 of the microcomputers 401 and 402, which are depicted in FIG. 7 according to the basic mode. These are not required for handshaking operation according to the first embodiment.

For synchronization between the microcomputers after initial synchronization, the timing corrector 422 has only to execute timing correction in accordance with at least the synchronization signal transmitted from the first microcomputer 401 to the second microcomputer 402. Furthermore, the configuration including the timing determiner 432 achieves prohibition of timing correction upon synchronization signal abnormality to prevent control breakdown of the second microcomputer 402, as described in the basic mode.

Operation examples of handshaking according to the first embodiment will be described next with reference to timing charts and flowcharts in FIGS. 20 to 35.

Terms listed on left ends of the timing charts will be explained initially.

The microcomputers 401 and 402 each include a "PWM timer" as a PWM carrier wave reference timer generated by the clock generation circuit 651 or 652. The drive signals Dr1 and Dr2 are generated in accordance with these timers for control of electrification to the motor coil sets 801 and 802 of the systems. Starting generation of the PWM timer will hereinafter be referred to as "timer start".

The boot timing when the power sources of the microcomputers 401 and 402 are turned ON is indicated on the charts of the PWM timers for convenience.

The expression "synchronization signal 1→2" indicates the synchronization signal transmitted from the synchronization signal generator 411 of the first microcomputer 401 to the timing corrector 422 of the second microcomputer 402. The synchronization signal according to this example has a low level upon booting.

Figure 20:
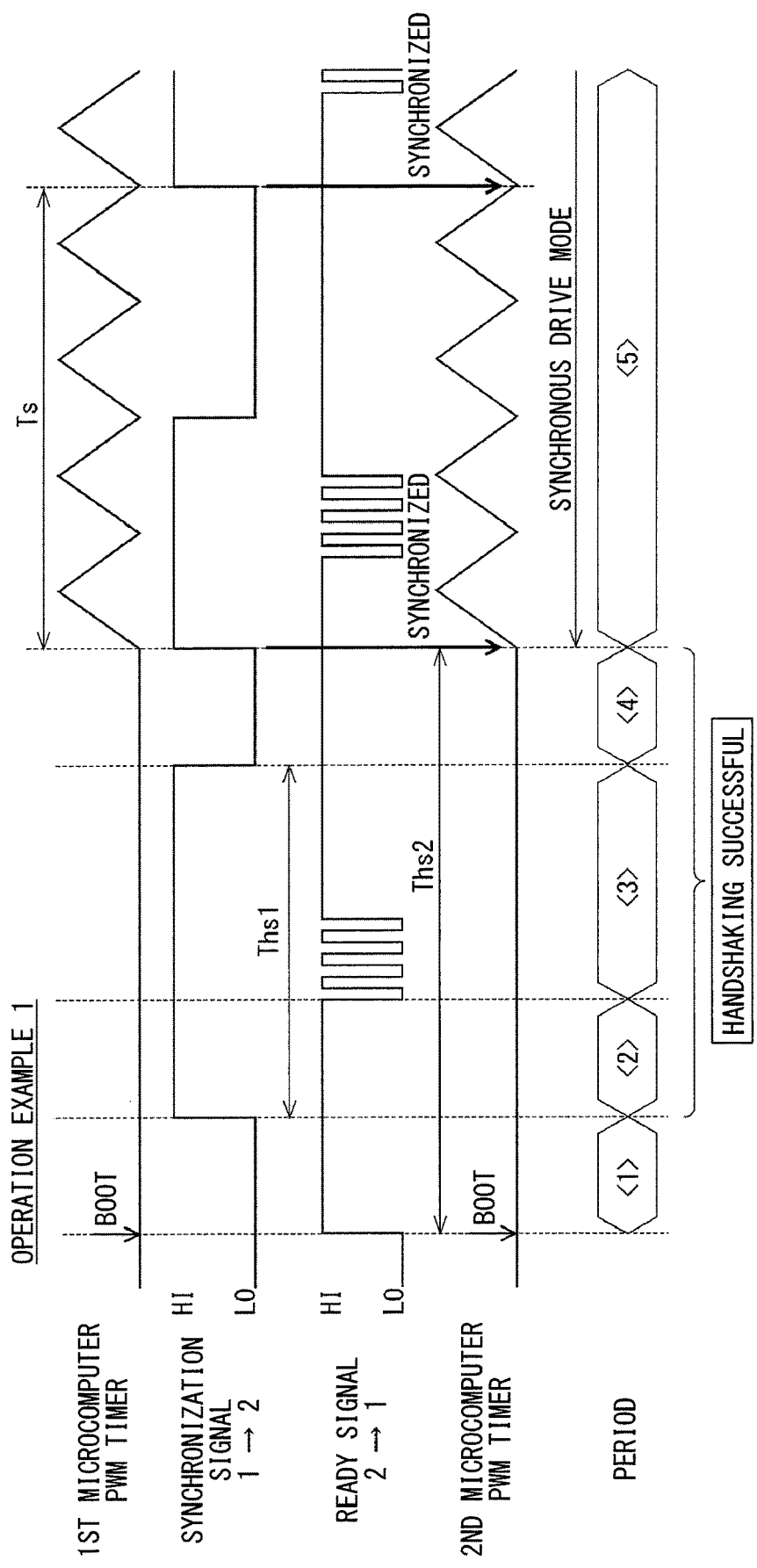
FIG. 20 is a timing chart of a handshaking operation example 1.

According to operation examples 1 and the like indicated in FIG. 20 and the like, the synchronization signal once rises from the low level to a high level and returns back to the low level before timer start of the first microcomputer 401. In this case, the initial synchronization signal has rise timing not recognized as timing of synchronization with the second microcomputer 402, but indicates advance notice of synchronization upon timer start. Operation for raising the synchronization signal to the high level before timer start will thus be expressed as "output or transmit a synchronization advance notice signal". Operation for returning the synchronization signal from the high level to the low level before timer start will be expressed as "end the synchronization advance notice signal".

In the present embodiment, the first microcomputer 401 changes between the low level and the high level of the synchronization signal, and transmits the synchronization signal to the second microcomputer 402 via the synchronization signal line 471 so as to cause the synchronization signal to function also as the synchronization advance notice signal. There is accordingly no need to provide a signal generator or a signal line unique for synchronization advance notice in handshaking.

After timer start of the first microcomputer 401, the synchronization signal is toggle outputted by cyclically reaching the high level and the low level at the synchronization cycle Ts equal to four cycles of the PWM timer. The synchronization signal according to the present embodiment has rise timing and fall timing matching bottom timing of the PWM timer.

As in the basic mode, rise timing of the synchronization signal corresponds to timing of synchronization with the second microcomputer 402. In the configuration in which the second microcomputer 402 executes timing determination, the synchronization signal is determined as being normal or abnormal in accordance with rise timing.

The expression "ready signal 2→1" indicates the ready signal transmitted from the ready signal transmitter 622 of the second microcomputer 402 to the ready signal receiver 621 of the first microcomputer 401. The ready signal is set at a high level as default upon booting. A pulse signal repeatedly reaching a high level and a low level continuously four times is then outputted as the ready signal as notice of synchronization preparation completion of the second microcomputer 402. The pulse width and the number of times may be set appropriately. The communication clock signal used as the ready signal according to the present embodiment keeps being outputted cyclically also after timer start of the second microcomputer 402.

In the present embodiment, the synchronization advance notice signal and the ready signal each correspond to a "signal to be transmitted and received" in handshaking.

A "period" indicates duration to be referred to in the following description. Signs <0> to <6> are provided independently in each chart, and are irrelevant to one another among different charts. The description does not include brackets < >, and a period corresponding to sign <1> in each chart will be expressed as a "period 1".

Operation at one time point during each period will be described principally as operation executed at the start of the period, ignoring a control time lag.

OPERATION EXAMPLE 1

The operation example 1 as a specific operation example, of successful handshaking after the microcomputers 401 and 402 boot simultaneously, will be described initially with reference to FIG. 20. The microcomputers 401 and 402 have already booted during the period 1. The second microcomputer 402 times second handshaking time Ths2 as elapsed time from the start of the period 1.

The first microcomputer 401 transmits the synchronization advance notice signal to the second microcomputer 402 during a period 2. The second microcomputer 402 receives this synchronization advance notice signal before the second handshaking time Ths2 elapses.

The first microcomputer 401 times elapsed time from the start of the period 2.

The second microcomputer 402 transmits the ready signal to the first microcomputer 401 during a period 3, in response to the synchronization advance notice signal received during the period 2. The first microcomputer 401 receives this ready signal before first handshaking time Ths1 elapses.

The first microcomputer 401 receives the ready signal during the period 3, and ends the synchronization advance notice signal during a period 4 after the first handshaking time Ths1 elapses.

Transmission of the synchronization advance notice signal and reception of the ready signal are executed normally through operation during the periods 2 to 4. The handshaking determiner 611 of the first microcomputer 401 accordingly determines success in handshaking and commands the drive timing generator 441 to execute initial synchronization.

Similarly, reception of the synchronization advance notice signal and transmission of the ready signal are executed normally. The handshaking determiner 612 of the second microcomputer 402 accordingly determines success in handshaking and commands the drive timing generator 442 to execute initial synchronization.

During a period 5, the first microcomputer 401 outputs the synchronization signal and starts the timer simultaneously. The second microcomputer 402 starts the timer at rise timing of the synchronization signal received from the first microcomputer 401. The microcomputers 401 and 402 thus synchronously drive the motor 80 initially after booting, in the synchronous drive mode.

MODIFICATION OF OPERATION EXAMPLE 1

The operation example 1 assumes that the first microcomputer 401 and the second microcomputer 402 boot simultaneously and instantly. When the power sources 111 and 112 for the microcomputers 401 and 402 are turned ON from the OFF states, the microcomputers 401 and 402 actually have supply voltage gradually increasing from zero and the microcomputers 401 and 402 are booted when the supply voltage reaches a certain value. When wiring resistance or the like of power source paths causes variation in increase grade, the microcomputers 401 and 402 have different boot timing even if the power sources 111 and 112 are turned ON simultaneously.

Figure 21:
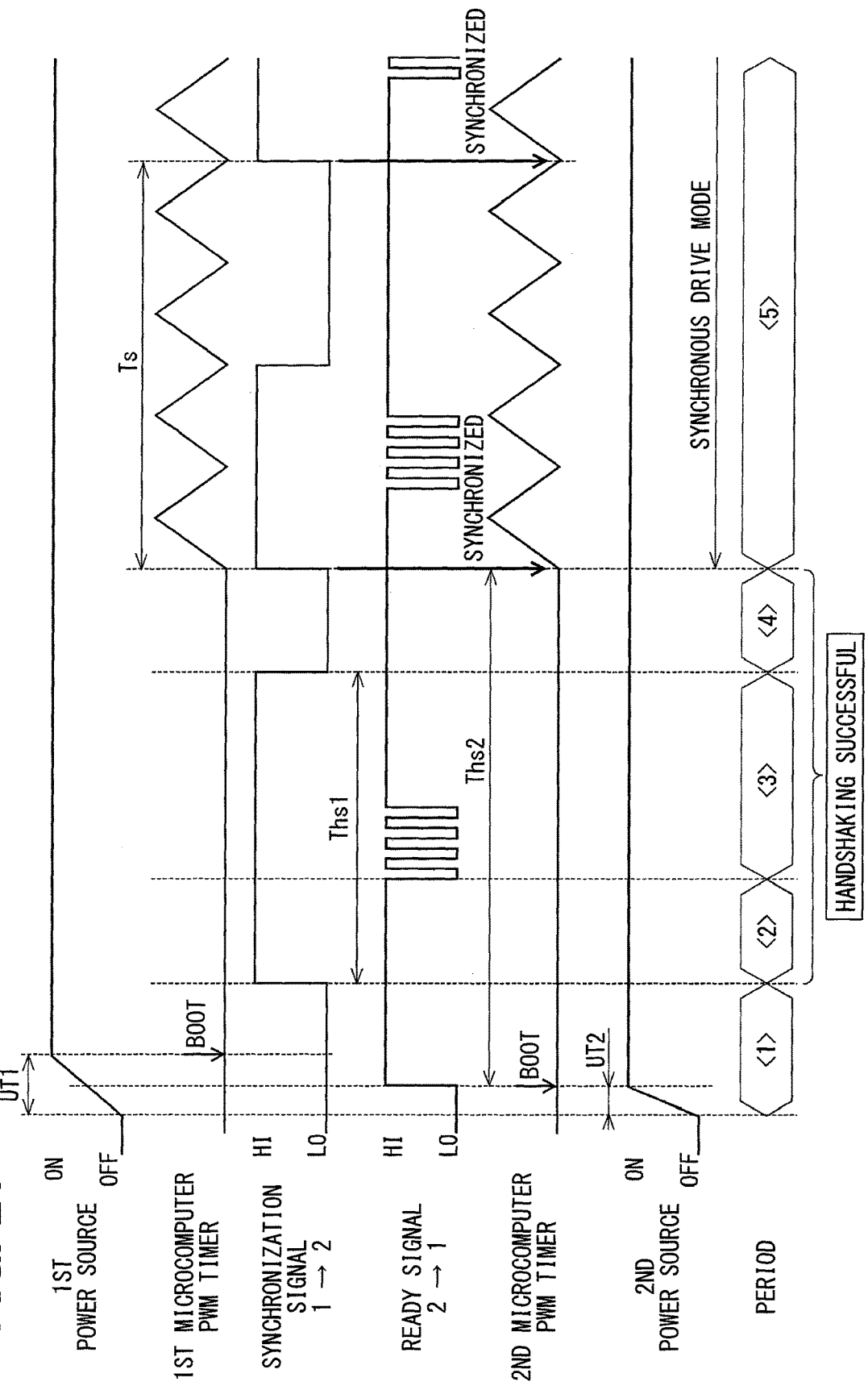
FIG. 21 is a timing chart of modification of the handshaking operation example 1.

Modification of the operation example 1 will be described with reference to FIG. 21, in a case where the microcomputers 401 and 402 have a relatively small boot timing shift due to difference between start time UT1 of the first power source 111 and start time UT2 of the second power source 112.

At the start of the period 1, the first power source 111 and the second power source 112 are simultaneously turned ON from the OFF states, and supply voltage to the microcomputers 401 and 402 increases. The second power source 112 completes starting after elapse of the time UT2, and the second microcomputer 402 is booted. Subsequently, the first power source 111 completes starting after elapse of the time UT1 soon after the start of timing the second handshaking time Ths2, and the first microcomputer 401 is booted.

The first microcomputer 401 then transmits the synchronization advance notice signal to the second microcomputer 402 at the start of the period 2. Similarly to the operation example 1 indicated in FIG. 20, handshaking is thereafter determined as being successful through the periods 2 to 4.

During the period 5, the first microcomputer 401 outputs the synchronization signal and starts the timer simultaneously, and the second microcomputer 402 starts the timer at rise timing of the synchronization signal received from the first microcomputer 401. The microcomputers 401 and 402 thus synchronously drive the motor 80 initially after booting, in the synchronous drive mode.

Even in the case where the first microcomputer 401 has slightly delayed boot timing, handshaking is successful as in the operation example 1 if the first microcomputer 401 transmits the synchronization advance notice signal within the second handshaking time Ths2. Even in another case where the second microcomputer 402 has slightly delayed boot timing, handshaking is executed as in the operation example 1 if the second microcomputer 402 transmits the ready signal within the first handshaking time Ths1.

OPERATION EXAMPLE 2

An operation example will be described next, of unsuccessful handshaking due to "timeout" in which one of the microcomputers boots but another one of the microcomputers thereafter does not boot within predetermined time. A case where a signal to be transmitted is not transmitted within predetermined time after the other microcomputer boots is also regarded similarly to the case where the other microcomputer does not boot.

The operation example 2 of unsuccessful handshaking due to timeout after the second microcomputer 402 boots will be described initially with reference to FIG. 22. According to the operation example 2, after the second microcomputer 402 boots, the first microcomputer 401 does not boot even after the predetermined time elapses or the first microcomputer 401 boots but does not transmit the ready signal.

Figure 22:
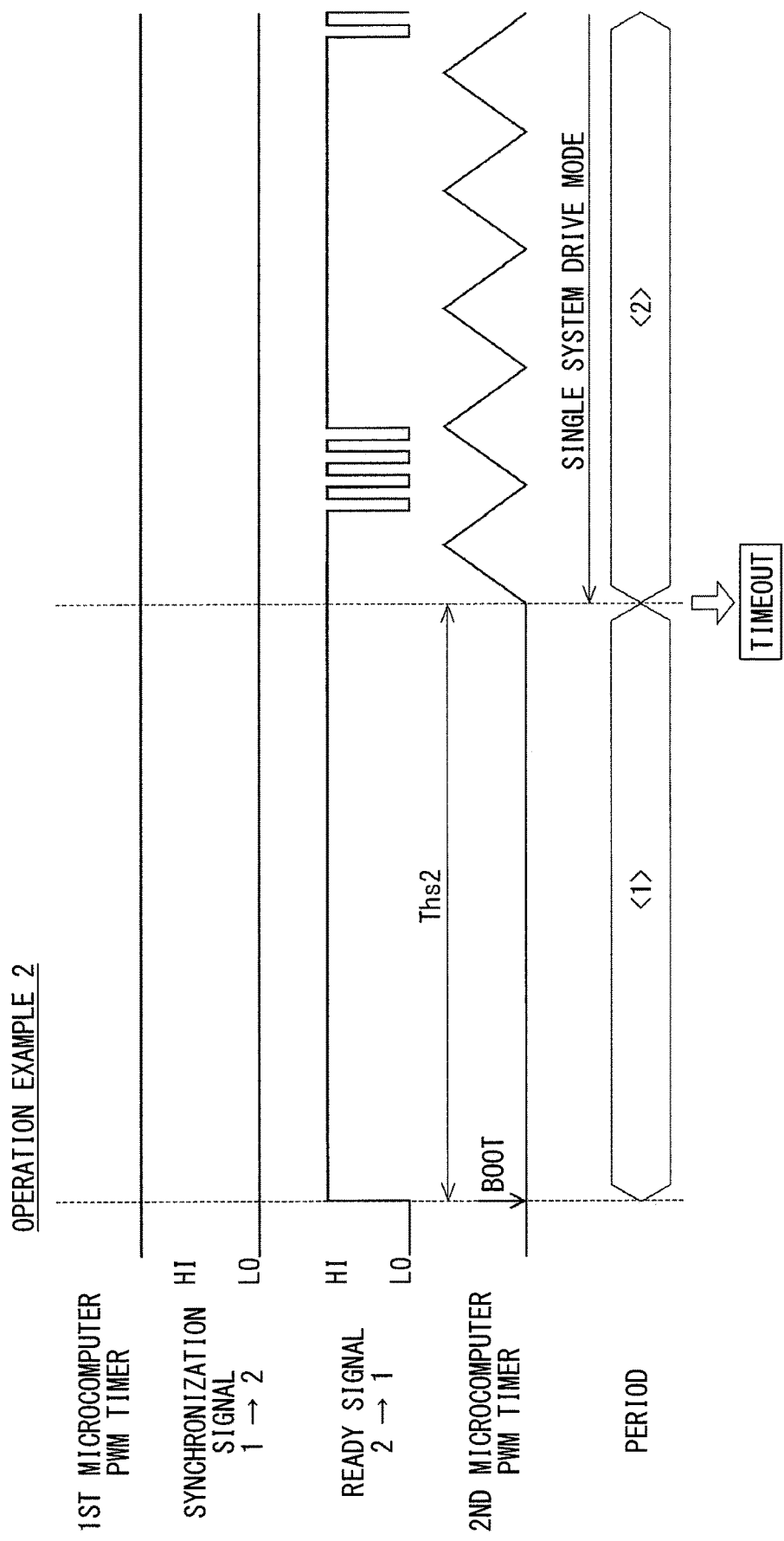
FIG. 22 is a timing chart of a handshaking operation example 2.

Only the second microcomputer 402 has already booted during the period 1 in FIG. 22. The second microcomputer 402 times elapsed time from the start of the period 1. Time then elapses while the second microcomputer 402 does not receive the synchronization advance notice signal to be transmitted from the first microcomputer 401.

When the elapsed time from the start of the period 1 reaches the second handshaking time Ths2, the handshaking determiner 612 of the second microcomputer 402 determines failure in handshaking due to timeout. The handshaking determiner 612 then commands the drive timing generator 442 that the second microcomputer 402 solely generates the drive signal Dr2.

During the period 2, the second microcomputer 402 as the synchronization signal receiver microcomputer starts the timer solely. The ECU 101 accordingly drives the motor 80 in the single system drive mode with the second system, without causing the first microcomputer 401 to generate the motor drive signal Dr1.

MODIFICATION A OF OPERATION EXAMPLE 2

The modification A of the operation example 2 of taking power source start time into consideration will be described next with reference to FIG. 23. In comparison to the modification of the operation example 1 indicated in FIG. 21, this example relates to a case where the microcomputers 401 and 402 have a relatively large boot timing shift due to large difference between the start time UT1 of the first power source 111 and the start time UT2 of the second power source 112.

At the start of the period 1, the first power source 111 and the second power source 112 are simultaneously turned ON from the OFF states, and supply voltage to the microcomputers 401 and 402 increases. The second power source 112 completes starting after elapse of the time UT2, and the second microcomputer 402 is booted. The start time UT1 of the first power source 111 is longer than a sum of the start time UT2 of the second power source 112 and the second handshaking time Ths2. The second handshaking time Ths2 accordingly elapses before the first microcomputer 401 boots, and the second microcomputer 402 solely starts the timer during the period 2. The motor 80 is thus driven in the single system drive mode with the second system.

The first power source 111 then completes starting during the period 2, and the first microcomputer 401 is booted. Subsequently during the period 3, the second microcomputer 402 having started the timer transmits an invalid ready signal to the first microcomputer 401 while the first handshaking time Ths1 elapses.

The expression "invalid" indicates a state where the receiver microcomputer (the first microcomputer 401 in this case) does not recognize the signal as a ready signal. The microcomputer to receive the ready signal determines validity or invalidity of the ready signal in accordance with an ID thereof or the like. The invalid ready signal transmitted during the single system drive mode with the second microcomputer 402 is not recognized as a signal indicating synchronization preparation completion in response to the synchronization advance notice signal transmitted from the first microcomputer 401. Handshaking is thus not determined as being successful even when the invalid ready signal is transmitted.

The period 4 elapses after the end of the period 3, and the first microcomputer 401 starts the timer asynchronously with the second microcomputer 402 at the start of the period 5. During the period 5, the motor 80 is driven in the asynchronous drive mode with the two systems of the microcomputers 401 and 402.

At the start of a period 6 after the synchronization cycle Ts from the start of the period 5, the first microcomputer 401 transmits the synchronization signal to the second microcomputer 402 and the second microcomputer 402 receives the synchronization signal. If normality is determined in timing determination or if timing determination is not executed, timing correction of the second microcomputer 402 is executed at rise timing of the synchronization signal and the microcomputers 401 and 402 thereafter drive the motor 80 in the synchronous drive mode.

When the microcomputers 401 and 402 have a large boot timing shift, the ECU 101 drives the motor 80 in the single system drive mode, subsequently in the asynchronous drive mode, and then in the synchronous drive mode in the mentioned order. In other words, a motor control apparatus possibly transitioning from the synchronous drive mode, to the asynchronous drive mode, and then to the single system drive mode in the mentioned order upon booting the microcomputers 401 and 402 is regarded as corresponding to the ECU according to the present embodiment.

MODIFICATION B OF OPERATION EXAMPLE 2

Figure 23:
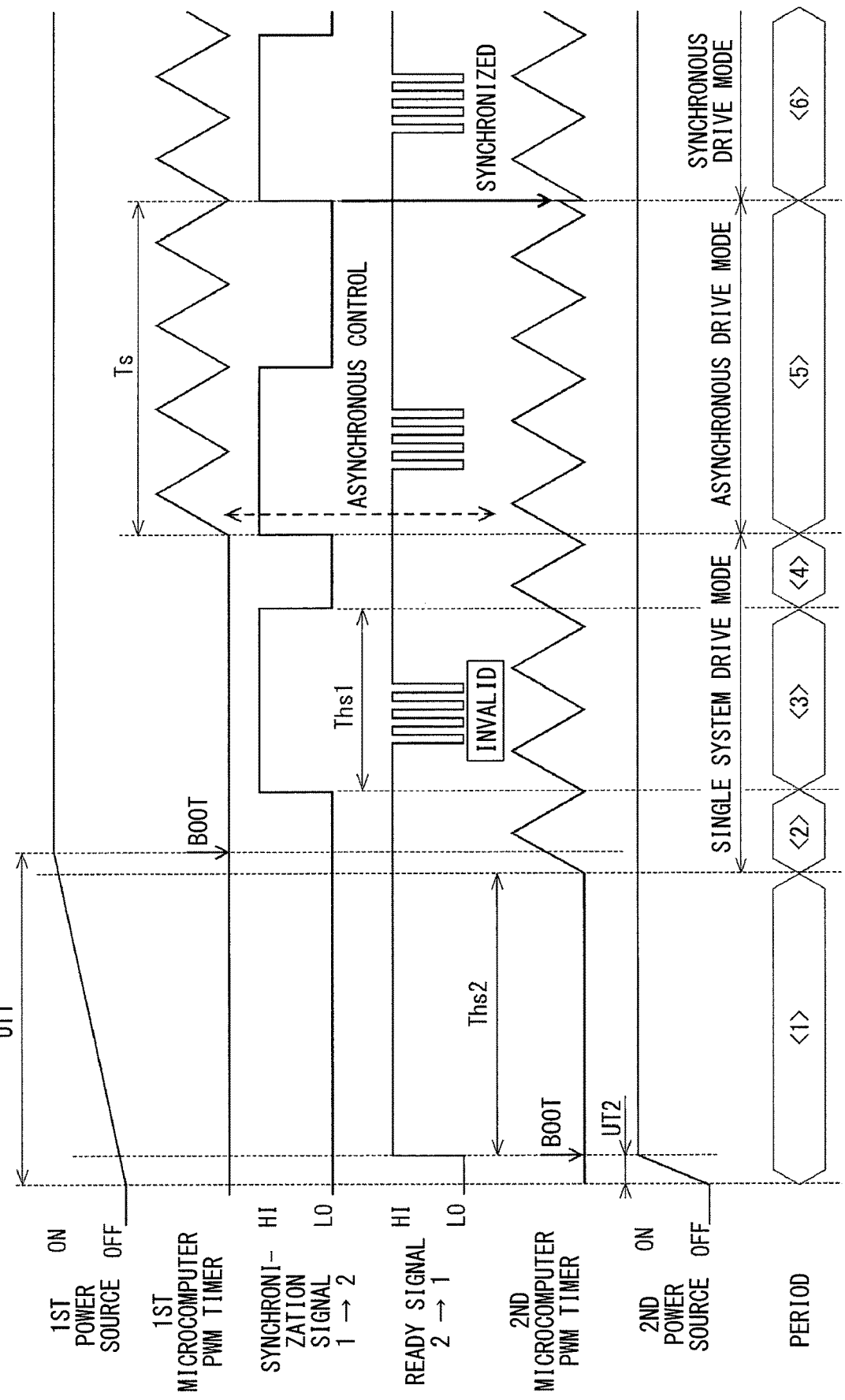
FIG. 23 is a timing chart of modification A of the handshaking operation example 2.
Figure 24:
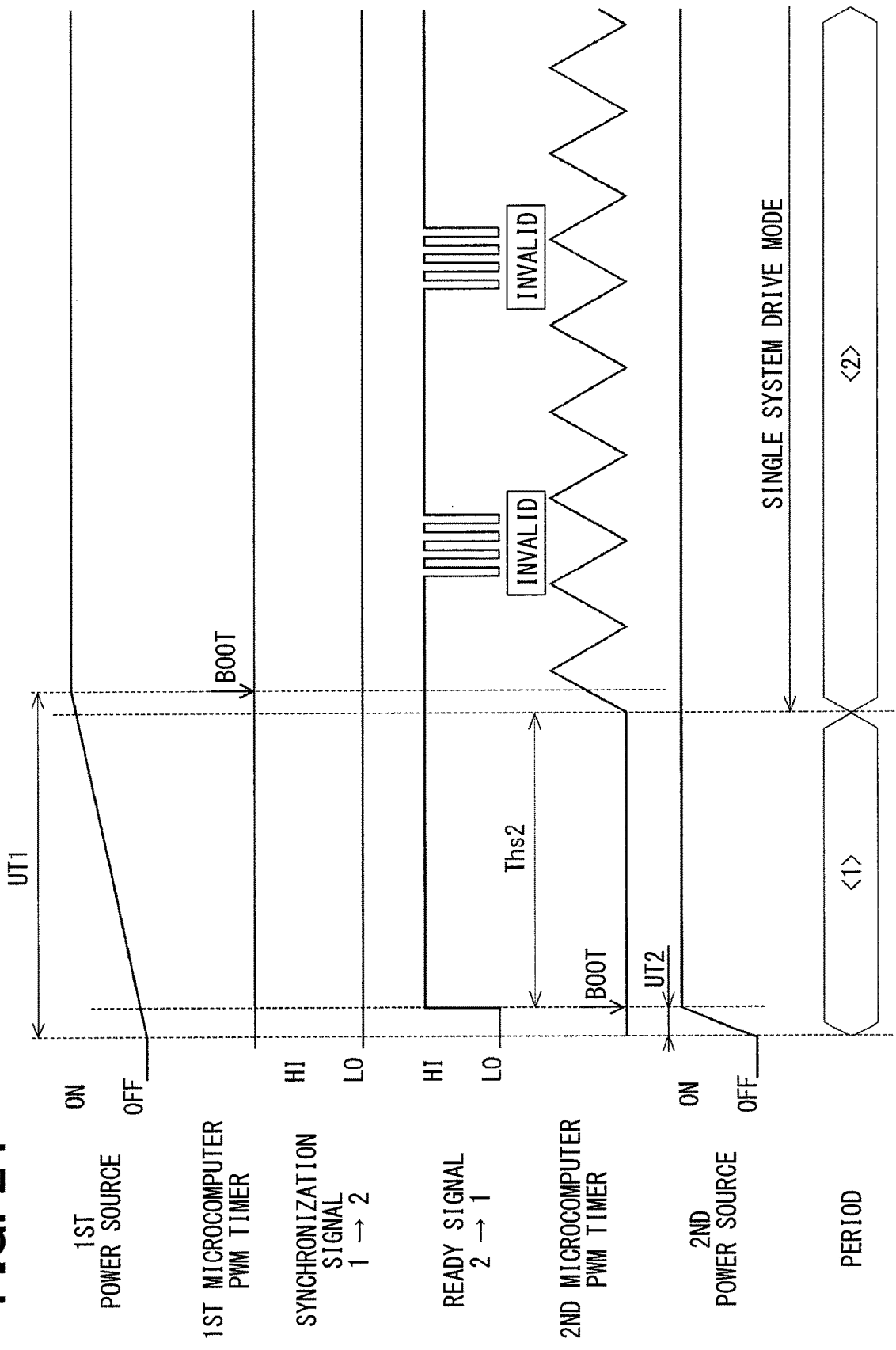
FIG. 24 is a timing chart of modification B of the handshaking operation example 2.

The modification B of the operation example 2 indicated in FIG. 24 includes operation during the periods 1 and 2 same as the operation according to the modification A indicated in FIG. 23. According to the modification B, the first microcomputer 401 does not execute processing such as transmission of the synchronization advance notice signal, timer start, and synchronization if the first microcomputer 401 boots while the second microcomputer 402 is operating in the single system drive mode. Specifically, the first microcomputer 401 itself has already booted but does not generate the motor drive signal Dr1, so that the motor is not driven by the first system. Similarly to FIG. 22, the first microcomputer 401 continuously operates in the single system drive mode during the continuous period 2. In this manner, transition to the synchronous drive mode is not essential and the single system drive mode may be adopted continuously.

OPERATION EXAMPLE 3

The operation example 3 of unsuccessful handshaking due to timeout after the first microcomputer 401 boots, contrary to the operation example 2, will be described next with reference to FIG. 25. According to the operation example 3, after the first microcomputer 401 boots, the second microcomputer 402 does not boot even after the predetermined time elapses or the second microcomputer 402 boots but does not transmit the ready signal.

Only the first microcomputer 401 has already booted during the period 1.

During the period 2, the first microcomputer 401 transmits the synchronization advance notice signal and times elapsed time from the start of the period 2. Time then elapses while the first microcomputer 401 does not receive the ready signal to be transmitted from the second microcomputer 402.

When the elapsed time from the start of the period 2 reaches the first handshaking time Ths1, the handshaking determiner 611 of the first microcomputer 401 determines failure in handshaking due to timeout. The handshaking determiner 611 then commands the drive timing generator 441 that the first microcomputer 401 solely generates the drive signal Dr1.

The first microcomputer 401 ends the synchronization advance notice signal during the period 3 after the first handshaking time Ths1 elapses.

During the period 4 according to the operation example 3, the first microcomputer 401 as the synchronization signal transmitter microcomputer outputs the synchronization signal and starts the timer solely. The ECU 101 accordingly drives the motor 80 in the single system drive mode with the first system, without causing the second microcomputer 402 to generate the motor drive signal Dr2.

FLOWCHARTS ACCORDING TO OPERATION EXAMPLES 1 TO 3

The flowcharts will be referred to as to processing after booting the first and second microcomputers 401 and 402, handshaking success/failure storage processing, and synchronization processing of the second microcomputer 402 relevant to the operation examples 1 to 3 and their modification assuming failure in handshaking due to timeout.

Figure 26:
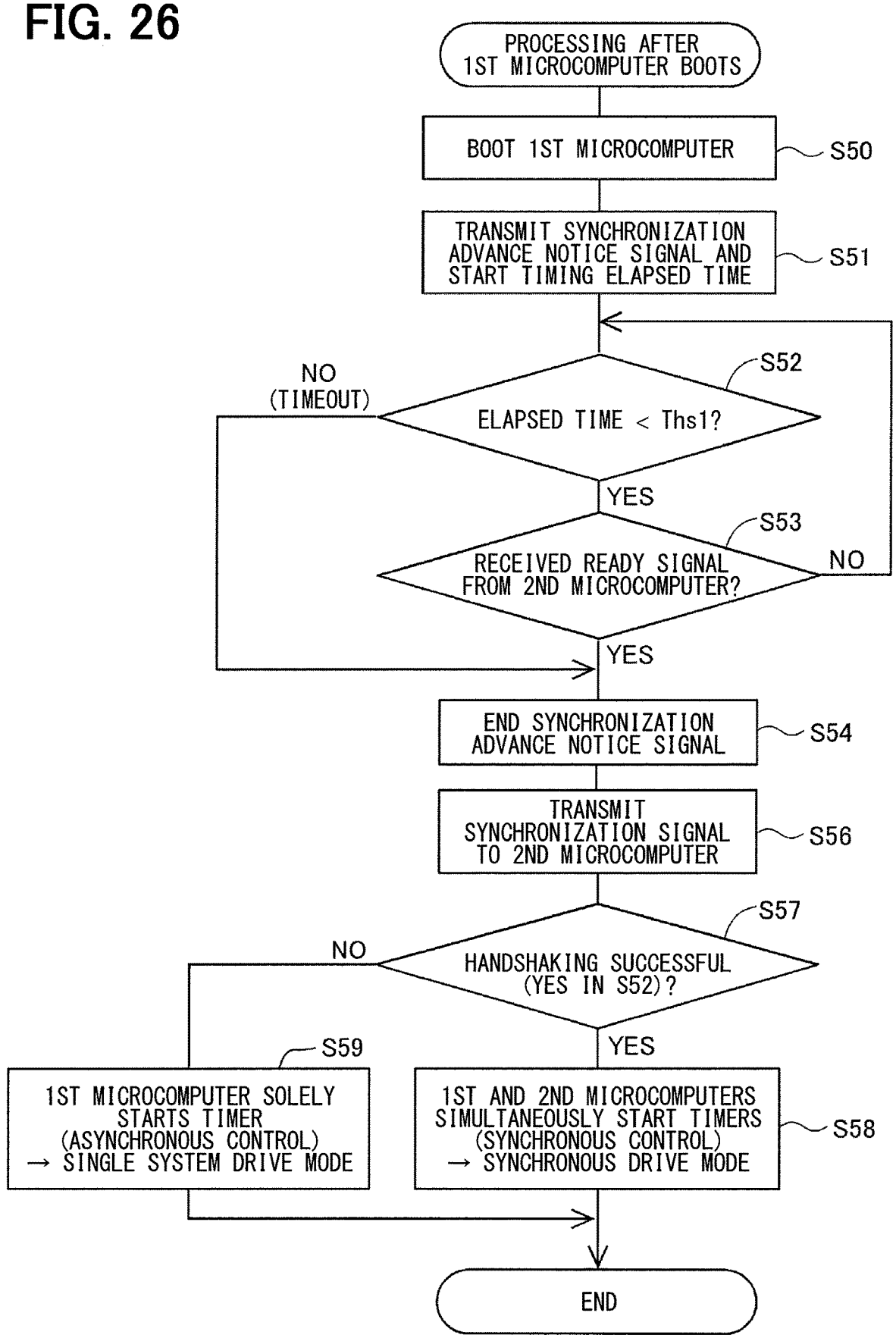
FIG. 26 is a flowchart of processing after a first microcomputer boots according to the operation examples 1 to 3.

FIG. 26 depicts processing after the first microcomputer boots. The first microcomputer 401 boots in S50. Subsequently in S51, the first microcomputer 401 raises the synchronization signal to the high level, transmits the synchronization advance notice signal, and starts timing elapsed time.

S52 includes determining whether the elapsed time is less than the first handshaking time Ths1.

If YES is determined in S52, whether the ready signal is received from the second microcomputer 402 is determined in a ready signal reception S53. If the first microcomputer 401 has not yet received the ready signal and NO is determined in S53, the process flow returns to before S52.

If the first microcomputer 401 receives the ready signal, YES is determined in S53 and the process flow proceeds to S54. Handshaking is thus determined as being successful.

If the elapsed time reaches the first handshaking time Ths1 and handshaking fails due to timeout, NO is determined in S52 and the process flow proceeds to S54.

In S54, the first microcomputer 401 returns the synchronization signal to the low level and ends the synchronization advance notice signal.

In S56, the first microcomputer 401 transmits the synchronization signal to the second microcomputer 402.

In the case where YES is determined in former S52, in other words, if handshaking is determined as being successful, YES is determined in a handshaking determination S57 and the process flow proceeds to a synchronous drive S58. In S58, the first microcomputer 401 and the second microcomputer 402 synchronously start the timers and synchronously drive the motor 80 initially.

In the other case where NO is determined in former S52, in other words, if handshaking fails due to timeout, NO is determined in S57 and the process flow proceeds to S59. In S59, the first microcomputer 401 solely starts the timer and drives the motor 80 asynchronously.

Figure 27:
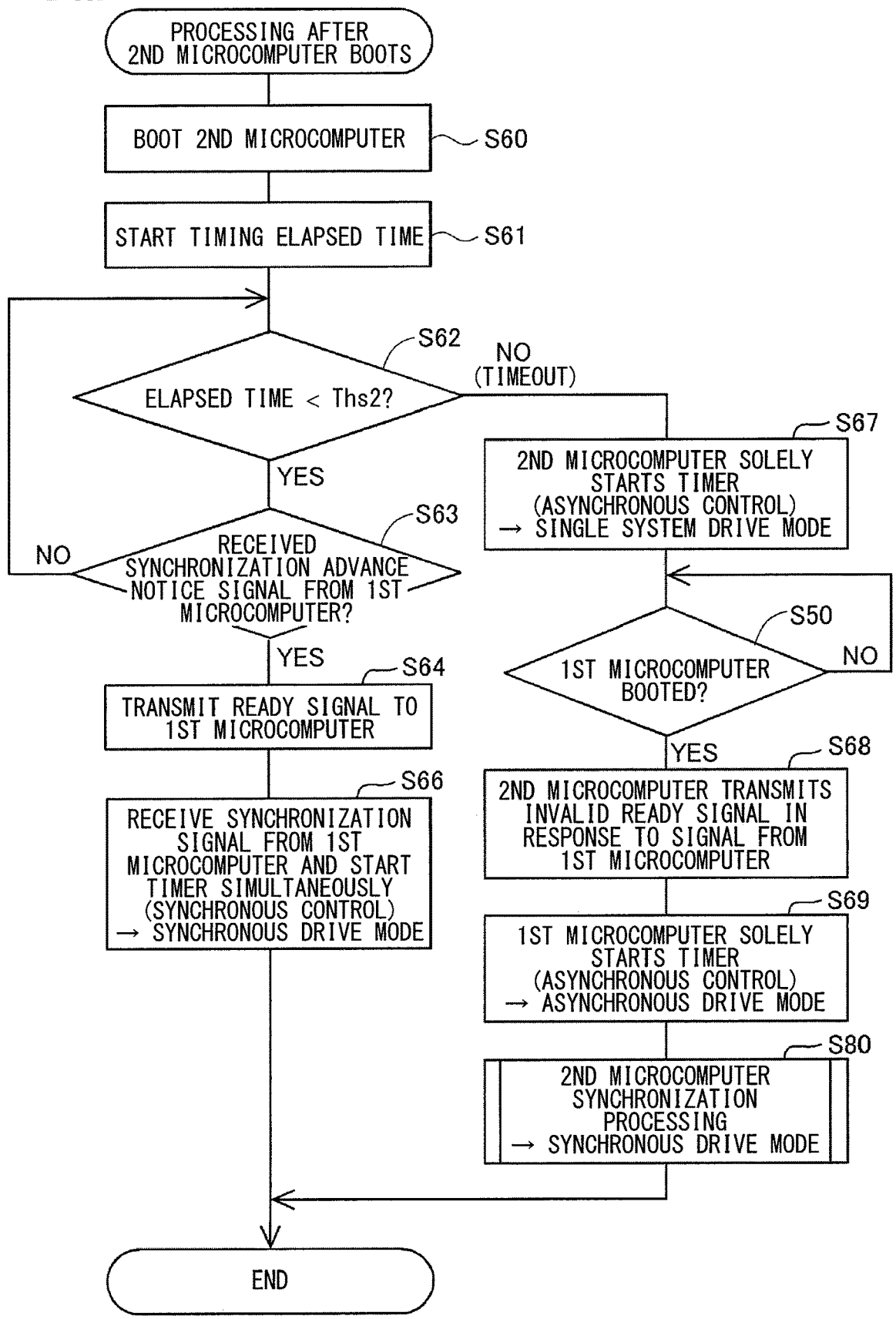
FIG. 27 is a flowchart of processing after a second microcomputer boots according to the operation examples 1 to 3.
Figure 28:
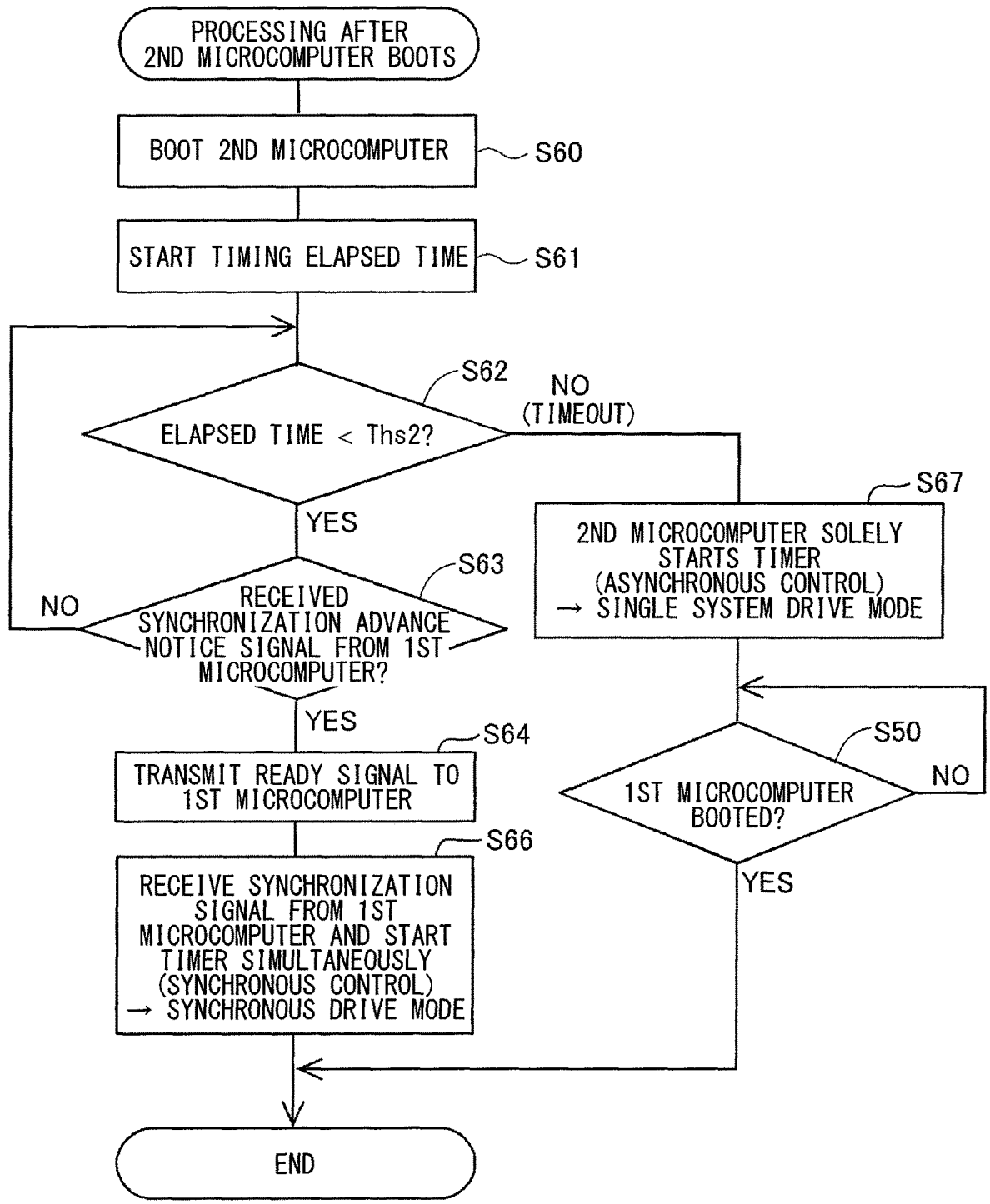
FIG. 28 is a flowchart of processing after the second microcomputer boots according to the modification B of the operation example 2.

FIGS. 27 and 28 each depict processing after the second microcomputer boots. The second microcomputer 402 boots in S60, and starts timing elapsed time in S61.

S62 includes determining whether the elapsed time is less than the second handshaking time Ths2.

If YES is determined in S62, whether the synchronization advance notice signal is received from the first microcomputer 401 is determined in S63. If the second microcomputer 402 has not yet received the synchronization advance notice signal and NO is determined in S63, the process flow returns to before S62.

If the second microcomputer 402 receives the synchronization advance notice signal, YES is determined in S63 and the process flow proceeds to a ready signal transmission S64. In S64, the second microcomputer 402 transmits the ready signal. The first microcomputer 401 has the ready signal reception S53 depicted in FIG. 26 in response to S64. Handshaking is thus determined as being successful.

Subsequently in S66, the second microcomputer 402 receives the synchronization signal from the first microcomputer 401 and starts the timer simultaneously with the first microcomputer 401 with interrupting. The first microcomputer 401 and the second microcomputer 402 thus synchronously drive the motor 80 initially.

In the other case where the elapsed time reaches the second handshaking time Ths2 and handshaking fails due to timeout, NO is determined in S62 and the process flow proceeds to S67. In S67, the second microcomputer 402 solely starts the timer and drives the motor 80 in the single system drive mode.

Subsequent S50 includes determination of whether the first microcomputer 401 boots after the second microcomputer 402 starts the timer. The first microcomputer 401 is not booted according to the operation example 2 indicated in FIG. 22, and NO is determined in S50. According to the modification of the operation example 2 indicated in FIG. 23 or 24, the first microcomputer 401 boots after the second microcomputer 402 starts the timer, and YES is determined in S50.

According to the modification A of the operation example 2, if YES is determined in S50 as depicted in FIG. 27, the second microcomputer 402 transmits an invalid ready signal in response to the synchronization advance notice signal from the first microcomputer 401 in S68. In S69, the first microcomputer 401 solely starts the timer asynchronously with the second microcomputer 402, due to timeout with elapse of the first handshaking time Ths1. The single system drive mode accordingly transitions to the asynchronous drive mode with the two systems.

Figure 30:
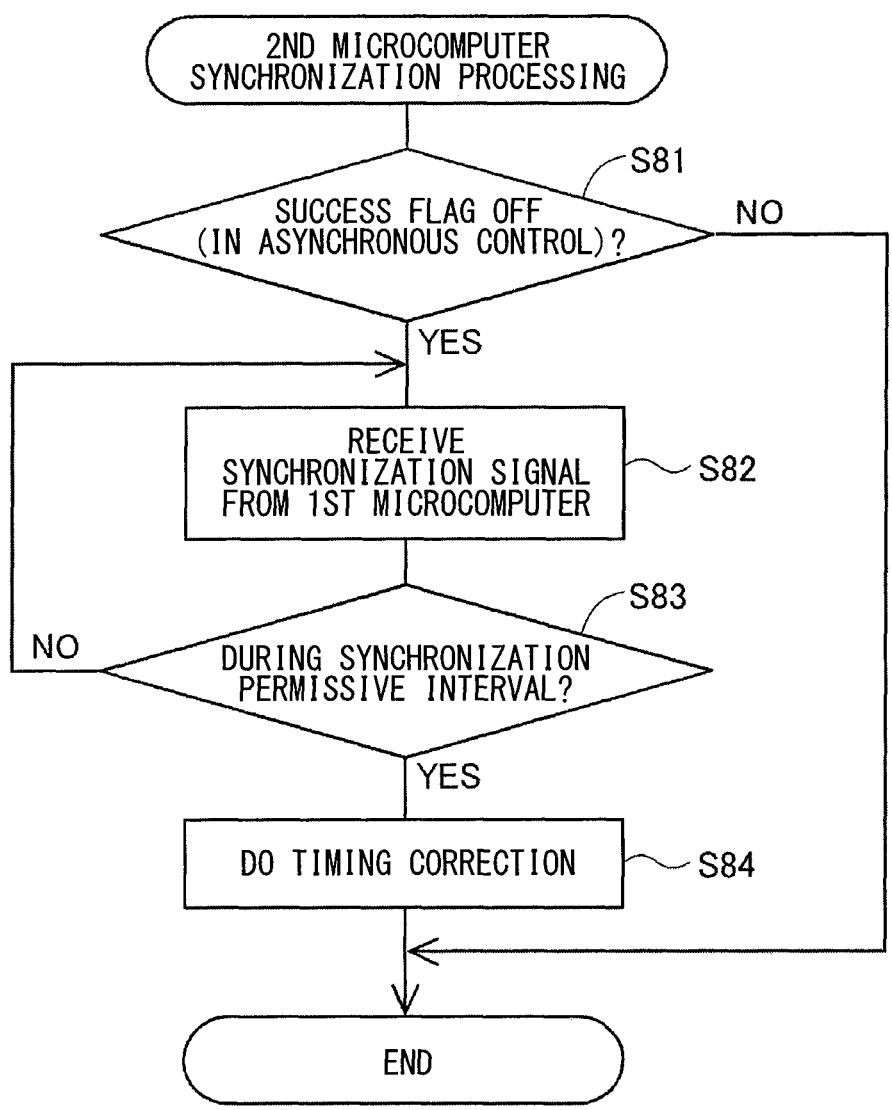
FIG. 30 is a flowchart of second microcomputer synchronization processing during asynchronous control.

In subsequent S80, "second microcomputer synchronization processing" depicted in FIG. 30 is executed, and the drive mode transitions to the synchronous drive mode if a synchronization condition is satisfied.

According to the modification B of the operation example 2, the processing simply ends if YES is determined in S50, as depicted in FIG. 28. The "single system drive mode with the second microcomputer" in S67 thus continues.

Figure 29:
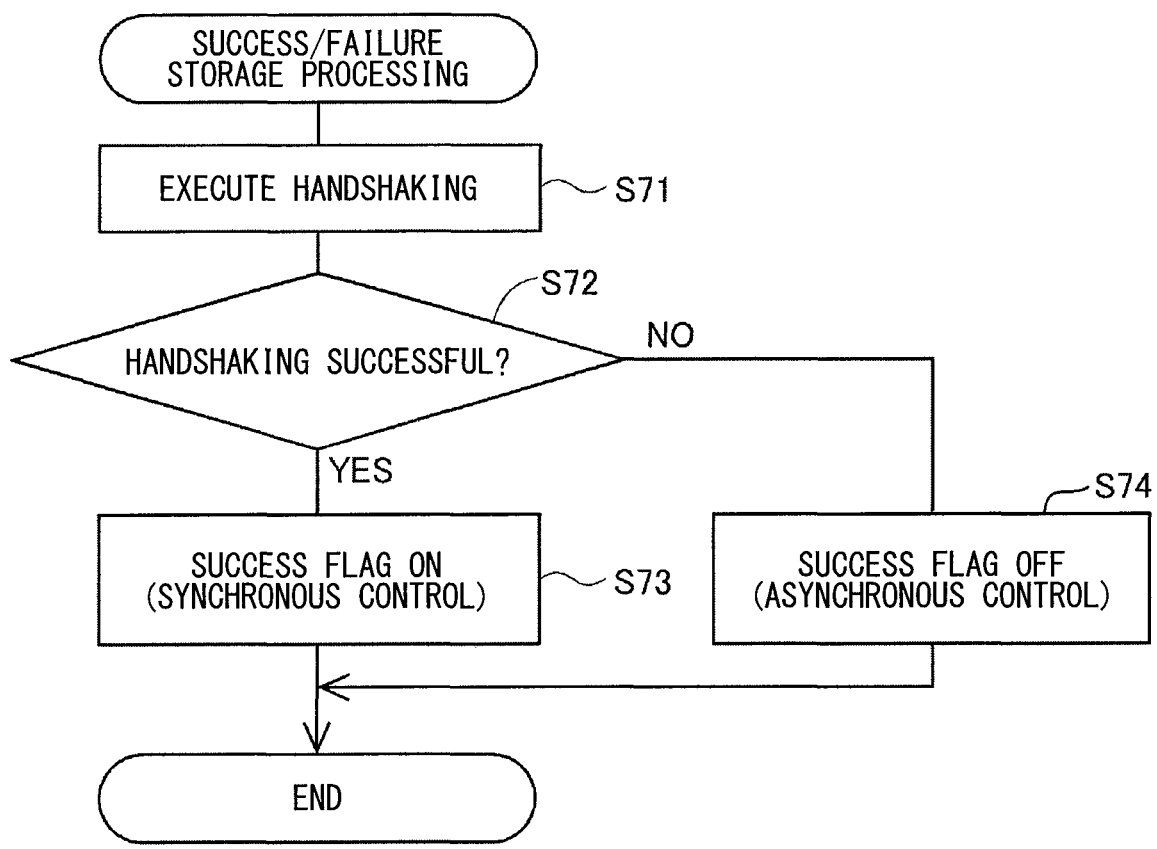
FIG. 29 is a flowchart of handshaking success/failure storage processing.

Subsequently in the handshaking success/failure storage processing depicted in FIG. 29, handshaking is executed in S71.

If handshaking is successful and YES is determined in S72, the handshaking determiners 611 and 612 turn ON success flags in S73. Synchronous control is executed in this case.

If handshaking is unsuccessful and NO is determined in S72, the handshaking determiners 611 and 612 turn OFF the success flags in S74. Asynchronous control is executed in this case.

The handshaking determiners 611 and 612 store information on success flag ON/OFF.

Figure 32:
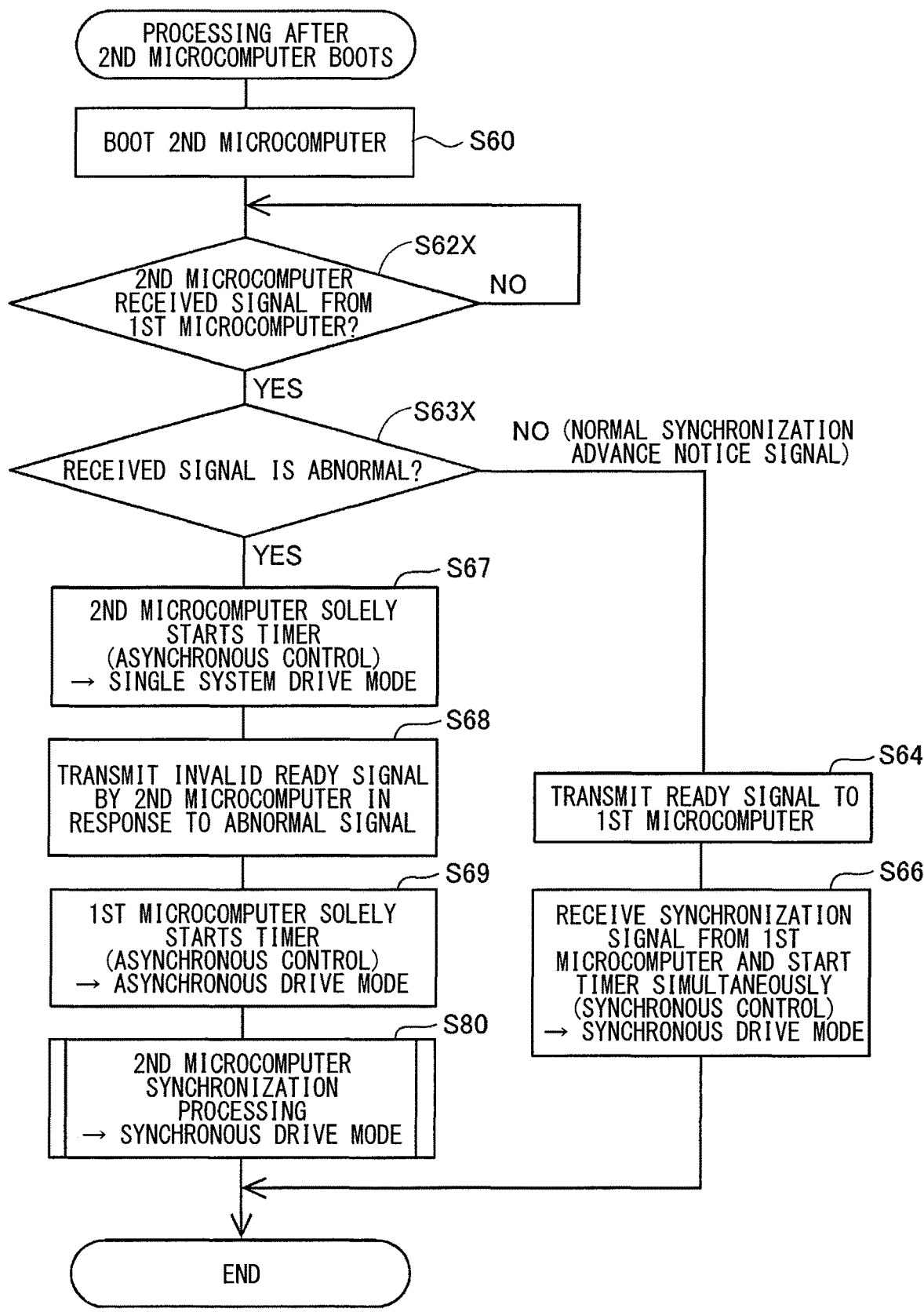
FIG. 32 is a flowchart of processing after the second microcomputer boots according to the operation example 4.

The second microcomputer synchronization processing depicted in FIG. 30 corresponds to S80 in FIGS. 27 and 32. If the success flag is OFF and asynchronous control is being executed in FIG. 30, YES is determined in S81 and synchronization is to be started in subsequent S82. If the success flag is ON and synchronous control is being executed, NO is determined in S81 and the processing ends.

The second microcomputer 402 then stands by for transmission of the synchronization signal from the first microcomputer 401 at each synchronization cycle Ts, and receives the synchronization signal in S82. No synchronization signal is transmitted if the first microcomputer 401 has not booted and only the second microcomputer 402 is operating in the single system drive mode. The processing may thus end when standby time reaches an upper limit value.

In the configuration as in the basic mode in which the timing corrector 422 of the second microcomputer 402 includes the timing determiner 432, whether synchronization signal reception timing is included in the synchronization permissive interval is determined in S83. If YES is determined in S83, timing correction is executed in S84. If NO is determined in S83, the process flow returns to S82 and the second microcomputer 402 stands by for transmission of a subsequent synchronization signal.

In the configuration in which the timing corrector 422 does not include the timing determiner 432, S83 may be skipped and timing correction may always be executed when the second microcomputer 402 receives the synchronization signal.

OPERATION EXAMPLE 4

Figure 31:
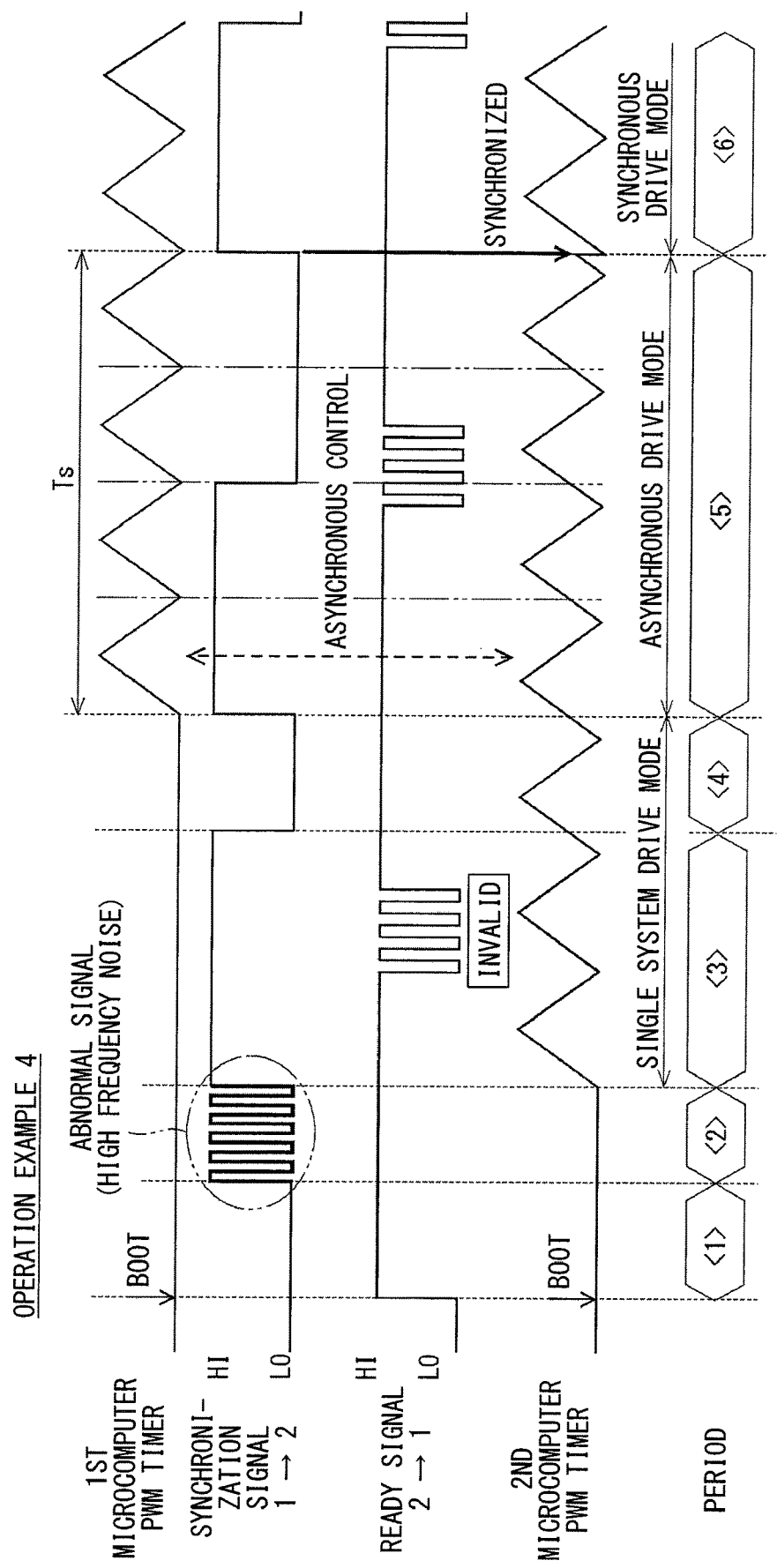
FIG. 31 is a timing chart of a handshaking operation example 4.

The operation example 4 of unsuccessful handshaking due to transmission or reception of an abnormal signal will be described next with reference to FIG. 31. Timeout as in the operation examples 2 and 3 will not be referred to in the following description.

As in the operation example 1, the microcomputers 401 and 402 boot simultaneously and have already booted during the period 1.

During the period 2, the first microcomputer 401 transmits, to the second microcomputer 402, an abnormal signal having high frequency noise instead of the synchronization advance notice signal expected to be transmitted.

The handshaking determiner 612 of the second microcomputer 402 determines failure in handshaking immediately after detecting reception of the abnormal signal during the period 2. The handshaking determiner 612 then commands the drive timing generator 442 that the second microcomputer 402 solely generates the drive signal Dr2.

During the period 3, the second microcomputer 402 solely starts the timer. The motor 80 is thus driven in the single system drive mode with the second system.

After the second microcomputer 402 starts the timer during the period 3, the second microcomputer 402 transmits an invalid ready signal to the first microcomputer 401.

The handshaking determiner 611 of the first microcomputer 401 determines failure in handshaking, and commands the drive timing generator 441 that the first microcomputer 401 solely generates the drive signal Dr1. The first microcomputer 401 ends the synchronization advance notice signal during the period 4.

During a period 5, the first microcomputer 401 outputs the synchronization signal and starts the timer simultaneously. During the period 5, the motor 80 is driven in the asynchronous drive mode with the two systems of the microcomputers 401 and 402.

At the start of a period 6 after the synchronization cycle Ts from the start of the period 5, the first microcomputer 401 transmits the synchronization signal to the second microcomputer 402 and the second microcomputer 402 receives the synchronization signal. If normality is determined in timing determination or if timing determination is not executed, timing correction of the second microcomputer 402 is executed at rise timing of the synchronization signal and the microcomputers 401 and 402 thereafter drive the motor 80 in the synchronous drive mode.

Also when the second microcomputer 402 receives an abnormal signal instead of the synchronization advance notice signal, the ECU 101 drives the motor 80 in the single system drive mode, subsequently in the asynchronous drive mode, and then in the synchronous drive mode in the mentioned order.

FLOWCHARTS ACCORDING TO OPERATION EXAMPLE 4

The flowchart in FIG. 32 is referred to as to the processing after the second microcomputer boots according to the operation example 4 assuming failure in handshaking due to transmission or reception of an abnormal signal. FIG. 32 includes steps that are in common with those depicted in FIG. 27, are denoted by identical step numbers, and will not be described where appropriate. Steps unique to the operation example 4 will have letter "X" at the ends of step numbers.

FIG. 32 does not assume timeout of the signal transmitted from the first microcomputer 401 after the second microcomputer 402 boots. In other words, FIG. 32 assumes that the second microcomputer 402 receives a signal during the second handshaking time Ths2.

If the second microcomputer 402 receives a signal from the first microcomputer 401 and YES is determined in S62X after the second microcomputer 402 boots in S60, whether the signal received by the second microcomputer 402 is an abnormal signal is determined in S63X.

If the signal received by the second microcomputer 402 is a normal synchronization advance notice signal and NO is determined in S63X, S64 and S66 are executed as in FIG. 27.

If the signal received by the second microcomputer 402 is an abnormal signal and YES is determined in S63X, the second microcomputer 402 solely starts the timer and drives the motor 80 in the single system drive mode in S67. S68, S69, and S80 are subsequently executed as in FIG. 27.

(Effects)

As described above, the ECU 101 according to the present embodiment executes handshaking of mutual transmission and reception of the synchronization advance notice signal and the ready signal after the microcomputers 401 and 402 boot, and executes a procedure according to a result of determination of whether the handshaking is successful. If the handshaking is determined as being successful, the motor 80 can synchronously be driven initially. If the handshaking is determined as being unsuccessful, the motor 80 starts being driven asynchronously and timing correction is executed at subsequent or later timing of synchronization signal transmission for transition to synchronous control.

In this manner, the ECU 101 according to the present embodiment achieves initial synchronization if handshaking is successful after the microcomputers 401 and 402 boot. The two microcomputers 401 and 402 simultaneously start the timers when handshaking is successful. Control is thus synchronized even when the microcomputers each execute control with the unit of multiple cycles of the synchronization signal.

OPERATION EXAMPLES 5 AND 6

The operation examples 1 to 4 described above relate to initial handshaking executed in the case where the first microcomputer 401 and the second microcomputer 402 have the power sources turned ON from the stopped states and are then booted. Such an idea of initial handshaking according to the present embodiment is also applicable to a case where the microcomputer in operation is reset or the like to reboot.

The handshaking operation examples 5 and 6 in which one of the microcomputers is reset or the like to temporarily stop during continuous operation in the single system drive mode with another one of the microcomputers will be described next with reference to FIGS. 33 to 35. The operation example 5 includes two patterns, namely, operation examples 5A and 5B.

Figure 33:
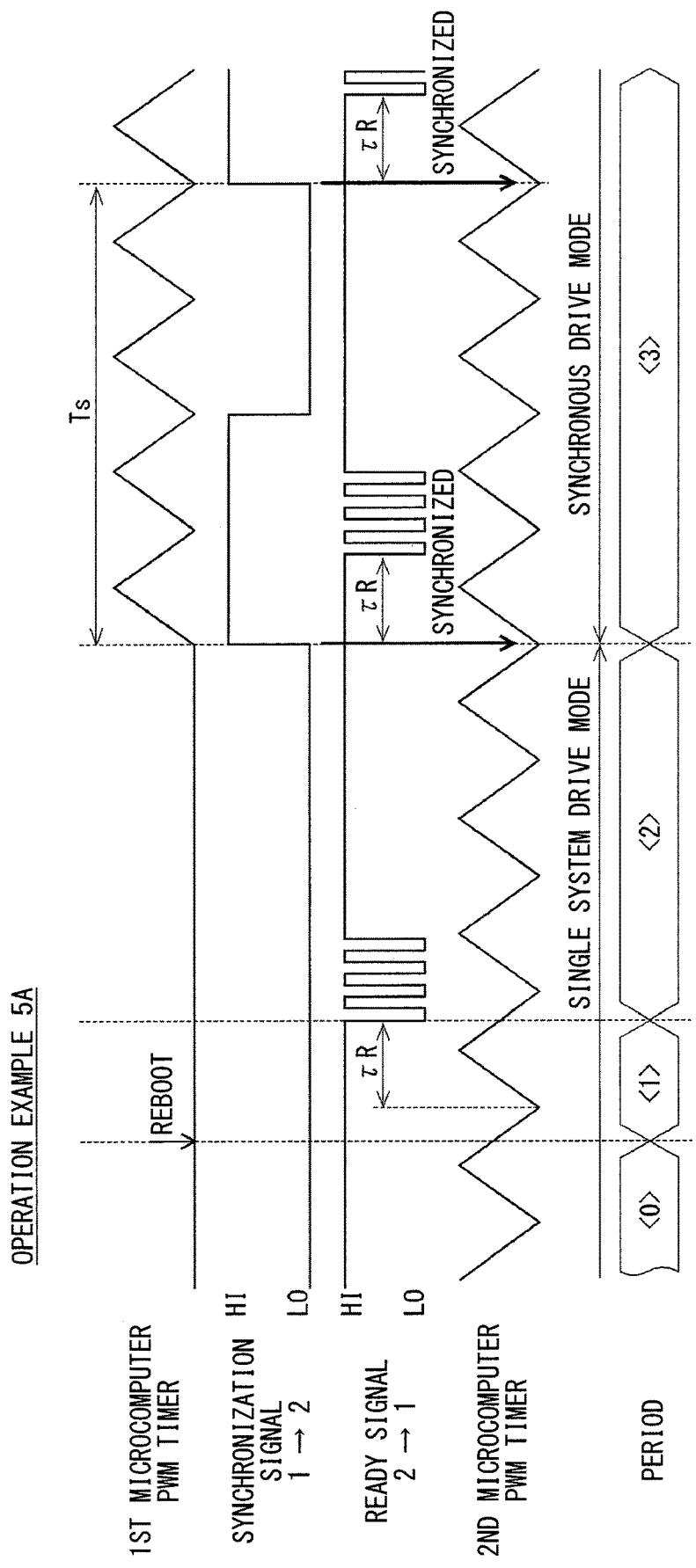
FIG. 33 is a timing chart of a handshaking operation example 5A upon rebooting.

According to the operation example 5A depicted in FIG. 33, the first microcomputer 401 is reset or the like to reboot while the second microcomputer 402 keeps operating. The second microcomputer 402 starts transmitting the ready signal at timing offset by predetermined time TR from bottom timing of the PWM timer.

During a period 0, the first microcomputer 401 is not yet rebooted and the second microcomputer 402 is operating solely. The first microcomputer 401 reboots during the period 1.

During the period 2, the first microcomputer 401 receives the ready signal from the second microcomputer 402 and finds bottom timing of the PWM timer of the second microcomputer 402 in accordance with reception start timing. The first microcomputer 401 then calculates expected timing of transmitting the synchronization signal to match bottom timing of the second microcomputer 402, and stands by until the timing.

During the period 3, the first microcomputer 401 transmits the synchronization signal at the calculated timing. The second microcomputer 402 restarts the timer at rise timing of the synchronization signal received from the first microcomputer 401 to achieve transition to the synchronous drive mode. Synchronous control can thus be achieved after the first microcomputer 401 reboots with secured operation continuation of the second microcomputer 402.

Figure 34:
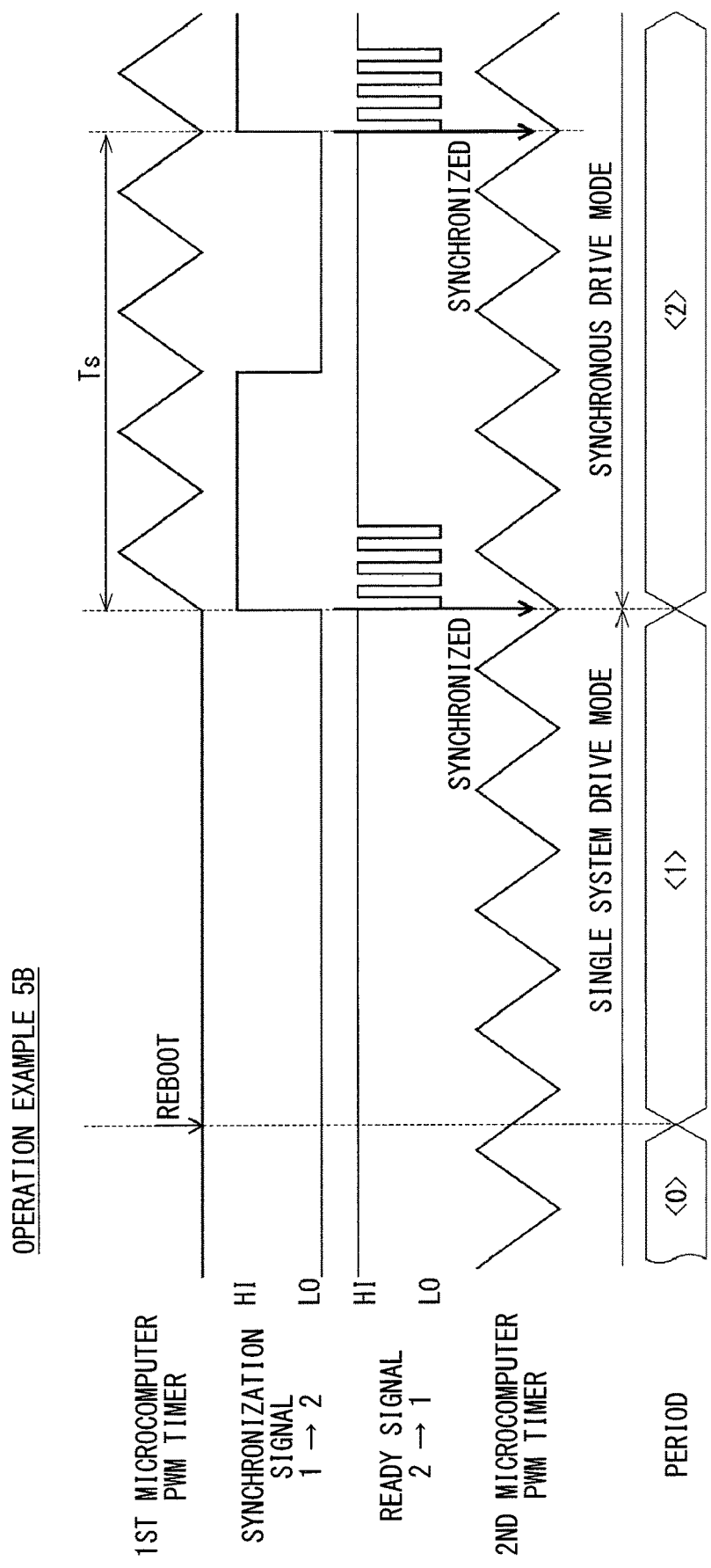
FIG. 34 is a timing chart of a handshaking operation example 5B upon rebooting.

According to the operation example 5B depicted in FIG. 34, as in the operation example 5A, the first microcomputer 401 is reset or the like to reboot while the second microcomputer 402 keeps operating. The second microcomputer 402 starts transmitting the ready signal at timing matching bottom timing of the PWM timer. In other words, the operation example 5B corresponds to a case where "τR=0" in the operation example 5A.

The periods 0 and 1 are similar to those of the operation example 5A.

During the period 2, the first microcomputer 401 receives the ready signal from the second microcomputer 402 and simultaneously transmits the synchronization signal. The second microcomputer 402 restarts the timer at rise timing of the synchronization signal received from the first microcomputer 401 to achieve transition to the synchronous drive mode. Synchronous control can thus be achieved after the first microcomputer 401 reboots with secured operation continuation of the second microcomputer 402.

Figure 35:
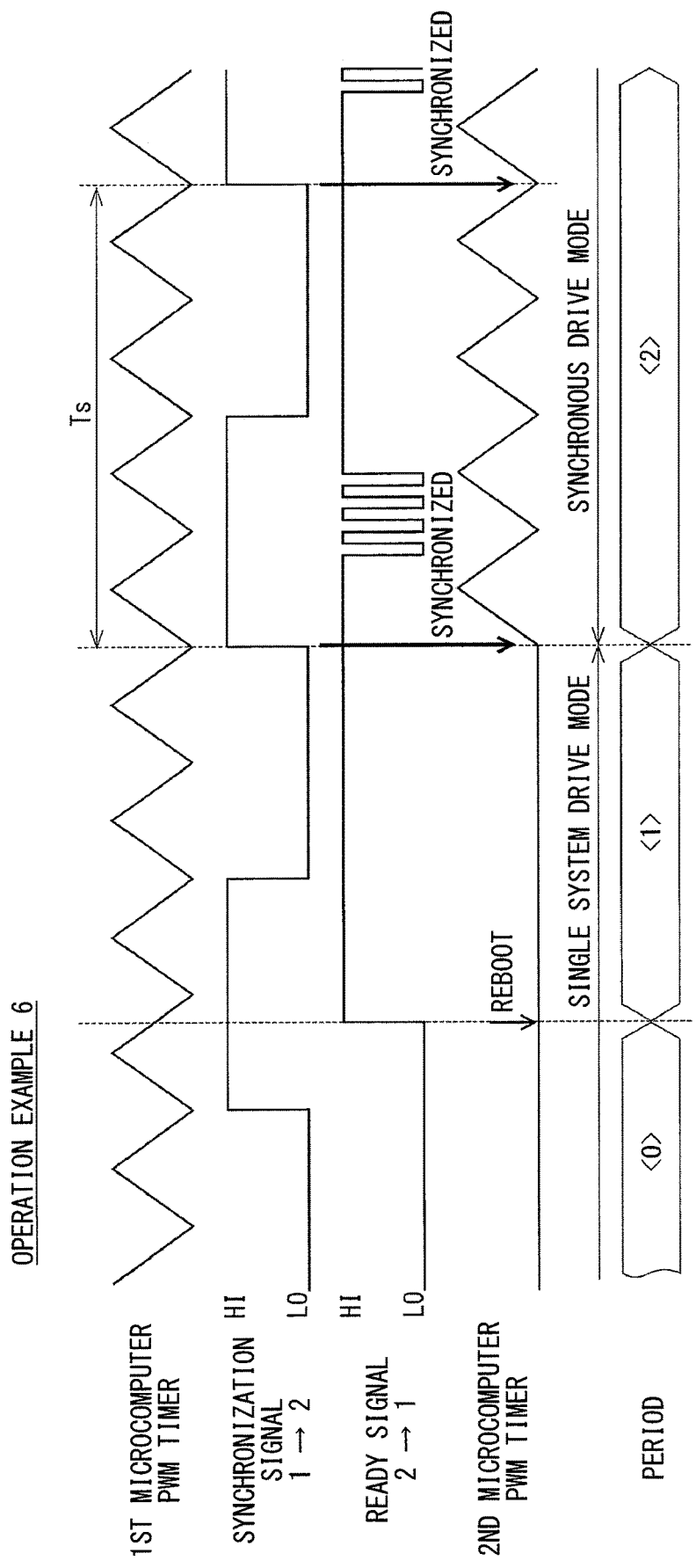
FIG. 35 is a timing chart of a handshaking operation example 6 upon rebooting.

According to the operation example 6 indicated in FIG. 35, the second microcomputer 402 is reset or the like to reboot while the first microcomputer 401 keeps operating.

During the period 0, the second microcomputer 402 is not yet rebooted and the first microcomputer 401 is operating solely. The second microcomputer 402 reboots during the period 1.

During the period 2, the second microcomputer 402 restarts the timer at rise timing of the synchronization signal received from the first microcomputer 401 to achieve transition to the synchronous drive mode. Synchronous control can thus be enabled after the second microcomputer 402 reboots.

As described above, also when one of the microcomputers reboots while another one of the microcomputers keeps operating, synchronous control is achieved from timer start with secured operation continuation such that the rebooted microcomputer operates in accordance with the synchronization signal or the ready signal from the microcomputer in operation.

Furthermore, when the microcomputers execute control with the unit of multiple cycles of the synchronization signal, the rebooted microcomputer starts the timer while recognizing control cycle reference timing for achievement of the control with the unit of multiple cycles.

Second Embodiment

The second embodiment will be described with reference to FIGS. 36 and 37.

Figure 36:
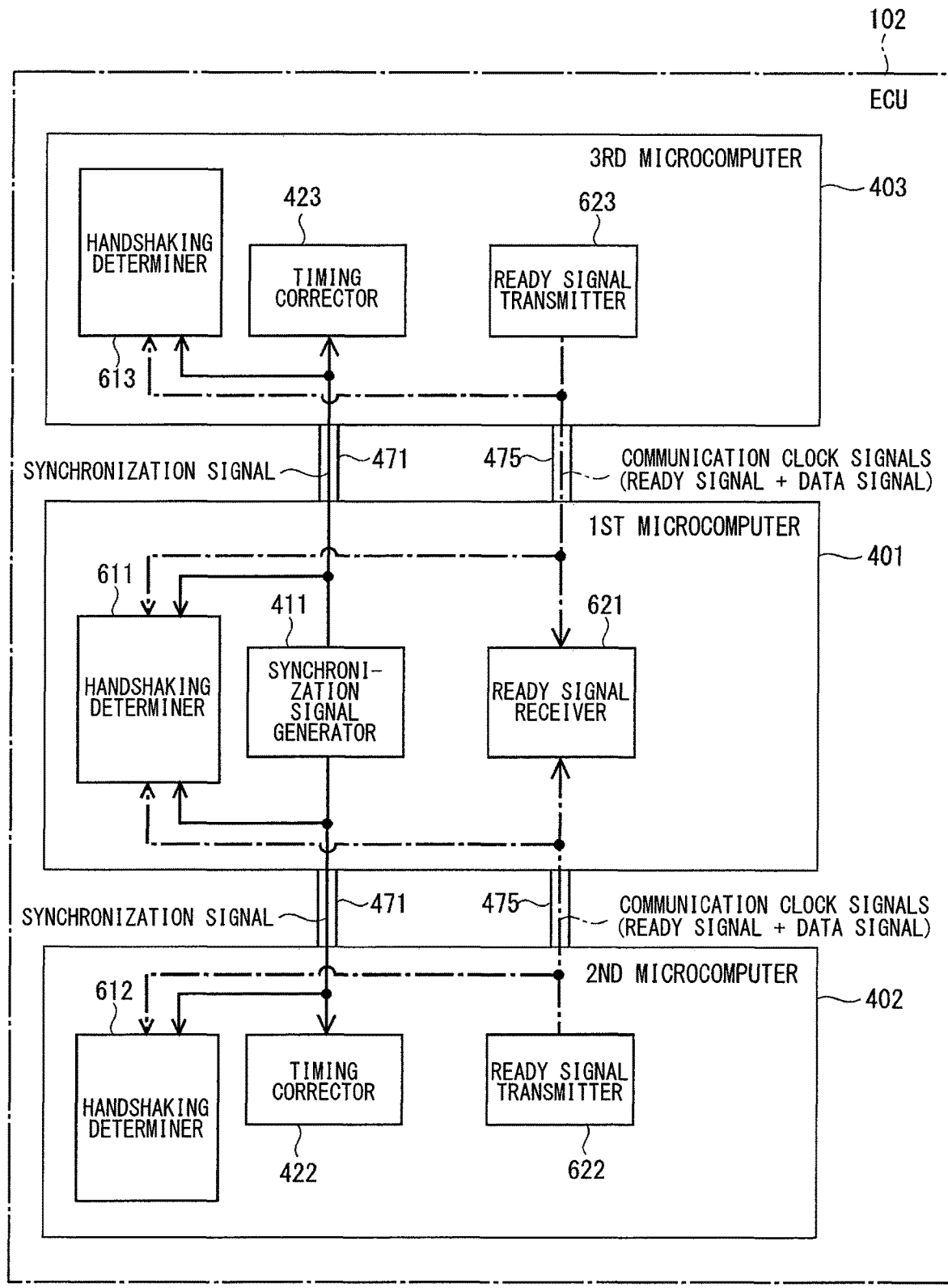
FIG. 36 is a configuration diagram of an ECU (motor control apparatus) according to a second embodiment.

FIG. 36 depicts an ECU 102 according to the second embodiment, which includes the single first microcomputer 401 as the synchronization signal transmitter microcomputer, and two microcomputers as the synchronization signal receiver microcomputers, namely, the second microcomputer 402 and a third microcomputer 403. FIG. 36 depicts only configurations relevant to transmission and reception of the synchronization signal and the ready signal in each of the microcomputers. The third microcomputer 403 includes a timing corrector 423, a ready signal transmitter 623, and a handshaking determiner 613 configured similarly to the timing corrector 422, the ready signal transmitter 622, and the handshaking determiner 612 of the second microcomputer 402, respectively.

Figure 37:
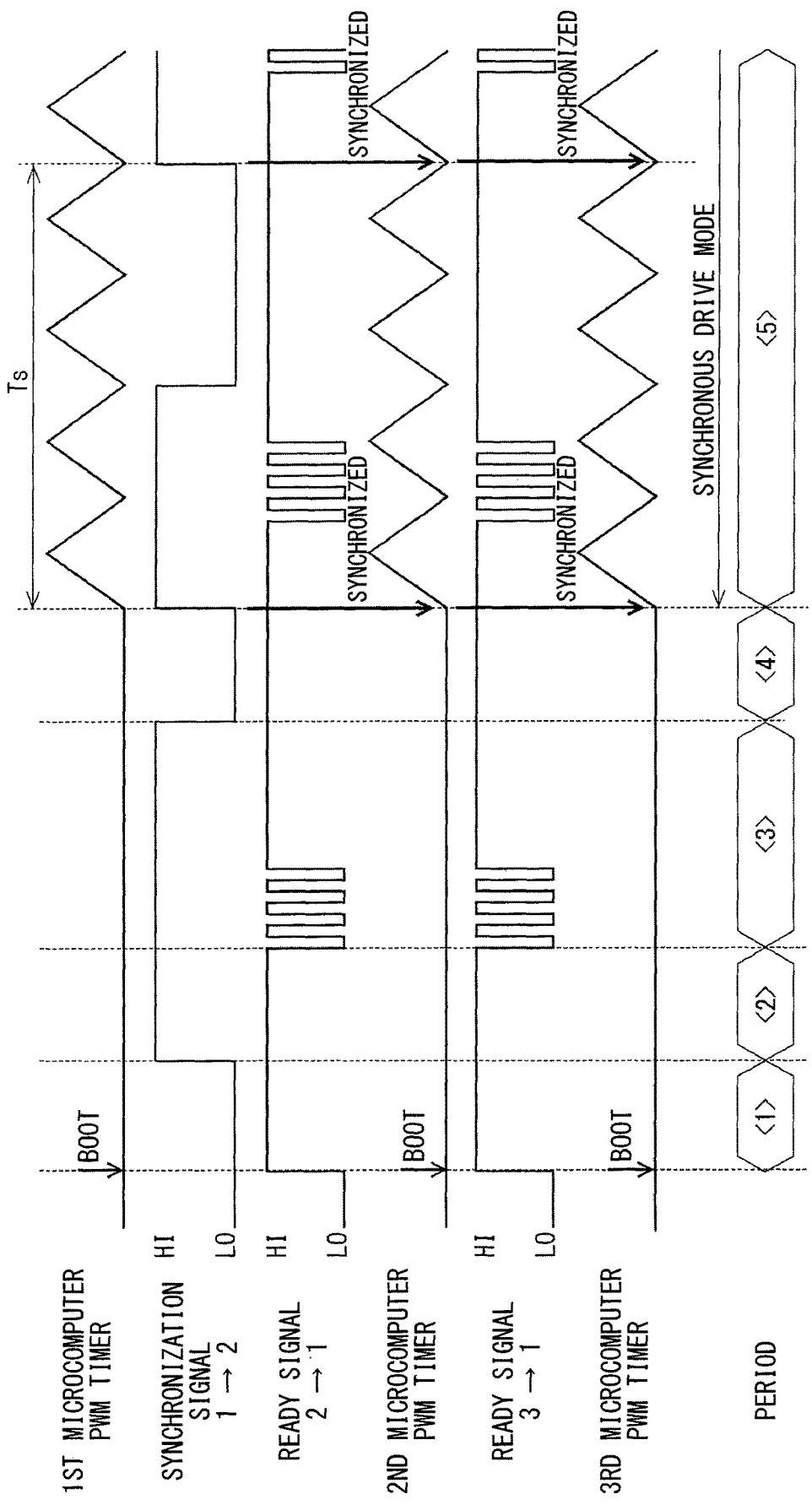
FIG. 37 is a timing chart of a handshaking operation example for three microcomputers.

FIG. 37 indicates an operation example of successful handshaking among the three microcomputers after booting, similarly to the operation example 1 of the first embodiment indicated in FIG. 20. Notes on the chart are similar to those on FIG. 20 and the like. Handshaking time will not be described repeatedly.

The microcomputers 401 to 403 have already booted during the period 1.

The first microcomputer 401 transmits the synchronization advance notice signal to each of the second microcomputer 402 and the third microcomputer 403 during the period 2.

The second microcomputer 402 and the third microcomputer 403 each receive the synchronization advance notice signal during the period 2.

During the period 3, each of the second microcomputer 402 and the third microcomputer 403 transmits the ready signal to the first microcomputer 401 in response to the received synchronization advance notice signal.

The first microcomputer 401 receives the ready signals during the period 3, and ends the synchronization advance notice signal during the period 4.

Through operation during the periods 2 to 4, the handshaking determiners 611 to 613 of the microcomputers 401 to 403 determine success in handshaking and command the respective drive timing generators to execute initial synchronization.

During a period 5, the first microcomputer 401 outputs the synchronization signal and starts the timer simultaneously. Each of the second microcomputer 402 and the third microcomputer 403 starts the timer at rise timing of the synchronization signal received from the first microcomputer 401. The microcomputers 401 to 403 thus synchronously drive the motor 80 initially after booting, in the synchronous drive mode.

The second embodiment described above relates to execution of handshaking with the ECU of a master/slave type, assuming that the single synchronization signal transmitter microcomputer corresponds to a master microcomputer and multiple synchronization signal receiver microcomputers corresponds to slave microcomputers.

The ECU including three microcomputers may alternatively be configured to transmit a synchronization signal from the first microcomputer to the second microcomputer and transmit a synchronization signal from the second microcomputer to the third microcomputer. The second microcomputer in this configuration functions as a synchronization signal receiver microcomputer in relation to the first microcomputer and functions as the synchronization signal transmitter microcomputer in relation to the third microcomputer. The ECU is configured as a chain type to execute handshaking.

An ECU including four or more microcomputers may be configured as the master/slave type, the chain type, or combination thereof, to execute handshaking among multiple microcomputers. In a case where a device including three or more systems is determined as failing to handshaking, the device drives the motor by only the own microcomputer without causing the other microcomputers to generate a motor drive signal. Such a drive mode is called a "partof-systems drive mode" with respect to the "single system drive mode" for the device including the two systems.

Third Embodiment

The third embodiment will be described with reference to FIGS. 38 to 42. The third embodiment is different from the first embodiment in configurations relevant to communication of the synchronization signal and the ready signal.

Figure 38:
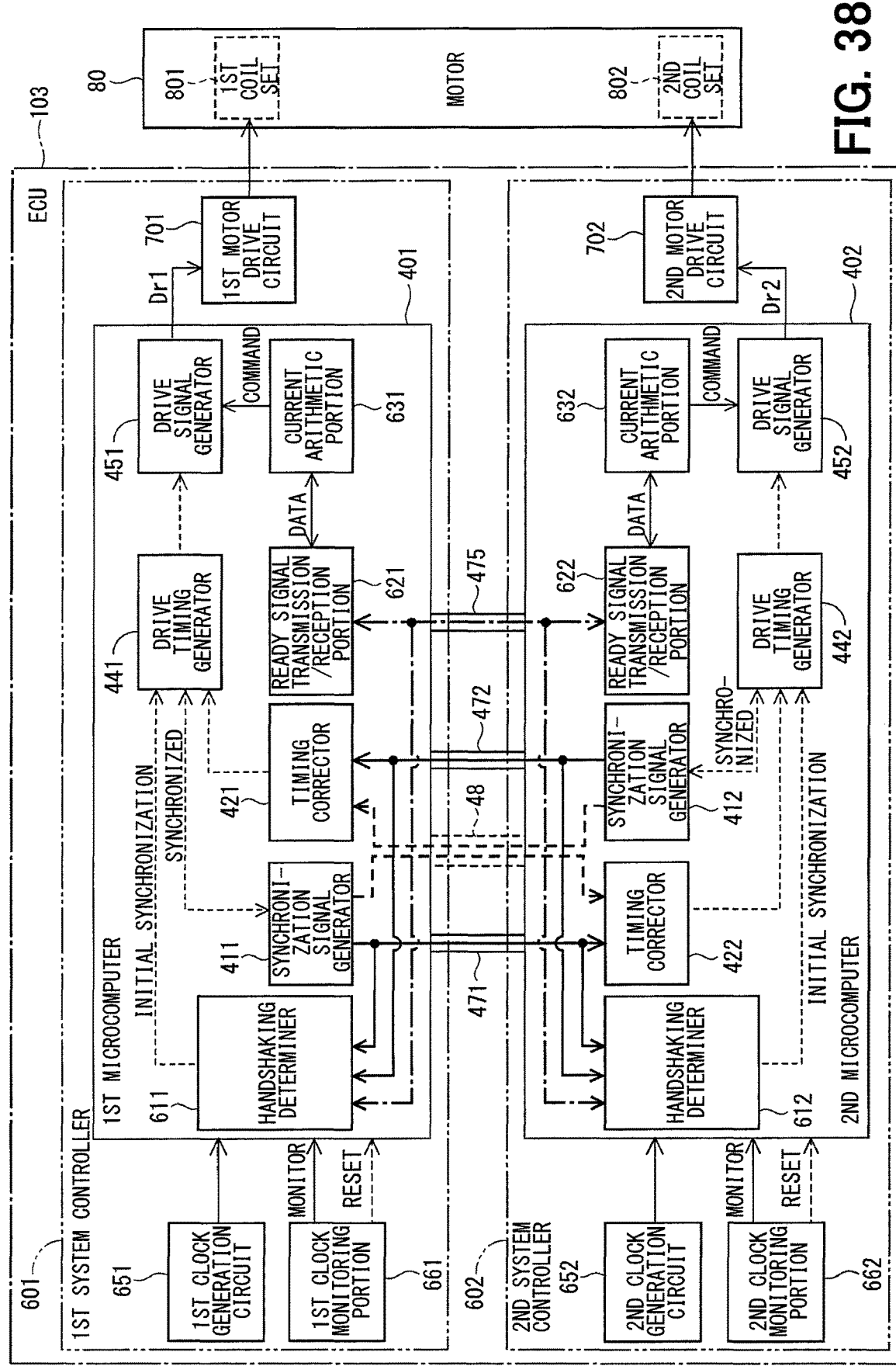
FIG. 38 is a configuration diagram of a portion according to the basic mode, in an ECU (motor control apparatus) according to a third embodiment.

As depicted in FIG. 38, the third embodiment provides an ECU 103 including the first and second microcomputers 401 and 402 provided with synchronization signal generators 411 and 412 and timing correctors 421 and 422, respectively. The first microcomputer 401 and the second microcomputer 402 function as the "synchronization signal transmitter microcomputer" and the "synchronization signal receiver microcomputer", respectively, and mutually transmit and receive the synchronization signals.

A synchronization signal line according to this mode may include, as depicted by solid lines, a first synchronization signal line 471 for transmission from the first microcomputer 401 to the second microcomputer 402, and a separate second synchronization signal line 472 for transmission from the second microcomputer 402 to the first microcomputer 401. These synchronization signal lines 471, 472 may alternatively be replaced with a synchronization signal line 48 for bidirectional communication as depicted by a broken line. The synchronization signal line 48 for bidirectional communication, or at least one of the synchronization signal lines 471 and 472 for unidirectional communication, may be used in common with any other signal line for communication between the microcomputers.

Figure 39:
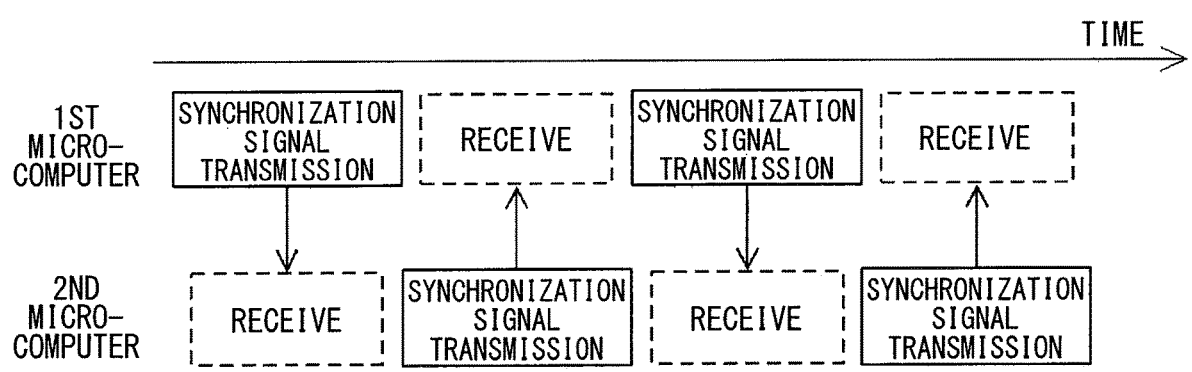
FIG. 39 is a chart indicating bidirectional synchronization signal transmission/reception timing according to the third embodiment.

When the common synchronization signal line 48 is adopted as a bidirectional signal line, as depicted in FIG. 39, timing of synchronization signal transmission from the first microcomputer 401 to the second microcomputer 402 is set not to match timing of reverse synchronization signal transmission. FIG. 39 particularly exemplifies a case where the microcomputers 401 and 402 alternately transmit the synchronization signals.

As in the first embodiment, the synchronization signals may be bidirectionally provided for notification not by means of bidirectional communication via the synchronization signal line but by means of level change of a port signal from the synchronization signal transmitter microcomputer to the synchronization signal receiver microcomputer.

In a case where the microcomputers 401 and 402 are boot at different timing, the initially booted microcomputer may transmit the synchronization signal to the subsequently booted microcomputer.

Still alternatively, the first microcomputer 401 may mainly transmit the synchronization signal to the second microcomputer 402, and the synchronization signal may be transmitted reversely only in a certain case. For example, the first microcomputer 401 may be booted synchronously with the synchronization signal from the second microcomputer 402 upon booting, and the second microcomputer 402 can then operate synchronously with the synchronization signal from the first microcomputer 401. When the first microcomputer 401 has abnormality and is reset, the first microcomputer 401 may determine own operation start timing and start operation in accordance with the synchronization signal from the second microcomputer 402. In this case, the first microcomputer 401 can restart driving the motor synchronously with the second microcomputer 402 after restoration from the abnormality.

As to transmission and reception of the ready signal, the first microcomputer 401 and the second microcomputer 402 have ready signal transmission/reception portions 621 and 622, respectively, to enable mutual transmission and reception of the ready signals. The ready signal transmission line 475 can include two unidirectional communication lines or may be configured by a bidirectional communication line, similarly to the synchronization signal line.

The third embodiment provides the first microcomputer 401 and the second microcomputer 402 functioned identically with each other with complete redundancy. This configuration is ready for any failure pattern in any one of the systems, and thus achieves improvement in reliability.

The common synchronization signal line 48 for bidirectional communication is adopted and timing of synchronization signal transmission in one of the directions is set not to match timing of synchronization signal transmission in the other one of the directions. This achieves reduction in the number of components of the ECU as well as simplification in configuration of the ECU.

OPERATION EXAMPLE 7

Figure 40:
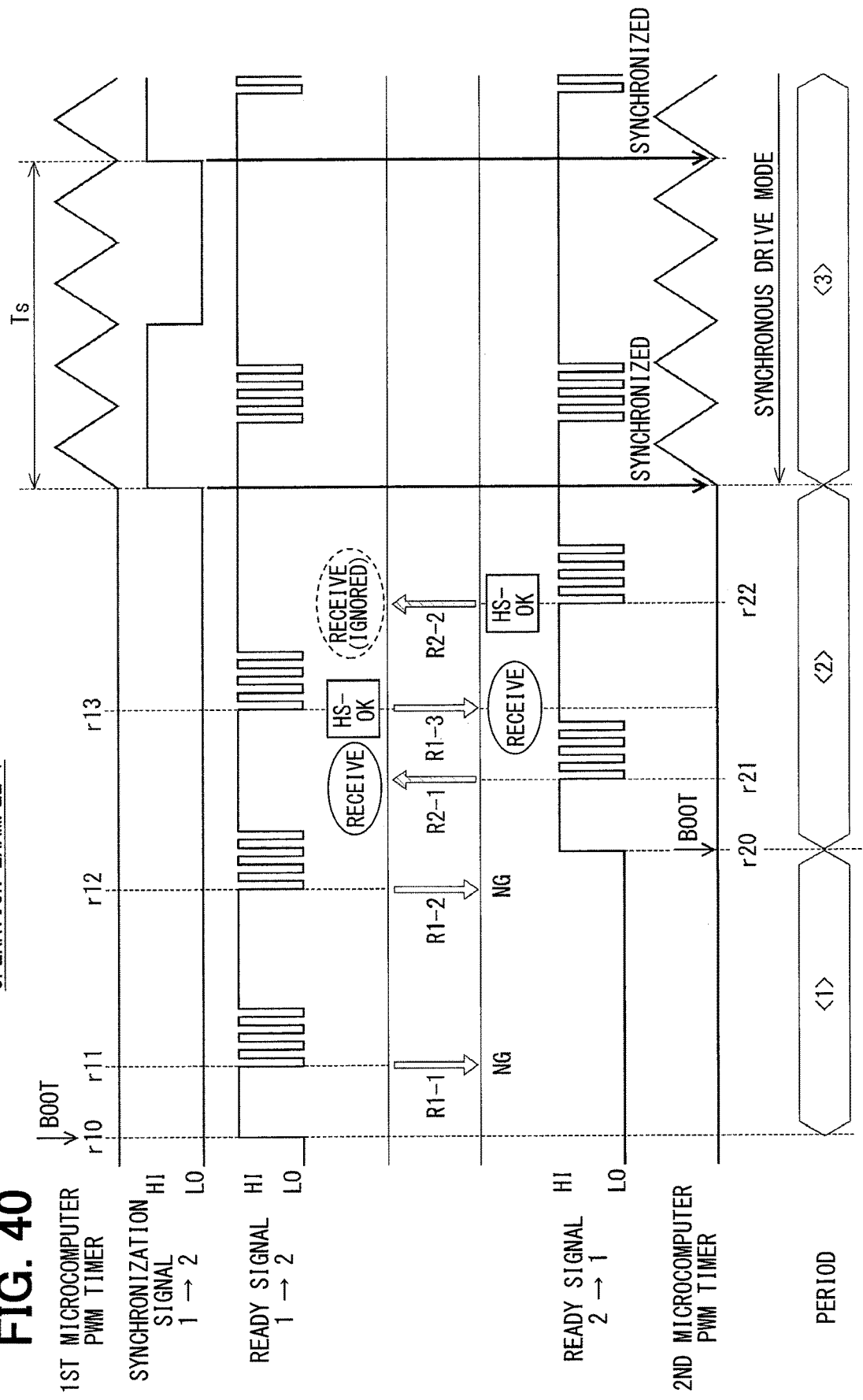
FIG. 40 is a timing chart of a handshaking operation example 7.

The third embodiment provides the operation example 7 of handshaking as indicated in FIG. 40, through mutual transmission and reception of the ready signals by the microcomputers 401 and 402. Transmission and reception of the synchronization signal according to the operation example 7 assumes for convenience that the first microcomputer 401 functions as the synchronization signal transmitter microcomputer and the second microcomputer 402 functions as the synchronization signal receiver microcomputer. The microcomputers 401 and 402 may alternatively interchange the functions of the transmitter and the receiver of the synchronization signal. Not limited to the configuration depicted in FIG. 38, the operation example 7 may alternatively be executed by an ECU configured to achieve bidirectional transmission and reception of only the ready signals and unidirectional transmission and reception of the synchronization signal.

FIG. 40 includes arrows "R1-n (n=1, 2, or 3)" each indicating a ready signal transmitted from the first microcomputer 401 to the second microcomputer 402 n-th time after the first microcomputer 401 boots. FIG. 40 also includes arrows "R2-n (n=1 or 2)" each indicating a ready signal transmitted from the second microcomputer 402 to the first microcomputer 401 n-th time after the second microcomputer 402 boots. These ready signals include two types of ready signals, specifically, the ready signal for notification of boot completion of the own microcomputer, and the ready signal indicating success in handshaking ("HS-OK" in the figure).

FIG. 40 does not provide detailed division of detailed periods, but provides only division with rough framing. At time r10 during the period 1, the first microcomputer 401 boots before the second microcomputer 402 boots. The first microcomputer 401 transmits ready signals R1-1 and R1-2 indicating "boot completion" at time r11 and time r12 in a predetermined cycle after booting, but the second microcomputer 402 not yet booted does not receive these ready signals. The figure includes "NG" indicating failure in reception of the ready signal.

After the second microcomputer 402 boots at time r20 during the period 2, the second microcomputer 402 transmits a ready signal R2-1 indicating "boot completion" at time r21, and the first microcomputer 401 receives this ready signal. At time r13 after reception of the ready signal R2-1, the first microcomputer 401 transmits a ready signal R1-3 indicating "success in handshaking" and the second microcomputer 402 receives this ready signal. At time r22 after reception of the ready signal R1-3, the second microcomputer 402 transmits a ready signal R2-2 indicating "success in handshaking". The first microcomputer 401 receives the ready signal R2-2, but ignores the ready signal R2-2 because already determined success in handshaking.

Both of the microcomputers 401 and 402 determine success in handshaking in this manner, and the first microcomputer 401 outputs the synchronization signal and starts the timer simultaneously during the subsequent period 3. The second microcomputer 402 starts the timer at rise timing of the synchronization signal received from the first microcomputer 401. The microcomputers 401 and 402 thus synchronously drive the motor 80 initially after booting.

Figure 41:
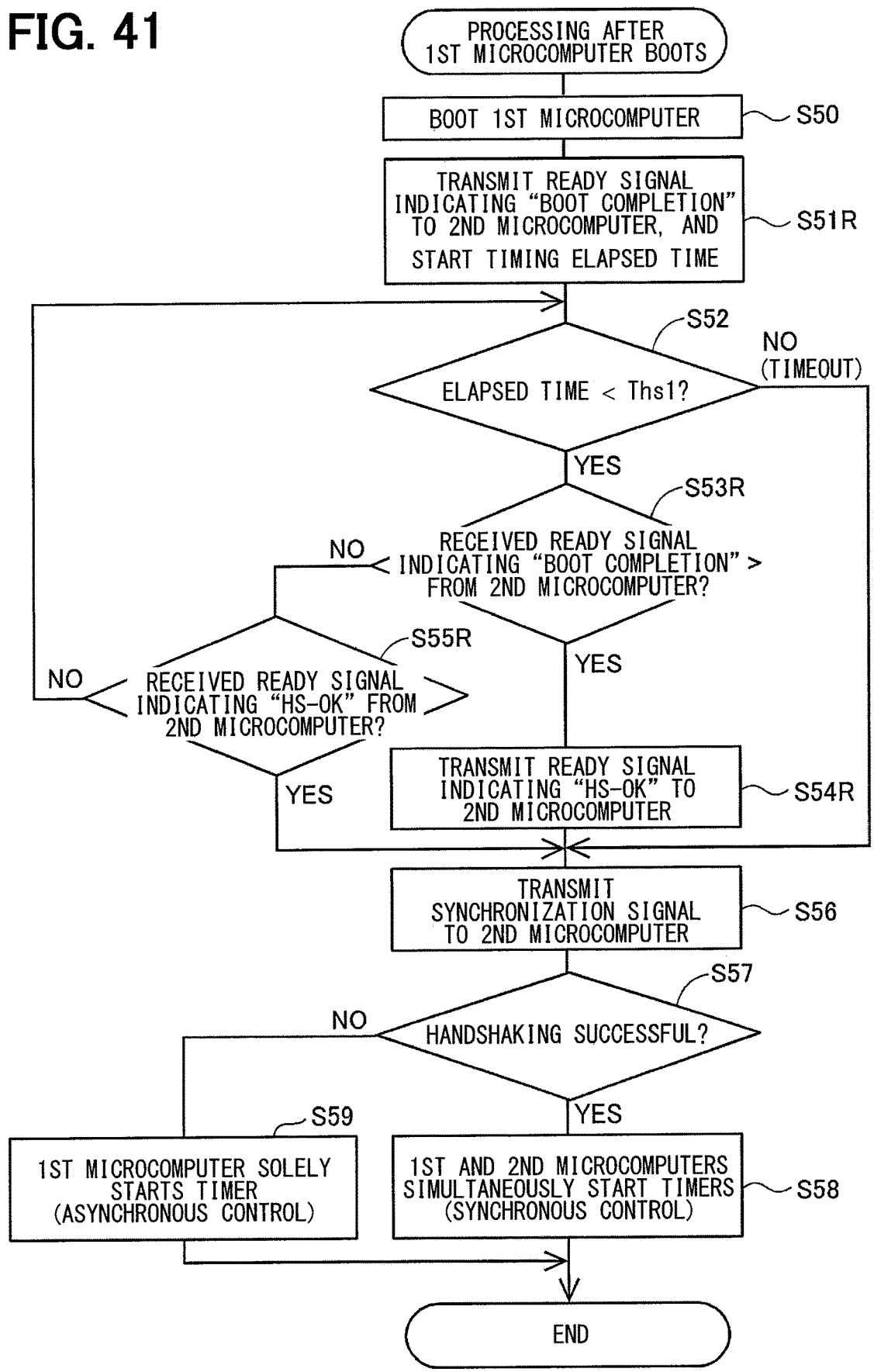
FIG. 41 is a flowchart of processing after the first microcomputer boots according to the operation example 7.
Figure 42:
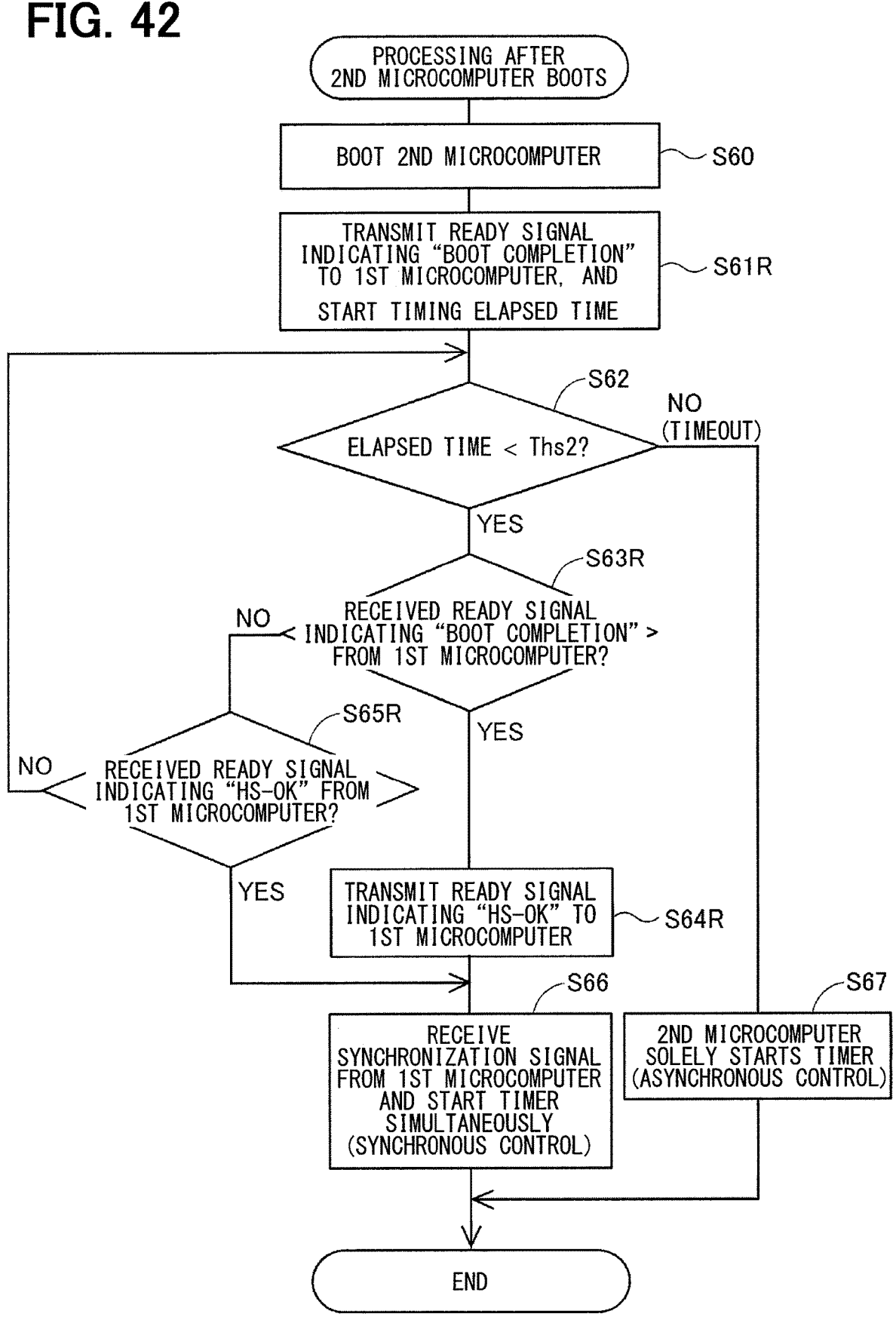
FIG. 42 is a flowchart of processing after the second microcomputer boots according to the operation example 7.

FIGS. 41 and 42 are flowcharts of processing after the first microcomputer 401 and the second microcomputer 402 boot, respectively, according to the operation example 7. FIGS. 41 and 42 include steps that are in common with those depicted in FIGS. 26 and 27, are denoted by identical step numbers, and will not be described where appropriate. Steps unique to the operation example 7 will have letter "R" at the ends of step numbers.

FIG. 41 depicts processing after the first microcomputer boots. In S51R, the first microcomputer 401 transmits the ready signal indicating "boot completion" to the second microcomputer 402 and starts timing elapsed time.

If the elapsed time is less than the first handshaking time Ths1 and YES is determined in S52, whether the first microcomputer 401 has received the ready signal indicating "boot completion" from the second microcomputer 402 is determined in S53R. If the first microcomputer 401 has received the ready signal indicating "boot completion" and YES is determined in S53R, the first microcomputer 401 transmits the ready signal indicating "success in handshaking" to the second microcomputer 402 in S54R. The process flow then proceeds to S56.

If the first microcomputer 401 does not receive the ready signal indicating "boot completion" and NO is determined in S53R, whether the first microcomputer 401 has received the ready signal indicating "success in handshaking" from the second microcomputer 402 is determined in S55R. If YES is determined in S55R, the process flow proceeds to S56. If the first microcomputer 401 has not yet received the ready signal indicating "success in handshaking" and NO is determined in S55R, the process flow returns to before S52.

If the elapsed time reaches the first handshaking time Ths1 and NO (i.e. timeout) is determined in S52, the process flow also proceeds to S56.

In S56, the first microcomputer 401 transmits the synchronization signal to the second microcomputer 402. S57 to S59 are similar to those depicted in FIG. 26. Synchronous control is executed in S58 when the ready signals indicating "success in handshaking" are transmitted and received. Asynchronous control is executed in S59 upon timeout.

FIG. 42 depicts processing after the second microcomputer boots. In S61 R, the second microcomputer 402 transmits the ready signal indicating "boot completion" to the first microcomputer 401 and starts timing elapsed time.

If the elapsed time is less than the second handshaking time Ths2 and YES is determined in S62, whether the second microcomputer 402 has received the ready signal indicating "boot completion" from the first microcomputer 401 is determined in S63R. If the second microcomputer 402 has received the ready signal indicating "boot completion" and YES is determined in S63R, the second microcomputer 402 transmits the ready signal indicating "success in handshaking" to the first microcomputer 401 in S64R. The process flow then proceeds to S66.

If the second microcomputer 402 does not receive the ready signal indicating "boot completion" and NO is determined in S63R, whether the second microcomputer 402 has received the ready signal indicating "success in handshaking" from the first microcomputer 401 is determined in S65R. If YES is determined in S65R, the process flow proceeds to S66. If the second microcomputer 402 has not yet received the ready signal indicating "success in handshaking" and NO is determined in S65R, the process flow returns to before S62.

If the elapsed time reaches the second handshaking time Ths2 and NO (i.e. timeout) is determined in S62, the second microcomputer 402 solely starts the timer and executes asynchronous control in S67. As in FIG. 27, synchronization processing steps S50, S68, S69, and S80 after the first microcomputer boots may be executed subsequently to S67.

As described above, the operation example 7 achieves preferred execution of handshaking through mutual transmission and reception of the ready signals between the microcomputers 401 and 402.

Fourth and Fifth Embodiments

The fourth and fifth embodiments will be described with reference to FIGS. 43 and 44.

The ECUs 10 according to the fourth and fifth embodiments are basically configured as depicted in FIG. 7 according to the basic mode of the first embodiment. The fourth and fifth embodiments provide received signal determination not by determination of synchronization signal reception timing but by adoption of a synchronization signal having a specific pulse pattern for determination of normality or abnormality of the synchronization signal. The "timing determiner 432" in the timing corrector 422 of the second microcomputer 402 is thus replaced with a "received signal determiner 432".

Processing to be executed when the received signal determiner 432 according to the fourth or fifth embodiment determines the synchronization signal as being normal or abnormal is similar to that according to the basic mode of the first embodiment.

The specific pulse pattern has a number of pulses, duration, or an interval prescribed per cycle. Unlike FIGS. 11 and 14, FIGS. 43 and 44 do not clearly indicate a cause of synchronization signal abnormality but simply indicate difference between a normal pulse pattern and an abnormal pulse pattern.

Figure 43:
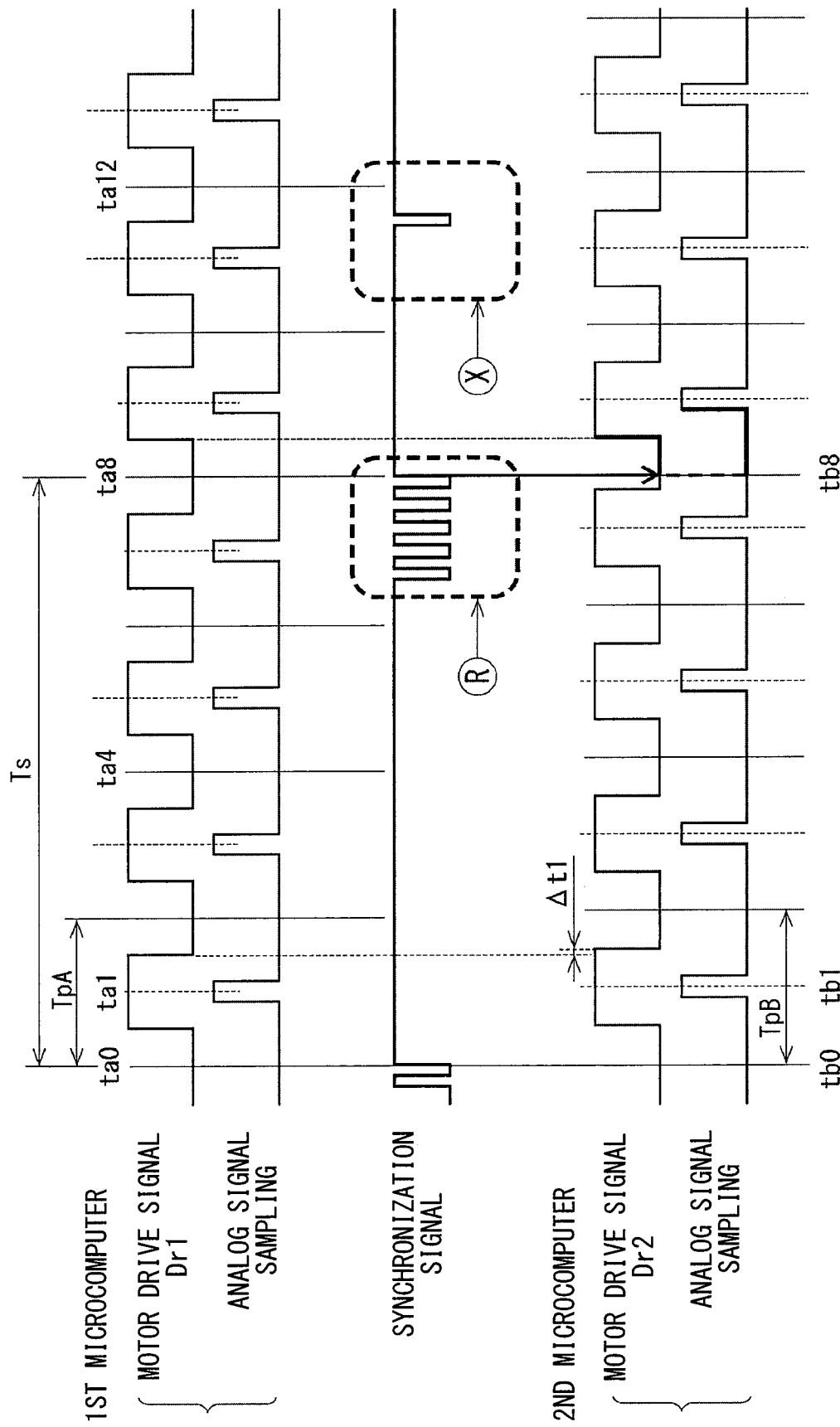
FIG. 43 is a timing chart according to a fourth embodiment, with a synchronization signal having a specific pulse pattern.

As indicated in a portion R in FIG. 43 according to the fourth embodiment, the synchronization signal is determined as being normal if a clock having predetermined duration is inputted k times as a prescribed number of times. The synchronization signal receiver microcomputer executes timing correction, in other words, synchronization of drive timing between the microcomputers, at k-th clock input timing.

If the synchronization signal has different pulse duration or has a different consecutive number of times as indicated in a portion X, timing correction is not executed and the motor is driven asynchronously.

The fifth embodiment includes, when a clock line for serial communication or the like is adopted as a synchronization signal line in a configuration for commonality between a synchronization signal and a different signal, calculation of reliability of received data according to the CRC method or the like with reception of serial communication as a trigger. Synchronization between the microcomputers is permitted if proper communication is found to be executed.

Figure 44:
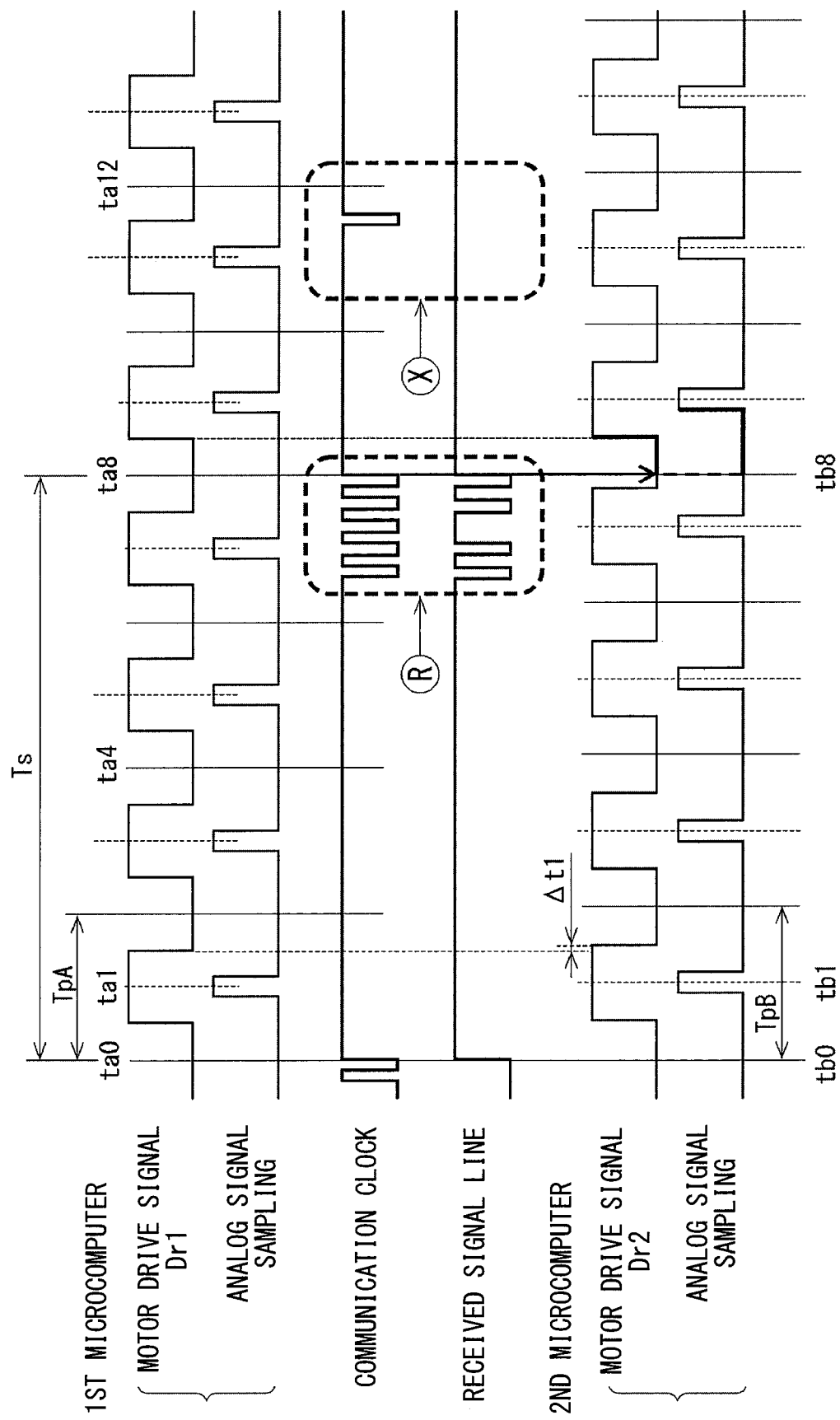
FIG. 44 is a timing chart according to a fifth embodiment, with a synchronization signal having a specific pulse pattern.

FIG. 44 indicates a pulse of a communication clock and a pulse of a received signal line according to the fifth embodiment. In the portion R, timing correction is executed with reception completion timing as a reference when CRC normality is determined. Timing correction may be executed in accordance with any appropriately set specific method, such as synchronization through correction by time required for CRC calculation.

In the portion X, timing correction is not executed with determination as abnormal timing due to CRC inconsistency.

In this manner, the received signal determiner 432 is configured to determine normality or abnormality of the synchronization signal in accordance with a specific pulse pattern, instead of the method by means of synchronization signal reception timing according to the basic mode of the first embodiment.

Processing depicted in FIGS. 15 to 18 is applicable also to the format according to the fourth or fifth embodiment for execution of received signal determination according to a specific pulse pattern. The fourth or fifth embodiment is applicable to the format according to the third embodiment of bidirectional transmission and reception of the synchronization signals and the ready signals.

Other Embodiments (a) The motor 80 to be controlled in the above embodiments is a multiple winding motor including the two coil sets 801 and 802 disposed at the common stator to be shifted from each other by the electrical angle of 30 degrees. A motor to be controlled in other embodiments may alternatively include two or more coil sets disposed to have the same phases. The present disclosure is not limited to such a configuration including a single motor having a common stator provided with two or more coil sets, but is applicable to multiple motors including multiple stators separately provided with the coil sets wound therearound and configured to cooperatively output torque.

The number of phases of a multiphase brushless motor is not limited to three, but may be four or more. The motor to be driven is not limited to an AC brushless motor but may be a DC brush motor. The "motor drive circuit" may be an H bridge circuit in this case.

Figure 25:
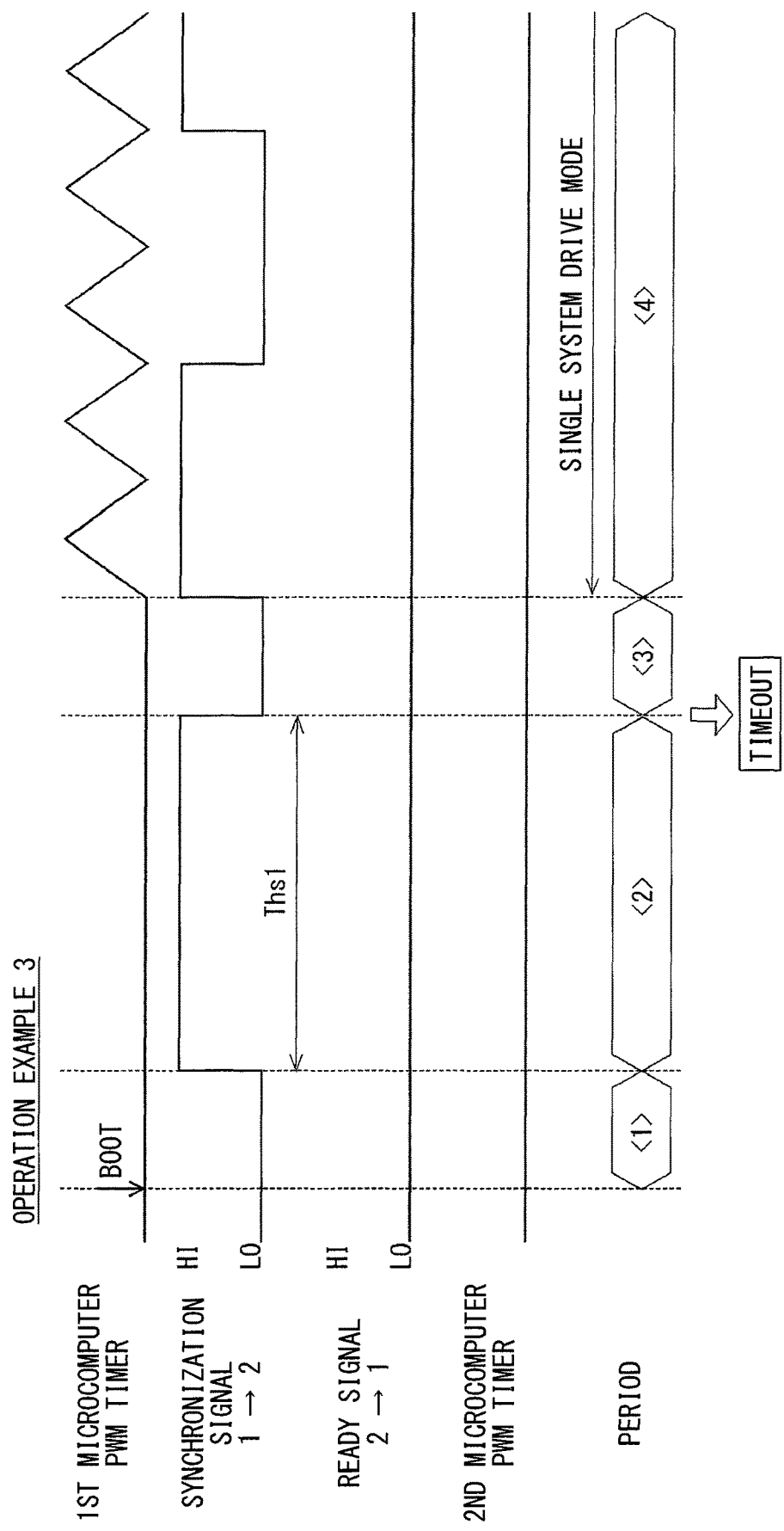
FIG. 25 is a timing chart of a handshaking operation example 3.

(b) In the handshaking operation examples indicated in FIGS. 20 and 25, the first microcomputer 401 having booted transmits the synchronization signal at the high level as the synchronization advance notice signal to the second microcomputer 402. Not limited to such a format of adopting the synchronization advance notice signal, the second microcomputer 402 may be notified, by some means, that the first microcomputer 401 has booted and the second microcomputer 402 may transmit the ready signal in accordance with the notification.

In an exemplary system in which the first microcomputer 401 always boots before the second microcomputer 402 boots, the second microcomputer 402 may transmit the ready signal at own timing, not in accordance with the synchronization advance notice signal transmitted from the first microcomputer 401. In this case, initially, the handshaking determiners 611 and 612 can determine success in handshaking only in accordance with normal transmission and reception of the ready signal from the second microcomputer 402 to the first microcomputer 401.

(c) The motor control apparatus may not include the analog signal sampling portion that is synchronized with the motor drive timing generator. In this case, the motor control apparatus may execute control arithmetic in accordance with externally acquired digital data. The motor control apparatus may alternatively execute feedforward control not in accordance with feedback information.

In the configuration including the analog signal sampling portion, sample timing may match switch timing of the motor drive signal.

(d) The motor drive signals may be generated in accordance with a PWM control technique indicated in FIG. 8 and the like, a pulse pattern technique of selecting an appropriate one from multiple prestored pulse patterns in accordance with a modulation factor or rotational speed, or the like. The carrier wave according to the PWM control technique is not limited to a triangular wave but may be a sawtooth wave.

(e) The motor control apparatus according to the present disclosure may be applied to a motor for an electric power steering apparatus as well as to a motor for any other purpose.

The present disclosure should not be limited to these embodiments, but may be embodied in various modes within a scope not departing from the purpose.

The present disclosure has been described in accordance with the embodiments. The present disclosure should, however, not be limited to these embodiments and the structures thereof. The present disclosure may include various modification examples as well as modifications made within equivalent ranges. Various combinations and modes, as well as other combinations and modes achieved by adding only one element, more elements, or less elements to the various combinations and modes will fall within the scope and the ideological range of the present disclosure.

At least one controller, at least one processor, and at least one method described in the present disclosure may be implemented by a special purpose computer created by configuring a memory and a processor programmed to execute one or more particular functions embodied in computer programs. Alternatively, the controller(s) and method(s) described in the present disclosure may be implemented by a special purpose computer created by configuring a processor provided by one or more special purpose hardware logic circuits. Further alternatively, the controller(s) and method(s) described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes multiple steps (also referred to as sections), each of which is represented, for instance, as S10. Further, each step can be divided into several sub-steps while several steps can be combined into a single step.

While various embodiments, configurations, and aspects of a motor control apparatus, a motor drive system, and a motor control method according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A motor control apparatus comprising:
a plurality of motor drive circuits that drives at least one motor;
a plurality of microcomputers that include
a drive signal generator generating a motor drive signal as a command to each of the motor drive circuits, and
a drive timing generator generating a drive timing as a pulse timing of the motor drive signal; and
a plurality of clock generation circuits that independently generates clocks as operation reference of the plurality of microcomputers,
wherein:
the plurality of microcomputers include a synchronization signal transmitter microcomputer as at least one microcomputer that transmits a synchronization signal synchronized with the drive timing of an own microcomputer and synchronizing the drive timing of the plurality of microcomputers;
the plurality of microcomputers include a synchronization signal receiver microcomputer as at least one microcomputer that receives the synchronization signal transmitted from the synchronization signal transmitter microcomputer;
the synchronization signal transmitter microcomputer includes a synchronization signal generator that generates the synchronization signal and transmits the synchronization signal to the synchronization signal receiver microcomputer;
the synchronization signal receiver microcomputer includes a timing corrector that is configured to execute timing correction for correcting the drive timing of the own microcomputer to be synchronized with the synchronization signal received;
the synchronization signal receiver microcomputer further includes a ready signal transmitter that transmits, to the synchronization signal transmitter microcomputer, a ready signal indicating synchronization preparation completion of the own microcomputer;
the synchronization signal transmitter microcomputer further includes a ready signal receiver that receives the ready signal;
the synchronization signal transmitter microcomputer and the synchronization signal receiver microcomputer include a handshaking determiner that determines success in a handshaking when the handshaking at least including transmission and reception of the ready signal is executed normally; and
when determining the handshaking as being successful, the synchronization signal transmitter microcomputer and the synchronization signal receiver microcomputer synchronously drive the motor initially after booting.

2. The motor control apparatus according to claim 1, wherein:
the synchronization signal transmitter microcomputer transmits to the synchronization signal receiver microcomputer, after the own microcomputer boots, a synchronization advance notice signal for advance notice of synchronization signal generation;
the synchronization signal receiver microcomputer transmits, after reception of the synchronization advance notice signal, the ready signal to the synchronization signal transmitter microcomputer; and
the handshaking determiner determines success in the handshaking when the handshaking including transmission and reception of the synchronization advance notice signal and the ready signal is executed normally.

3. The motor control apparatus according to claim 1, wherein:
the handshaking determiner determines failure in the handshaking upon occurrence of timeout that a predetermined time elapses before reception of the ready signal or the synchronization advance notice signal to be transmitted from a different microcomputer, or upon transmission and reception of an abnormal signal.

4. The motor control apparatus according to claim 3, wherein:
when the handshaking is determined as being unsuccessful due to the timeout,
the handshaking determiner in the own microcomputer notifies the drive timing generator to generate the motor drive signal in a part-of-systems drive mode of driving the motor only by the own microcomputer without causing a different microcomputer to generate the motor drive signal.

5. The motor control apparatus according to claim 3, wherein:
when the handshaking is determined as being unsuccessful due to transmission and reception of the abnormal signal,
the plurality of microcomputers drives the motor asynchronously.

6. The motor control apparatus according to claim 5, wherein:
the plurality of microcomputers store information on failure in the handshaking;
the synchronization signal transmitter microcomputer transmits the synchronization signal to the synchronization signal receiver microcomputer during asynchronous control and achieve synchronization.

7. The motor control apparatus according to claim 1, wherein:
when the synchronization signal transmitter microcomputer reboots while the synchronization signal receiver microcomputer keeps operating,
the synchronization signal transmitter microcomputer having rebooted is synchronized at timing of transmitting the synchronization signal after reception of the ready signal from the synchronization signal receiver microcomputer or at timing of transmitting the synchronization signal simultaneously with reception of the ready signal; and
when the synchronization signal receiver microcomputer reboots while the synchronization signal transmitter microcomputer keeps operating,
the synchronization signal receiver microcomputer having rebooted is synchronized at timing of receiving the synchronization signal from the synchronization signal transmitter microcomputer.

8. The motor control apparatus according to claim 1, further comprising:
at least one synchronization signal line that connects the synchronization signal transmitter microcomputer and the synchronization signal receiver microcomputer to allow the synchronization signal to be transmitted and received therethrough.

9. The motor control apparatus according to claim 8, wherein:
the ready signal transmitter transmits, to the synchronization signal transmitter microcomputer, the ready signal via the synchronization signal line or a ready signal line provided separately from the synchronization signal line.

10. The motor control apparatus according to claim 1, wherein:
the timing corrector of the synchronization signal receiver microcomputer includes a received signal determiner that executes a received signal determination of determining normality or abnormality of the synchronization signal received;
the synchronization signal receiver microcomputer permits the timing correction when the synchronization signal is determined as being normal in the received signal determination;
the synchronization signal receiver microcomputer prohibits the timing correction when the synchronization signal is determined as being abnormal in the received signal determination, and drives the motor asynchronously with the synchronization signal transmitter microcomputer.

11. The motor control apparatus according to claim 1, wherein:
the plurality of microcomputers are disposed with a predetermined space on an identical surface of an identical substrate.

12. A motor control apparatus comprising:
a plurality of motor drive circuits that drives at least one motor;
a plurality of microcomputers that include
 a drive signal generator generating a motor drive signal as a command to each of the motor drive circuits, and
 a drive timing generator generating a drive timing as a pulse timing of the motor drive signal; and
a plurality of clock generation circuits that independently generate clocks as operation reference of the plurality of microcomputers,
wherein:
the plurality of microcomputers includes a synchronization signal transmitter microcomputer as at least one microcomputer that transmits a synchronization signal synchronized with the drive timing of an own microcomputer and synchronizing the drive timing of the plurality of microcomputers;
the plurality of microcomputers includes a synchronization signal receiver microcomputer as at least one microcomputer that receives the synchronization signal transmitted from the synchronization signal transmitter microcomputer;
the motor control apparatus has three drive modes of:
a synchronous drive mode of driving the motor synchronously by the synchronization signal transmitter microcomputer and the synchronization signal receiver microcomputer having received the synchronization signal;
an asynchronous drive mode of driving the motor asynchronously by the synchronization signal transmitter microcomputer and the synchronization signal receiver microcomputer not in accordance with the synchronization signal; and
a part-of-systems drive mode of driving the motor by only one of the synchronization signal transmitter microcomputer and the synchronization signal receiver microcomputer; and
the motor control apparatus is configured to transit from the part-of-systems drive mode, to the asynchronous drive mode, and then to the synchronous drive mode in an order upon booting the synchronization signal transmitter microcomputer and the synchronization signal receiver microcomputer.

13. A motor drive system comprising:
the motor control apparatus according to claim 1; and
the motor configured as a brushless motor including a plurality of multiphase coil sets that are disposed coaxially and is electrified by the motor control apparatus.

14. The motor drive system according to claim 13, wherein:
the motor control apparatus is provided integrally at an axial end of the motor.

15. A motor drive system comprising:
the motor control apparatus included in a vehicle electric power steering apparatus and according to claim 1; and
the motor that is driven by the motor control apparatus and outputs assist torque.

16. The motor drive system according to claim 15, comprising:
two power sources;
the motor that is provided with two multiphase coil sets having electric power supplied from the two power sources, respectively;
the motor control apparatus that includes
 the two microcomputers controlling electrification to the two multiphase coil sets, respectively, and
 two motor drive circuits that each receives the motor drive signal as a command from a corresponding one of the two microcomputers;
two steering torque sensors that detect steering torque and output the steering torque to the two microcomputers; and
two rotation angle sensors that detect electrical angles of the motor and output the electrical angles to the two microcomputers.

17. A motor control method executed by a motor control apparatus comprising:
a plurality of motor drive circuits that drives at least one motor;
a plurality of microcomputers that includes
 a drive signal generator generating a motor drive signal as a command to each of the motor drive circuits, and
 a drive timing generator generating a drive timing as a pulse timing of the motor drive signal; and
a plurality of clock generation circuits that independently generates clocks as operation reference of the plurality of microcomputers,
wherein:
the plurality of microcomputers include a synchronization signal transmitter microcomputer as at least one microcomputer that transmits a synchronization signal synchronized with the drive timing of the own microcomputer and synchronizing the drive timing of the plurality of microcomputers; and
the plurality of microcomputers include a synchronization signal receiver microcomputer as at least one microcomputer that receives the synchronization signal transmitted from the synchronization signal transmitter microcomputer;
the motor control method comprising:
causing the synchronization signal receiver microcomputer to transmit, to the synchronization signal transmitter microcomputer, a ready signal indicating synchronization preparation completion of an own microcomputer;

causing the synchronization signal transmitter microcomputer to receive the ready signal;

causing the handshaking determiner of the synchronization signal transmitter microcomputer and the synchronization signal receiver microcomputer to determine success in handshaking when the handshaking at least including transmission and reception of the ready signal is executed normally; and causing the synchronization signal transmitter microcomputer and the synchronization signal receiver microcomputer to synchronously drive the motor initially after booting when the handshaking is determined as being successful.

\* \* \* \* \*